(12) United States Patent
Wu et al.

(10) Patent No.: US 12,143,862 B2
(45) Date of Patent: Nov. 12, 2024

(54) METHOD, APPARATUS, AND SYSTEM FOR MANAGING BACKGROUND DATA TRANSFER POLICY

(71) Applicant: Huawei Technologies Co., Ltd., Shenzhen (CN)

(72) Inventors: Yizhuang Wu, Beijing (CN); Hui Ding, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 17/554,519

(22) Filed: Dec. 17, 2021

(65) Prior Publication Data

US 2022/0110023 A1 Apr. 7, 2022

Related U.S. Application Data

(63) Continuation of application No. PCT/CN2020/096470, filed on Jun. 17, 2020.

(30) Foreign Application Priority Data

Jun. 17, 2019 (CN) .......................... 201910523169.8
Apr. 9, 2020 (CN) .......................... 202010275541.0

(51) Int. Cl.
   *H04W 28/16* (2009.01)
   *H04W 40/02* (2009.01)

(52) U.S. Cl.
   CPC .......... *H04W 28/16* (2013.01); *H04W 40/02* (2013.01)

(58) Field of Classification Search
   None
   See application file for complete search history.

(56) References Cited

U.S. PATENT DOCUMENTS

2019/0268230 A1* 8/2019 Huang .................... H04L 41/12
2019/0394279 A1* 12/2019 Dao ........................ H04W 48/04
(Continued)

FOREIGN PATENT DOCUMENTS

| CN | 109361526 A | 2/2019 |
| WO | 2018168132 A1 | 9/2018 |
| WO | 2019085918 A1 | 5/2019 |

OTHER PUBLICATIONS

Samsung, "Adding Support for Delivering Background Data Transfer Polices to the UE," 3GPP TSG-SA2 Meeting #133, S2-1904066, May 17, 2019, 10 pages.

(Continued)

*Primary Examiner* — Hassan A Phillips
*Assistant Examiner* — Gautam Sharma
(74) *Attorney, Agent, or Firm* — Conley Rose, P.C.

(57) ABSTRACT

A method, an apparatus, and a system for managing a background data transfer policy, such that a policy control function network element can obtain a background data transfer policy corresponding to a terminal. The method includes: A first policy control function network element receives a first message. The first message carries a first identifier, and the first identifier may be a background data transfer reference identifier or an application function identifier. Then, the first policy control function network element sends a second message to a first data storage network element, facilitating obtaining of a background data transfer policy. The second message carries the first identifier. Finally, the first policy control function network element receives a third message from the first data storage network element. The third message includes a first background data transfer policy corresponding to the first identifier.

22 Claims, 18 Drawing Sheets

(56) References Cited

U.S. PATENT DOCUMENTS

| | | | |
|---|---|---|---|
| 2020/0022027 A1* | 1/2020 | Iwai | H04L 12/14 |
| 2020/0252856 A1 | 8/2020 | Zhu et al. | |
| 2020/0351409 A1* | 11/2020 | Karampatsis | H04W 76/30 |
| 2021/0168584 A1* | 6/2021 | Li | H04W 48/20 |

OTHER PUBLICATIONS

Nokia, et al., "Correcting AMF behaviour for Service Request that is not integrity protected." SA WG2 Meeting #132, Apr. 8-12, 2019, Xi'an, PRC, S2-1903668, 376 pages.

Nokia, Nokia Shanghai Bell, Providing background data transfer policies to a UE, 3GPP TSG-SA WG2 Meeting#132 S2-1903324, Apr. 8-12, 2019, 17 pages.

3GPP TS 23.502 V16.1.1, "3rd Generation Partnership Project; Technical Specification Group Services and System Aspects; Procedures for the 5G System; Stage 2 (Release 16)," Jun. 2019, 494 pages.

3GPP TS 23.503 V16.1.0, "3rd Generation Partnership Project; Technical Specification Group Services and System Aspects; Policy and Charging Control Framework for the 5G System; Stage 2 (Release 16)," Jun. 2019, 98 pages.

3GPP TS 23.682 V16.3.0, "3rd Generation Partnership Project; Technical Specification Group Services and System Aspects; Architecture enhancements to facilitate communications with packet data networks and applications (Release 16)," Jun. 2019, 132 pages.

ZTE, "BDT procedure," 3GPP TSG-CT WG3 Meeting #97, C3-183393, May 25, 2018, 6 pages.

VIVO, "Discussion on enhancements to initial access procedure," 3GPP TSG RAN WG1#96bis, R1-1904066, Apr. 12, 2019, 10 pages.

Convida Wireless LLC, "Adding Support for Delivering Background Data Transfer Polices to the UE," 3GPP TSG-SA2 Meeting #132, S2-1904376, Xi'an, China, Apr. 8-12, 2019, 9 pages.

Convida Wireless LLC, "Discussion on xBDT Open Issues / Editor's Note," SA WG2 Meeting #133, S2-1905367, May 17, 2019, 3 pages.

Convida Wireless LLC, et al., "Adding Support for Delivering Background Data Transfer Polices to the UE," 3GPP TSG-SA2 Meeting #133, S2-1905368, May 17, 2019, 12 pages.

Convida Wireless LLC, et al., "Adding Support for Delivering Background Data Transfer Polices to the UE," 3GPP TSG-SA2 Meeting #133, S2-1905893, May 17, 2019, 12 pages.

* cited by examiner

METHOD, APPARATUS, AND SYSTEM FOR MANAGING BACKGROUND DATA TRANSFER POLICY

CROSS-REFERENCE TO RELATED APPLICATIONS

This application is a continuation of International Patent Application No. PCT/CN2020/096470, filed on Jun. 17, 2020, which claims priority to Chinese Patent Application No. 201910523169.8, filed on Jun. 17, 2019, and Chinese Patent Application No. 202010275541.0, filed on Apr. 9, 2020, which are incorporated herein by reference in their entireties.

TECHNICAL FIELD

This application relates to the communications field, and more specifically, to a method, an apparatus, and a system for managing background data transfer policy.

BACKGROUND

A current background data transfer (BDT) mechanism mainly includes the following three processes: (1) A background data transfer policy negotiation means that an application function (AF) may negotiate a background data transfer policy with an operator network in advance. (2) The background data transfer policy is sent to a user equipment (UE) as a part of a UE route selection policy (URSP), and the UE determines, based on the URSP information, to reuse or initiate establishment of a protocol data unit (PDU) session. (3) After the PDU session is established, the AF requests policy authorization from a policy control function (PCF). In the request process, the AF carries a background data transfer reference (BDT) identifier (ID), such that the PCF obtains corresponding background data transfer policy information based on the BDT reference ID.

However, in the BDT negotiation process, the AF does not provide identifier information of the user. If the PCF selects a unified data repository (UDR) based on only a network function (NF) service name and an NF type, a UDR selected in the BDT negotiation process is different from a UDR selected in a process of establishing the PDU session by the UE or in a process of accessing a network by the UE. Consequently, the PCF cannot obtain a corresponding BDT policy.

SUMMARY

In view of this, this application provides a method, an apparatus, and a system for managing a background data transfer policy, such that a policy control function network element can obtain a background data transfer policy corresponding to a terminal.

According to a first aspect, a method for managing a background data transfer policy is provided. The method includes: A first policy control function network element receives a first message. The first message carries a first identifier, and the first identifier is a background data transfer reference identifier or an application function identifier. Then, the first policy control function network element sends a second message to a first data storage network element. The second message is used to obtain a background data transfer policy, and the second message carries the first identifier. Finally, the first policy control function network element receives a third message from the first data storage network element. The third message includes a first background data transfer policy corresponding to the first identifier, such that the first background data transfer policy corresponding to the first identifier is obtained.

In a possible implementation, the method further includes: The first policy control function network element sends a discovery request to a network repository function network element. The discovery request is used to request to discover a data storage network element. The first policy control function network element receives information about the first data storage network element from the network repository function network element. The first policy control function network element selects the first data storage network element based on the information about the first data storage network element.

Optionally, in Manner 1, the discovery request is used to request to discover a data storage network element configured to store the background data transfer policy, and correspondingly, the information about the first data storage network element is an identifier of the first data storage network element.

Optionally, in Manner 2, the information about the first data storage network element includes an identifier of the first data storage network element and a type of the first data storage network element.

Optionally, in Manner 3, the information about the first data storage network element includes an identifier of the first data storage network element and first indication information, and the first indication information indicates that the first data storage network element is configured to store the background data transfer policy.

Therefore, according to any one of the foregoing three manners, the first policy control function network element can obtain the information about the first data storage network element, to perform selection.

In a possible implementation, the first message further includes identifier information corresponding to a terminal, and the method further includes: The first policy control function network element sends context information of the terminal to a second data storage network element. The context information of the terminal is determined based on the first background data transfer policy. The second data storage network element is a UDR selected based on the identifier information of the terminal. Therefore, the first policy control function network element may store the context information of the terminal in the second data storage network element.

Optionally, the context information of the terminal includes a time window and/or network area information. For example, the context information of the terminal includes context policy control information and PDU session control context policy information that are of the terminal. Herein, the first policy control function network element may store the time window and/or the network area information in the PDU session control context policy information of the terminal. Optionally, the identifier information corresponding to the terminal is a subscription permanent identifier of the terminal, or the identifier information corresponding to the terminal is a group identifier corresponding to the terminal.

Optionally, that a first policy control function network element receives a first message includes: The first policy control function network element receives the first message from a network exposure function network element or a third data storage network element.

In a possible implementation, before the first policy control function network element receives the first message, the method further includes: The first policy control function network element sends a first data storage request to the first data storage network element. The first data storage request includes the background data transfer policy. The first policy control function network element receives a first data storage response from the first data storage network element. Optionally, the first data storage request further includes one or more of first service information, indication information, or third-party identifier information, and the indication information is used to indicate whether third-party charging is enabled. Before the first policy control function network element sends the first data storage request to the first data storage network element, the method further includes: The first policy control function network element receives one or more of the first service information, the indication information, or the third-party identifier information from the network exposure network element. Alternatively, a second policy control function network element sends a second data storage request to the first data storage network element. The second data storage request includes the background data transfer policy. The second policy control function network element receives a second data storage response from the first data storage network element. Therefore, the first policy control function network element or the second policy control function network element may perform a policy negotiation process in advance, and store the background data transfer policy in the first data storage network element.

Optionally, the second data storage request further includes one or more of first service information, indication information, or third-party identifier information, and the indication information is used to indicate whether third-party charging is enabled. Before the second policy control function network element sends the second data storage request to the first data storage network element, the method further includes: The second policy control function network element receives one or more of the first service information, the indication information, or the third-party identifier information from the network exposure network element.

That is, in this embodiment of this application, one or more of the first service information, the indication information, or the third-party identifier information may be stored in the first data storage network element. Either the first policy control function network element or the second policy control function network element can initiate the foregoing storage operation.

In this embodiment of this application, the first policy control function network element may obtain the first service information.

In a possible implementation, the third message further includes first service information, and the first service information includes one or more of a data network name (DNN), single network slice selection assistance information (S-NSSAI), or service description information. Therefore, the first policy control function network element may further obtain the first service information in addition to the first background data transfer policy in the third message.

In another possible implementation, the first message further includes first service information, and the first service information includes one or more of a DNN, S-NSSAI, or service description information.

In still another possible implementation, the first message further includes an application service provider (ASP) identifier ASP ID; and the method further includes: The first policy control function network element obtains first service information from a fourth data storage network element based on the ASP ID. The first service information includes one or more of a DNN, S-NSSAI, or service description information. The first data storage network element may be the same as or different from the fourth data storage network element. This is not limited.

Optionally, after obtaining the first service information, the first policy control function network element may generate a user route selection policy (URSP) of a terminal based on the first service information and the first background data transfer policy.

In this embodiment of this application, the first policy control function network element may obtain indication information and/or third-party identifier information. The indication information is used to indicate whether third-party charging is enabled. It should be noted that obtaining of the first service information by the first policy control function network element is not related to obtaining of the indication information and/or the third-party identifier information by the first policy control function network element, and may be an independent process.

In a possible implementation, the first message further includes an ASP ID, and the method further includes: The first policy control function network element obtains indication information and/or third-party identifier information from a fourth data storage network element based on the ASP ID. The indication information is used to indicate whether third-party charging is enabled. Therefore, the first policy control function network element may further obtain the ASP ID in addition to the first identifier in the first message, to obtain the indication information and/or the third-party identifier information from the fourth data storage network element based on the ASP ID. The first data storage network element may be the same as or different from the fourth data storage network element. This is not limited.

In another possible implementation, the third message further includes indication information and/or third-party identifier information, and the indication information is used to indicate whether third-party charging is enabled. Therefore, the first policy control function network element may further obtain the indication information and/or the third-party identifier information in addition to the first background data transfer policy in the third message.

In still another possible implementation, the first message further includes indication information and/or third-party identifier information, and the indication information is used to indicate whether third-party charging is enabled. Therefore, the first policy control function network element may further obtain the indication information and/or the third-party identifier information in addition to the first identifier in the first message.

Optionally, after obtaining the indication information and/or the third-party identifier information, the first policy control function network element may generate a policy and charging control (PCC) rule based on the first background data transfer policy and the indication information and/or the third-party identifier information.

In the implementations of the first aspect, optionally, that a first policy control function network element receives a first message includes: The first policy control function network element receives the first message from the network exposure function network element or the third data storage network element. Therefore, a manner in which the first policy control function network element obtains the first message is relatively flexible.

In the implementations of the first aspect, optionally, the method further includes: The first policy control function network element sends the first identifier to the second data storage network element. The first identifier is stored in PDU session subscription information of the terminal device. The second data storage network element may be the same as or different from the first data storage network element.

According to a second aspect, a method for managing a background data transfer policy is provided. The method includes: A policy control function network element receives a fourth message from a first data storage network element. The fourth message includes at least one background data transfer reference identifier or at least one background data transfer policy, and each background data transfer policy has a corresponding background data transfer reference identifier. The policy control function network element generates a URSP of a terminal. The URSP includes a first background data transfer policy, and the first background data transfer policy is included in the at least one background data transfer policy, or the first background data transfer policy corresponds to a first background data transfer reference identifier in the at least one background data transfer reference identifier. The policy control function network element sends the URSP to a mobility management network element.

Optionally, the fourth message includes the at least one background data transfer policy. The fourth message further includes first service information, and the first service information includes one or more of a DNN, S-NSSAI, or service description information. Correspondingly, that the policy control function network element generates the URSP of the terminal based on the first background data transfer policy includes: The policy control function network element generates the URSP based on the first service information and the first background data transfer policy. For related descriptions of the first service information, refer to the first aspect. Details are not described herein again.

In a possible implementation, the fourth message includes the at least one background data transfer reference identifier, and the method further includes: The policy control function network element obtains at least one corresponding background data transfer policy from a second data storage network element based on the at least one background data transfer reference identifier. Optionally, the fourth message further includes first service information, and the first service information includes one or more of a DNN, S-NSSAI, or service description information. Correspondingly, that the policy control function network element generates the URSP of the terminal based on the first background data transfer policy includes: The policy control function network element generates the URSP based on the first service information and the first background data transfer policy.

In a possible implementation, the method further includes: The policy control function network element sends a first storage request to a third data storage network element. The first storage request includes at least one of the following: the first background data transfer policy, or a background data transfer reference identifier corresponding to the first background data transfer policy.

In a possible implementation, before the policy control function network element receives the fourth message from the first data storage network element, the method further includes: The policy control function network element sends a request message to the first data storage network element. The request message includes an application function identifier. In this case, the at least one background data transfer reference identifier is a background data transfer reference identifier corresponding to an application function identified by the application function identifier, and the at least one background data transfer policy is a background data transfer policy corresponding to the application function identified by the application function identifier.

Optionally, the request message is a data request message or a data subscription message.

According to a third aspect, a method for managing a background data transfer policy is provided. The method includes: A first policy control function network element receives a fifth message from a network exposure network element. The fifth message is used to request the first policy control function network element to perform policy negotiation. The first policy control function network element selects, based on the fifth message, a data storage network element from a first data storage network element set as a first data storage network element. The first policy control function network element sends a first storage request to the first data storage network element. The first storage request includes a first background data transfer policy and/or a first BDT reference identifier. The first policy control function network element sends a second storage request to any data storage network element in a second data storage network element set. The second storage request includes the first background data transfer policy and/or the first BDT reference identifier. The first policy control function network element sends a sixth message to a second data storage network element. The sixth message is used to obtain a background data transfer policy, and the second data storage network element is a network element in the first data storage network element set or in the second data storage network element set. The first policy control function network element receives a seventh message from the second data storage network element. The seventh message includes the first background data transfer policy. Alternatively, a second policy control function network element sends a sixth message to a second data storage network element. The sixth message is used to obtain a background data transfer policy, and the second data storage network element is a network element in the first data storage network element set or in the second data storage network element set. The second policy control function network element receives a seventh message from the second data storage network element. The seventh message includes the first background data transfer policy.

In a possible implementation, the method further includes: The first policy control function network element sends a response message to the network exposure network element. The response message includes the first BDT reference identifier and/or the first background data transfer policy.

According to a fourth aspect, a system for managing a background data transfer policy is provided. The system includes a first policy control function network element and a first data storage network element.

The first policy control function network element is configured to: receive a first message, where the first message carries a first identifier, and where the first identifier is a background data transfer reference identifier or an application function identifier; and send a second message to the first data storage network element, where the second message is used to obtain a background data transfer policy, and where the second message carries the first identifier.

The first data storage network element is configured to send a third message to the first policy control function network element, where the third message includes a first background data transfer policy corresponding to the first identifier.

In this embodiment of this application, the first policy control function network element may obtain the first message from different network elements in a relatively flexible manner.

Optionally, the system further includes an application function network element, and the application function network element is configured to send the first message to the first policy control function network element. Alternatively, the system further includes a network exposure network element, and the network exposure network element is configured to send the first message to the first policy control function network element. Alternatively, the system further includes a data storage network element, and the data storage network element is configured to send the first message to the first policy control function network element.

In a possible implementation, the system further includes a network repository function network element. The first policy control function network element is further configured to send a discovery request to the network repository function network element. The discovery request is used to request to discover a data storage network element. The network repository function network element is configured to send information about the first data storage network element to the first policy control function network element. The first policy control function network element is further configured to select the first data storage network element based on the information about the first data storage network element.

Optionally, the discovery request is used to request to discover a data storage network element configured to store the background data transfer policy, and correspondingly, the information about the first data storage network element is an identifier of the first data storage network element.

Optionally, the information about the first data storage network element includes an identifier of the first data storage network element and a type of the first data storage network element.

Optionally, the information about the first data storage network element includes an identifier of the first data storage network element and first indication information, and the first indication information indicates that the first data storage network element is configured to store the background data transfer policy.

In a possible implementation, the system further includes a second data storage network element configured to receive context information of a terminal that is sent by the first policy control function network element. The context information of the terminal is determined based on the first background data transfer policy. Optionally, the context information of the terminal includes a time window and/or network area information.

Optionally, identifier information corresponding to the terminal is a subscription permanent identifier of the terminal, or identifier information corresponding to the terminal is a group identifier corresponding to the terminal.

Optionally, that the first policy control function network element is configured to receive a first message includes receiving the first message from a network exposure function network element or a third data storage network element.

In a possible implementation, the first policy control function network element is further configured to: send a first data storage request to the first data storage network element, where the first data storage request includes the background data transfer policy; and receive a first data storage response from the first data storage network element. Alternatively, the system further includes a second policy control function network element configured to: send a second data storage request to the first data storage network element, where the second data storage request includes the background data transfer policy; and receive a second data storage response from the first data storage network element.

In a possible implementation, the system further includes a fourth data storage network element. The first message further includes an ASP ID. The first policy control function network element is further configured to obtain first service information from the fourth data storage network element based on the ASP ID. The first service information includes one or more of a DNN, S-NSSAI, or service description information. The first policy control function network element is further configured to generate a URSP of the terminal based on the first service information and the first background data transfer policy.

In a possible implementation, the system further includes a fourth data storage network element. The first message further includes an ASP ID. The first policy control function network element is further configured to obtain indication information and/or third-party identifier information from the fourth data storage network element based on the ASP ID. The indication information is used to indicate whether third-party charging is enabled. The first policy control function network element is further configured to generate a PCC rule based on the first background data transfer policy and the indication information and/or the third-party identifier information.

In a possible implementation, the system further includes a network exposure network element and an application function network element. The application function network element is configured to send second service information to the network exposure network element. The second service information includes service description information, and a service corresponding to the service description information is a service to which the first background data transfer policy is applied. The network exposure network element is configured to: determine first service information based on the second service information, where the first service information includes the service description information; send the first service information.

In this embodiment of this application, the first service information may be added in different scenarios. The following provides three manners.

Manner 1: That the application function network element is configured to send second service information to the network exposure network element includes: The application function network element is configured to send a first background data transfer policy negotiation request to the network exposure network element, where the first background data transfer policy negotiation request includes the second service information. Correspondingly, that the network exposure network element is configured to send the first service information includes: The network exposure network element is configured to send a second background data transfer policy negotiation request to a second policy control function network element, where the second background data transfer policy negotiation request includes the first service information. The first service information may be added in a background data transfer policy negotiation process. The second policy control function network element may be the same as or different from the first policy control function network element.

Manner 2: That the application function network element is configured to send second service information to the network exposure network element includes: The application function network element is configured to send an application policy request to the network exposure network element, where the application policy request includes the second service information. Correspondingly, that the network exposure network element is configured to send the first service information includes: The network exposure network element is configured to send a storage application request to a fourth data storage network element, where the storage application request includes the first service information. Herein, the first service information may be added in an application process.

Manner 3: That the application function network element is configured to send second service information to the network exposure network element includes: The application function network element is configured to send a first application configuration message to the network exposure network element, where the first application configuration message includes the second service information and an ASP ID. The system further includes a fourth data storage network element. Correspondingly, that the network exposure network element is configured to send the first service information includes: The network exposure network element is configured to send a second application configuration message to the fourth data storage network element, where the second application configuration message includes the ASP ID and the first service information. Herein, an independent configuration procedure is introduced, and the first service information is added in the procedure.

According to a fifth aspect, a system for managing a background data transfer policy is provided. The system includes a policy control function network element and a mobility management network element.

The policy control function network element is configured to: receive a fourth message from a first data storage network element, where the fourth message includes at least one background data transfer reference identifier or at least one background data transfer policy, and where each background data transfer policy has a corresponding background data transfer reference identifier; and generate a URSP of a terminal, where the URSP includes a first background data transfer policy, and where the first background data transfer policy is included in the at least one background data transfer policy, or where the first background data transfer policy corresponds to a first background data transfer reference identifier in the at least one background data transfer reference identifier.

The mobility management network element is configured to receive the URSP from the policy control function network element.

Optionally, the fourth message includes the at least one background data transfer reference identifier. The policy control function network element is further configured to obtain at least one corresponding background data transfer policy from a second data storage network element.

Optionally, the policy control function network element is further configured to send a first storage request to a third data storage network element. The first storage request includes at least one of the following: the first background data transfer policy, or a background data transfer reference identifier corresponding to the first background data transfer policy.

In a possible implementation, the policy control function network element is further configured to send a request message to the first data storage network element. The request message includes an application function identifier. In this case, the at least one background data transfer reference identifier is a background data transfer reference identifier corresponding to an application function identified by the application function identifier, and the at least one background data transfer policy is a background data transfer policy corresponding to the application function identified by the application function identifier. Optionally, the request message is a data request message or a data subscription message.

According to a sixth aspect, a system for managing a background data transfer policy is provided. The system includes a first policy control function network element and a network exposure network element.

The network exposure network element is configured to send a fifth message to one or more policy control function network elements. The fifth message is used to request the policy control function network element to perform policy negotiation.

The first policy control function network element is configured to: select, based on the fifth message, a data storage network element from a first data storage network element set as a first data storage network element; send a first storage request to the first data storage network element, where the first storage request includes a first background data transfer policy and/or a first BDT reference identifier; and send a policy response message to the network exposure network element, where the policy response message includes the first BDT reference identifier and/or the first background data transfer policy. The first policy control function network element is a policy control function network element that first sends the policy response message and that are in the one or more policy control function network elements.

In a possible implementation, the network exposure network element is further configured to send the policy response message to a policy control function network element other than the first policy control function network element in the one or more policy control function network elements.

Optionally, the first policy control function network element is further configured to send a second storage request to any data storage network element in a second data storage network element set. The second storage request includes the first background data transfer policy and/or the first BDT reference identifier.

According to a seventh aspect, a communications apparatus is provided. The apparatus may be a policy control function network element (which may optionally have both a visited-policy control function and a home-policy control function), or may be a chip. The apparatus has a function of implementing the first policy control function network element or the second policy control function network element in any one of the first aspect to the third aspect or the possible implementations of the first aspect to the third aspect. The function may be implemented by hardware, or may be implemented by hardware executing corresponding software. The hardware or the software includes one or more modules corresponding to the function.

According to an eighth aspect, an apparatus is provided. The apparatus includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the apparatus to perform the method of the first policy control function network element in any one of the foregoing aspects or the possible implementations of the foregoing aspects, perform the method of the second policy control function network element in any one of the foregoing aspects or the possible implementations of the foregoing aspects, perform the method of the network exposure network element in any one of the possible implementations of the fourteenth aspect, or perform a method of a data storage network element in any one of the possible implementations of the fifteenth aspect.

Optionally, there are one or more processors, and there are one or more memories.

Optionally, the memory may be integrated into the processor, or the memory and the processor are separately disposed.

In an implementation process, the memory may be a non-transitory (non-transitory) memory, for example, a read-only memory (ROM). The memory and the processor may be integrated on a same chip, or may be separately disposed on different chips. A type of the memory and a manner of disposing the memory and the processor are not limited in the embodiments of this application.

According to a ninth aspect, an apparatus is provided. The apparatus includes a processor and a transceiver. The processor is connected to the transceiver. The processor is configured to execute an instruction. The transceiver is configured to communicate with another network element under control of the processor. When the processor executes the instruction, the execution enables the apparatus to perform the method of the first policy control function network element in any one of the foregoing aspects or the possible implementations of the foregoing aspects, perform the method of the second policy control function network element in any one of the foregoing aspects or the possible implementations of the foregoing aspects, perform the method of the network exposure network element in any one of the possible implementations of the fourteenth aspect, or perform a method of a data storage network element in any one of the possible implementations of the fifteenth aspect.

According to a tenth aspect, a computer-readable storage medium is provided. The computer-readable storage medium stores a program. The program enables a first policy control function network element to perform a method of a visited-policy control function network element in any one of the first aspect to the third aspect or the possible implementations of the first aspect to the third aspect, or the program enables a network exposure network element to perform the method of the network exposure network element in any one of the possible implementations of the following fourteenth aspect, or the program enables a data storage network element to perform a method of a data storage network element in any one of the possible implementations of the following fifteenth aspect.

According to an eleventh aspect, a computer-readable storage medium is provided. The computer-readable storage medium stores a program. The program enables a home-policy control function network element to perform the method of the first policy control function network element in any one of the first aspect, the second aspect, or the possible implementations of the first aspect and the second aspect.

According to a twelfth aspect, a communications chip is provided. The communications chip stores an instruction. When the instruction is run on a computer device, the communications chip is enabled to perform the method in any one of the possible implementations of the first aspect to the third aspect, or enable the communications chip to perform the method in any one of the possible implementations of the fourteenth aspect, or enable the communications chip to perform the method in any one of the possible implementations of the fifteenth aspect.

According to a thirteenth aspect, a computer program product including an instruction is provided. When the computer program product runs on a computer, the computer is enabled to perform the method in any one of the first aspect, the second aspect, or the possible implementations of the first aspect and the second aspect, or enable the computer to perform the method in any one of the possible implementations of the fourteenth aspect, or enable the computer to perform the method in any one of the possible implementations of the fifteenth aspect.

According to a fourteenth aspect, a method for managing a background data transfer policy is provided. The method includes: First, a network exposure network element receives second service information from an application function network element. The second service information includes service description information, and a service corresponding to the service description information is a service to which a first background data transfer policy is applied. Then, the network exposure network element determines first service information based on the second service information. The first service information includes the service description information. Finally, the network exposure network element sends the first service information. In this embodiment of this application, the first service information may be added, such that a policy control function network element generates a URSP of a terminal based on the first service information and the first background data transfer policy.

Optionally, the second service information further includes an application function (AF) service identifier. Correspondingly, that the network exposure network element determines first service information based on the second service information includes: The network exposure network element obtains a DNN and an S-NSSAI based on the AF service identifier. The first service information further includes the DNN and the S-NSSAI.

Optionally, the second service information further includes one or more of the following: a DNN or S-NSSAI. The first service information further includes the DNN and the S-NSSAI.

In a possible implementation, the method further includes: The network exposure network element obtains indication information and/or third-party identifier information from the application function network element. The indication information is used to indicate whether third-party charging is enabled.

In a possible implementation, that a network exposure network element receives second service information from an application function network element includes: The network exposure network element receives a first background data transfer policy negotiation request from the application function network element. The first background data transfer policy negotiation request includes the second service information. Correspondingly, that the network exposure network element sends the first service information includes: The network exposure network element sends a second background data transfer policy negotiation request to a first policy control function network element. The second background data transfer policy negotiation request includes the first service information. That is, the first service information may be added in a background data transfer policy negotiation process. The network exposure network element may determine the first service information in the background data transfer policy negotiation process, and send the first service information to the first policy control function network element.

In another possible implementation, that a network exposure network element receives second service information from an application function network element includes: The network exposure network element receives an application policy request from the application function network element. The application policy request includes the second service information. Correspondingly, that the network exposure network element sends the first service information includes: The network exposure network element sends a storage application request to a first data storage network element. The storage application request includes the first service information. That is, the first service information may be added in an application process. The network exposure network element may determine the first service information in the application process, and send the first service information to the first data storage network element.

In still another possible implementation, that a network exposure network element receives second service information from an application function network element includes: The network exposure network element receives a first application configuration message from the application function network element. The first application configuration message includes the second service information and an ASP ID. Correspondingly, that the network exposure network element sends the first service information includes: The network exposure network element sends a second application configuration message to a fourth data storage network element. The second application configuration message includes the ASP ID and the first service information. That is, an independent configuration process is added, and the first service information is added in this process. The network exposure network element may determine the first service information in the independent configuration process, and send the first service information to the fourth data storage network element.

According to a fifteenth aspect, a method for managing a background data transfer policy is provided. The method includes: First, a first data storage network element receives a second message from a first policy control function network element. The second message is used to obtain a background data transfer policy, and the second message carries a first identifier. Then, the first data storage network element sends a third message to the first policy control function network element. The third message includes a first background data transfer policy corresponding to the first identifier.

In a possible implementation, the third message further includes first service information, and the first service information includes one or more of a DNN, S-NSSAI, or service description information. In this embodiment of this application, the first service information may be added, such that a policy control function network element generates a URSP of a terminal based on the first service information and the first background data transfer policy.

Optionally, before the third message is sent to the first policy control function network element, the method further includes: The first data storage network element receives a first data storage request from a second policy control function network element. The first data storage request includes the first background data transfer policy and the first service information. Therefore, in this embodiment of this application, the first service information may be stored in the first data storage network element in a background data transfer policy negotiation process.

Optionally, before the third message is sent to the first policy control function network element, the method further includes: The first data storage network element receives a storage application request from a network exposure network element. The storage application request includes the first service information. Therefore, in this embodiment of this application, the first service information may be stored in the first data storage network element in an application process.

In another possible implementation, the method further includes: A fourth data storage network element sends, to the first policy control function network element, first service information corresponding to an ASP ID. The fourth data storage network element receives a second application configuration message from a network exposure network element. The second application configuration message includes the ASP ID and the first service information. The fourth data storage network element may be the same as or different from the first data storage network element.

In still another possible implementation, the third message includes indication information and/or third-party identifier information, and the indication information is used to indicate whether third-party charging is enabled. Therefore, the first data storage network element may provide the indication information and/or the third-party identifier information for the first policy control function network element.

Alternatively, optionally, another data storage network element (for example, the fourth data storage network element) may provide the indication information and/or the third-party identifier information for the first policy control function network element.

According to a sixteenth aspect, a communications apparatus is provided. The apparatus may be a network exposure network element, or may be a chip. The apparatus has a function of implementing the network exposure network element in any one of the fourteenth aspect or the possible implementations of the fourteenth aspect. The function may be implemented by hardware, or may be implemented by hardware executing corresponding software. The hardware or the software includes one or more modules corresponding to the function.

According to a seventeenth aspect, a communications apparatus is provided. The apparatus may be a data storage network element, or may be a chip. The apparatus has a function of implementing the data storage network element in any one of the fifteenth aspect or the possible implementations of the fifteenth aspect. The function may be implemented by hardware, or may be implemented by hardware executing corresponding software. The hardware or the software includes one or more modules corresponding to the function.

DESCRIPTION OF EMBODIMENTS

The following describes technical solutions of this application with reference to the accompanying drawings.

The technical solutions in the embodiments of this application may be applied to various communications systems, for example, a Long-Term Evolution (LTE) system, an LTE frequency-division duplex (FDD) system, an LTE time-division duplex (TDD) system, a universal mobile telecommunications system (UMTS), a Worldwide Interoperability for Microwave Access (WiMAX) communications system, a 5th generation (5G) system, or a new radio (NR) system.

Figure 1:
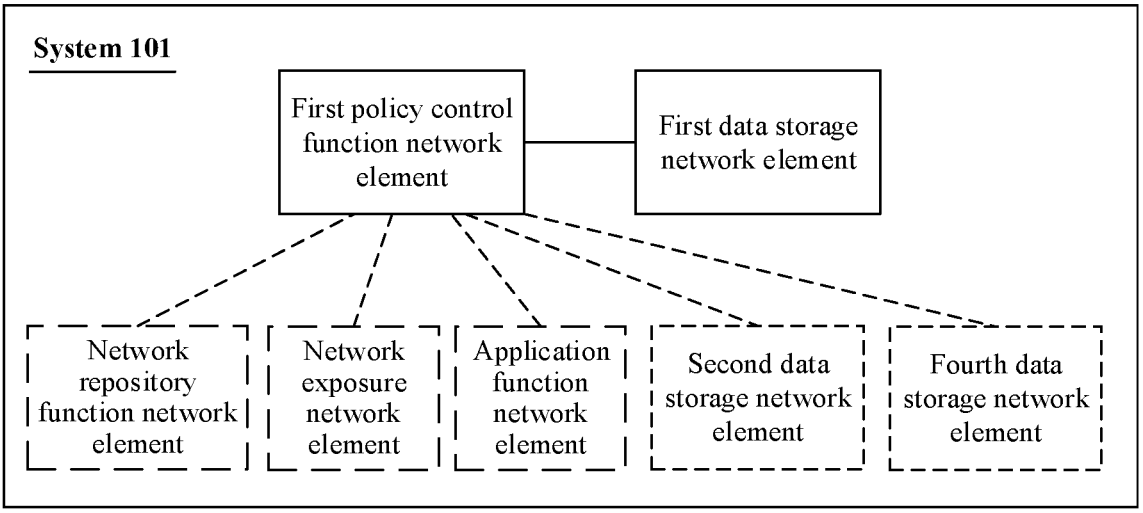
FIG. 1 is a schematic diagram of a system architecture to which an embodiment of this application is applied.

FIG. 1 is a schematic diagram of a system architecture to which an embodiment of this application is applied. As shown in FIG. 1, a system 101 includes a first policy control function network element and a first data storage network element. The system 101 may be configured to perform a method for managing a background data transfer policy in this embodiment of this application.

The first policy control function network element is configured to: receive a first message, where the first message carries a first identifier, and where the first identifier is a background data transfer reference identifier or an application function identifier; and send a second message to the first data storage network element, where the second message is used to obtain a background data transfer policy, and where the second message carries the first identifier.

The first data storage network element is configured to send a third message to the first policy control function network element, where the third message includes a first background data transfer policy corresponding to the first identifier.

In a possible implementation, optionally, the system 101 further includes a network repository function network element. The first policy control function network element is further configured to send a discovery request to the network repository function network element. The discovery request is used to request to discover a data storage network element. The network repository function network element is configured to send information about the first data storage network element to the first policy control function network element. The first policy control function network element is further configured to select the first data storage network element based on the information about the first data storage network element.

Optionally, the discovery request is used to request to discover a data storage network element configured to store the background data transfer policy, and correspondingly, the information about the first data storage network element is an identifier of the first data storage network element.

Optionally, the information about the first data storage network element includes an identifier of the first data storage network element and a type of the first data storage network element.

Optionally, the information about the first data storage network element includes an identifier of the first data storage network element and first indication information, and the first indication information indicates that the first data storage network element is configured to store the background data transfer policy.

In a possible implementation, optionally, the system 101 further includes a second data storage network element configured to receive context information of a terminal that is sent by the first policy control function network element. The context information of the terminal is determined based on the first background data transfer policy. Optionally, the context information of the terminal includes a time window and/or network area information. Optionally, identifier information corresponding to the terminal is a subscription permanent identifier of the terminal, or identifier information corresponding to the terminal is a group identifier corresponding to the terminal.

Optionally, that the first policy control function network element is configured to receive a first message includes receiving the first message from a network exposure function network element, a third data storage network element, or an application function network element.

In a possible implementation, the first policy control function network element is further configured to: send a first data storage request to the first data storage network element, where the first data storage request includes the background data transfer policy; and receive a first data storage response from the first data storage network element. Alternatively, the system further includes a second policy control function network element configured to: send a second data storage request to the first data storage network element, where the second data storage request includes the background data transfer policy; and receive a second data storage response from the first data storage network element.

In a possible implementation, optionally, the system 101 further includes a fourth data storage network element. The first message further includes an application service provider identifier (ASP ID). The first policy control function network element is further configured to obtain first service information from the fourth data storage network element based on the ASP ID. The first service information includes one or more of a DNN, S-NSSAI, or service description information. The first policy control function network element is further configured to generate a URSP of the terminal based on the first service information and the first background data transfer policy.

In a possible implementation, optionally, the system 101 further includes a fourth data storage network element. The first message further includes an ASP ID. The first policy control function network element is further configured to obtain indication information and/or third-party identifier information from the fourth data storage network element based on the ASP ID. The indication information is used to indicate whether third-party charging is enabled. The first policy control function network element is further configured to generate a PCC rule based on the first background data transfer policy and the indication information and/or the third-party identifier information.

In a possible implementation, optionally, the system 101 further includes a network exposure network element and an application function network element. The application function network element is configured to send second service information to the network exposure network element. The second service information includes service description information, and a service corresponding to the service description information is a service to which the first background data transfer policy is applied. The network exposure network element is configured to: determine first service information based on the second service information, where the first service information includes the service description information; and send the first service information.

Optionally, that the application function network element is configured to send second service information to the network exposure network element includes: The application function network element is configured to send a first background data transfer policy negotiation request to the network exposure network element, where the first background data transfer policy negotiation request includes the second service information. Correspondingly, that the network exposure network element is configured to send the first service information includes: The network exposure network element is configured to send a second background data transfer policy negotiation request to a second policy control function network element, where the second background data transfer policy negotiation request includes the first service information.

Optionally, that the application function network element is configured to send second service information to the network exposure network element includes: The application function network element is configured to send an application policy request to the network exposure network element, where the application policy request includes the second service information. Correspondingly, that the network exposure network element is configured to send the first service information includes: The network exposure network element is configured to send a storage application request to a fourth data storage network element, where the storage application request includes the first service information.

Optionally, that the application function network element is configured to send second service information to the network exposure network element includes: The application function network element is configured to send a first application configuration message to the network exposure network element, where the first application configuration message includes the second service information and an ASP ID. The system further includes a fourth data storage network element. Correspondingly, that the network exposure network element is configured to send the first service information includes: The network exposure network element is configured to send a second application configuration message to the fourth data storage network element, where the second application configuration message includes the ASP ID and the first service information.

It should be noted that the first policy control function network element, the data storage network element, the network exposure network element, the application function network element, and the like in FIG. 1 are merely names, and the names do not constitute a limitation on the devices. In a 5G network and another future network, the first policy control function network element, the data storage network element, the network exposure network element, and the application function network element may alternatively have other names. This is not specifically limited in the embodiments of this application. For example, the first policy control function network element may alternatively be replaced with a policy control function (PCF) entity, or the first policy control function network element may be replaced with a home-policy control function (H-PCF), the first data storage network element may be replaced with a unified data repository (UDR) entity, the network exposure network element may be replaced with a network exposure function (NEF) entity, the application function network element may be replaced with an application function (AF) entity, and the like. A description is provided herein, and details are not described below again.

Optionally, the first policy control function network element, the first data storage network element, the network exposure network element, and the application function network element in FIG. 1 each may be an independent network element, may be jointly implemented by a plurality of network elements, or may be used as a function module in a network element. This is not specifically limited in this embodiment of this application.

It should be understood that a description is provided herein. In this embodiment of this application, for example, the first data storage network element and the second data storage network element each may be an independent network element, or may be a same network element (where for example, the network element includes a function used to implement the first data storage network element and a function used to implement the second data storage network element). This is not specifically limited.

Figure 2:
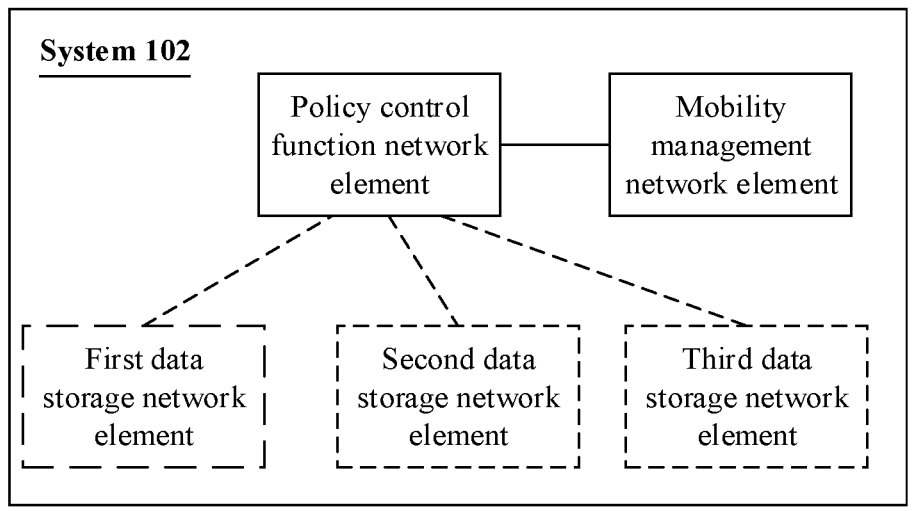
FIG. 2 is a schematic diagram of another system architecture to which an embodiment of this application is applied.

FIG. 2 is a schematic diagram of a system architecture to which an embodiment of this application is applied. As shown in FIG. 2, a system 102 includes a policy control function network element and a mobility management network element. The system 102 may be configured to perform another method for managing a background data transfer policy in this embodiment of this application.

The policy control function network element is configured to: receive a fourth message from a first data storage network element, where the fourth message includes at least one background data transfer reference identifier or at least one background data transfer policy, and where each background data transfer policy has a corresponding background data transfer reference identifier; and generate a user route selection policy (URSP) of a terminal, where the URSP includes a first background data transfer policy, and where the first background data transfer policy is included in the at least one background data transfer policy, or where the first background data transfer policy corresponds to a first background data transfer reference identifier in the at least one background data transfer reference identifier.

The mobility management network element is configured to receive the URSP from the policy control function network element.

Optionally, the system 102 further includes a first data storage network element, and the first data storage network element is configured to send the fourth message to the policy control function network element.

Optionally, the fourth message includes the at least one background data transfer reference identifier. The policy control function network element is further configured to obtain at least one corresponding background data transfer policy from a second data storage network element. Optionally, the system 102 further includes the second data storage network element. The second data storage network element is configured to send at least one corresponding background data transfer policy to the policy control function network element.

Optionally, the policy control function network element is further configured to send a first storage request to a third data storage network element. The first storage request includes at least one of the following: the first background data transfer policy, or a background data transfer reference identifier corresponding to the first background data transfer policy. Optionally, the system 102 further includes a third data storage network element. The third data storage network element is configured to receive the first storage request.

In a possible implementation, the policy control function network element is further configured to send a request message to the first data storage network element. The request message includes an application function identifier. In this case, the at least one background data transfer reference identifier is a background data transfer reference identifier corresponding to an application function identified by the application function identifier, and the at least one background data transfer policy is a background data transfer policy corresponding to the application function identified by the application function identifier. Optionally, the request message is a data request message or a data subscription message. It should be noted that the policy control function network element, the mobility management network element, and the like in FIG. 2 are merely names, and the names do not constitute a limitation on the devices. In a 5G network and another future network, the policy control function network element and the mobility management network element may alternatively have other names. This is not specifically limited in the embodiments of this application. For example, the policy control function network element may alternatively be replaced with a policy control function (PCF) entity, or the policy control function network element may be replaced with a home-policy control function (H-PCF), and the mobility management network element may alternatively be replaced with an access and mobility management function (AMF) entity. A description is provided herein, and details are not described below.

Optionally, the policy control function network element and the mobility management network element in FIG. 2 each may be an independent network element, may be jointly implemented by a plurality of network elements, or may be used as a function module in a network element. This is not specifically limited in this embodiment of this application.

It should be understood that a description is provided herein. In this embodiment of this application, for example, the first data storage network element, the second data storage network element, and the third data storage network element each may be an independent network element, or may be a same network element (where for example, the network element includes a function used to implement the first data storage network element, a function used to implement the second data storage network element, and a function used to implement the third data storage network element). This is not specifically limited.

Figure 3:
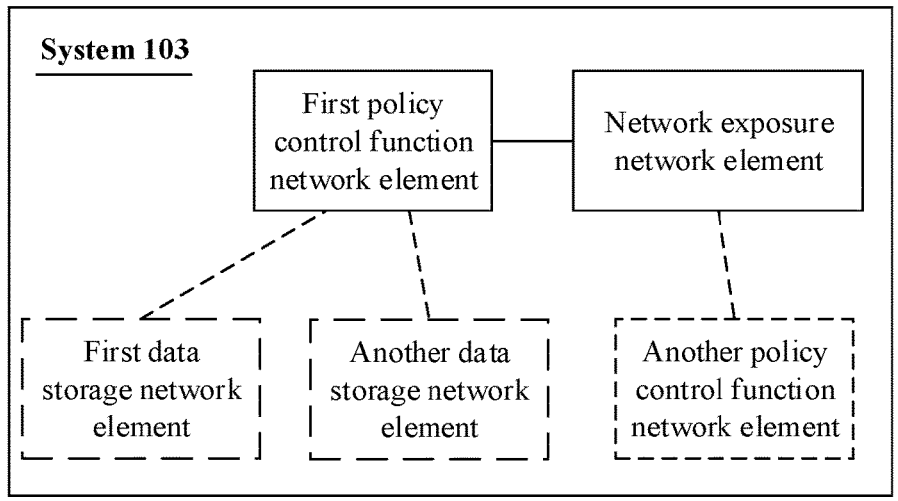
FIG. 3 is a schematic diagram of still another system architecture to which an embodiment of this application is applied.

FIG. 3 is a schematic diagram of a system architecture to which an embodiment of this application is applied. As shown in FIG. 3, a system 103 includes a first policy control function network element and a network exposure network element. The system 103 may be configured to perform still another method for managing a background data transfer policy in this embodiment of this application.

The network exposure network element is configured to send a fifth message to one or more policy control function network elements. The fifth message is used to request the policy control function network element to perform policy negotiation.

The first policy control function network element is configured to: select, based on the fifth message, a data storage network element from a first data storage network element set as a first data storage network element; send a first storage request to the first data storage network element, where the first storage request includes a first background data transfer policy and/or a first BDT reference identifier; and send a policy response message to the network exposure network element, where the policy response message includes the first BDT reference identifier and/or the first background data transfer policy. The first policy control function network element is a policy control function network element that first sends the policy response message and that is in the one or more policy control function network elements.

In a possible implementation, the network exposure network element is further configured to send the policy response message to a policy control function network element other than the first policy control function network element in the one or more policy control function network elements.

Optionally, the first policy control function network element is further configured to send a second storage request to any data storage network element in a second data storage network element set. The second storage request includes the first background data transfer policy and/or the first BDT reference identifier.

It should be noted that the first policy control function network element, the network exposure network element, and the like in FIG. 3 are merely names, and the names do not constitute a limitation on the devices. In a 5G network and another future network, the first policy control function network element and the network exposure network element may alternatively have other names. This is not specifically limited in the embodiments of this application. For example, the first policy control function network element or a second policy control function network element may alternatively be replaced with a PCF entity, or the first policy control function network element may be replaced with an H-PCF, and the network exposure network element may be replaced with an NEF entity. A description is provided herein, and details are not described below.

Optionally, the first policy control function network element and the network exposure network element in FIG. 3 each may be an independent network element, may be jointly implemented by a plurality of network elements, or may be used as a function module in a network element. This is not specifically limited in this embodiment of this application.

It should be understood that the systems in FIG. 1 to FIG. 3 may further include another network element that interacts or communicates with a network element in the figures. This is not limited.

It may be understood that the foregoing functions may be network elements in a hardware device, may be software functions running on dedicated hardware, or may be virtualized functions instantiated on a platform (for example, a cloud platform).

The terminal in the embodiments of this application may be a user equipment (UE), an access terminal, a terminal in vehicle-to-everything (V2X) communication, a subscriber unit, a subscriber station, a mobile station, a mobile station, a remote station, a remote terminal, a mobile device, a user terminal, a terminal device, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal may further include a V2X device, for example, a vehicle or an on-board unit (OBU) in a vehicle.

The terminal in the embodiments of this application is connected to a radio access network (RAN) device in a wireless manner. The radio access network device is connected to a core network device in a wireless or wired manner. The core network device and the radio access network device may be different physical devices independent of each other, or functions of the core network device and logical functions of the radio access network device may be integrated into a same physical device, or some functions of the core network device and some functions of the radio access network device may be integrated into one physical device. The terminal may be located at a fixed location, or may be mobile.

The radio access network device is an access device via which the UE is connected to the mobile communications system in a wireless manner, and may be a NodeB, an evolved NodeB (eNodeB), a gNodeB (gNB) in a 5G mobile communications system, a base station in a future mobile communications system, an access node in a Wi-Fi system, or a radio controller in a cloud radio access network (CRAN) scenario. Alternatively, the access network device may be a relay station, an access point, a vehicle-mounted device, a wearable device, a network device in a future 5G network, a network device in a future evolved PLMN network, or the like. A specific technology and a specific device form that are to be used for the radio access network device are not limited in the embodiments of this application.

For example, the core network device includes a mobility management entity (MME) or a broadcast/multicast service center (BMSC), or may include a corresponding function entity in a 5G system, for example, a network function of a control plane (CP) or user plane (UP) of a core network, such as a session management network function (SMF) or an access and mobility management function (AMF). The control plane of the core network may also be understood as a control plane function (CPF) entity of the core network.

Optionally, the system 101 shown in FIG. 1, the system 102 shown in FIG. 2, or the system 103 shown in FIG. 3 may be used in a 5G network and another possible future network. This is not specifically limited in the embodiments of this application.

Figure 4:
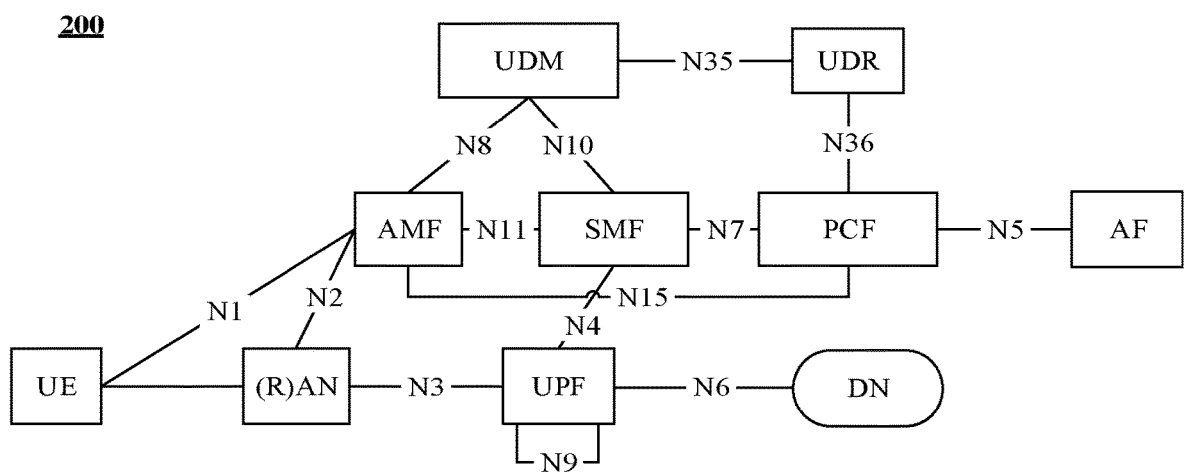
FIG. 4 is a schematic architectural diagram of a $5^{th}$ generation (5G) system to which this application is applied.
Figure 5:
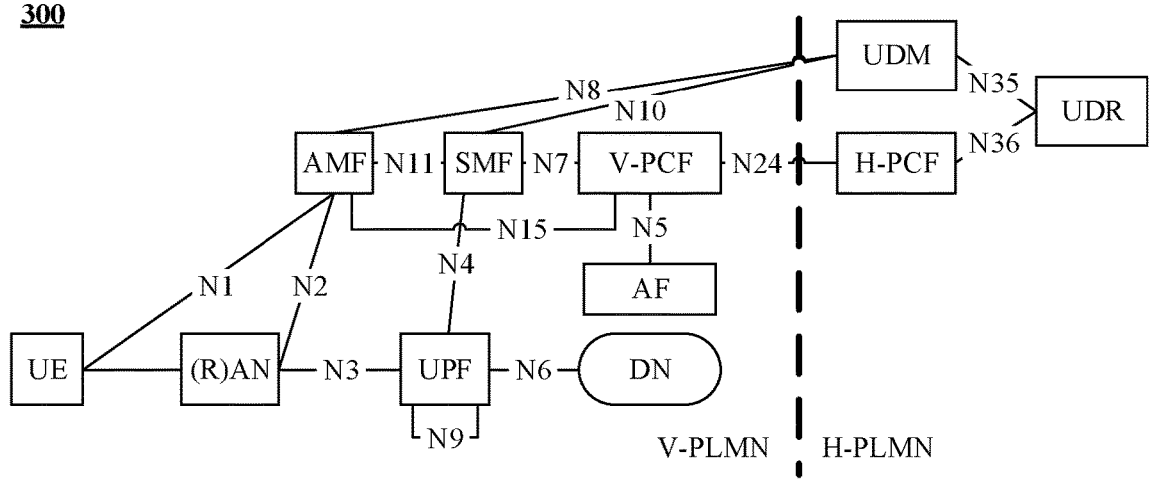
FIG. 5 is a diagram of a local roaming architecture to which an embodiment of this application is applied.
Figure 6:
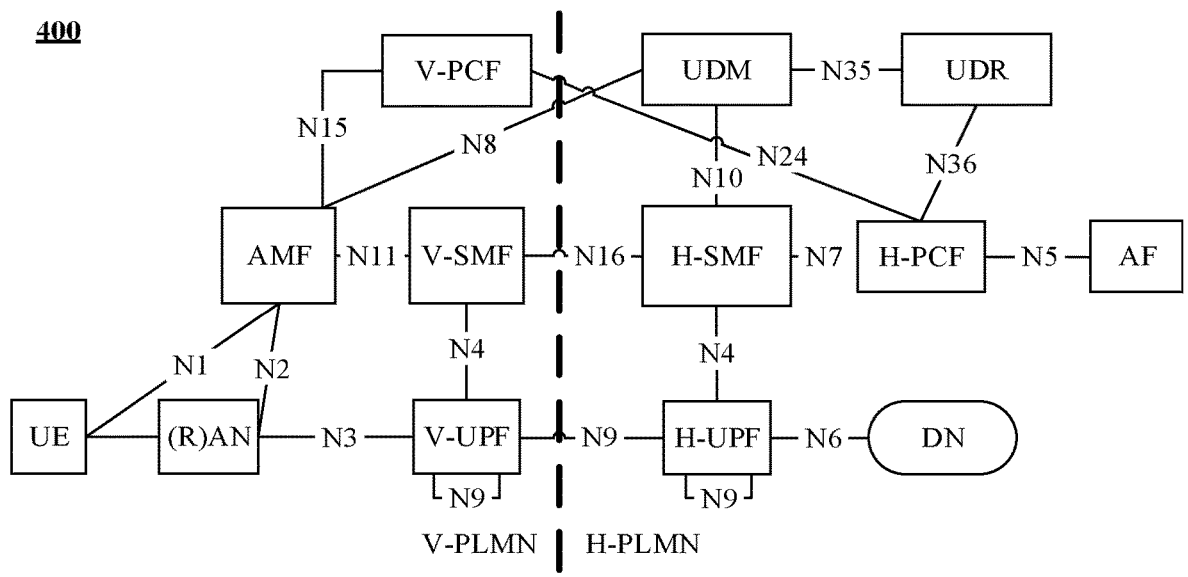
FIG. 6 is a diagram of a home-routed roaming architecture to which an embodiment of this application is applied.
Figure 7:
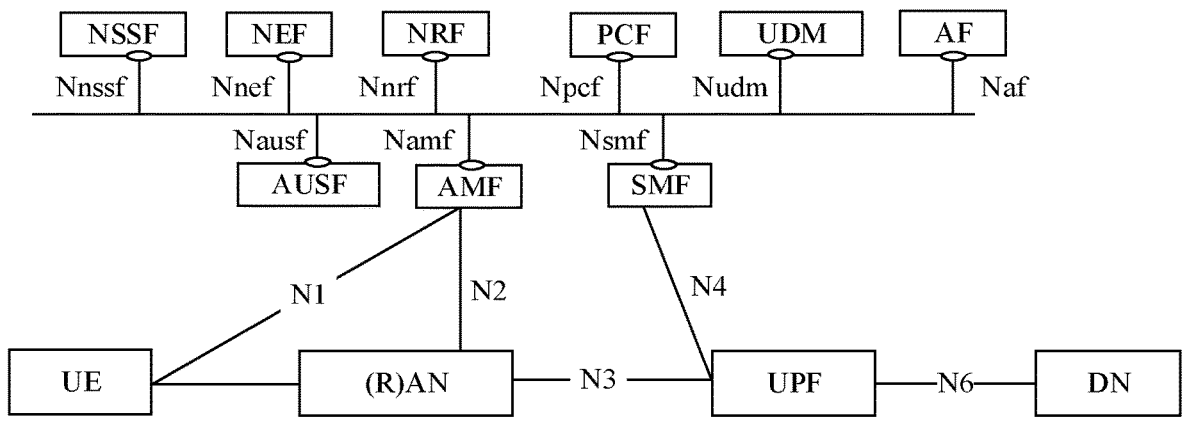
FIG. 7 is a schematic diagram of a service-based architecture of a 5G system to which this application is applied.

The system 101 shown in FIG. 1 is used in the 5G network. In this case, as shown in FIG. 4, for example, the foregoing first policy control function network element may be a PCF in 5G. Alternatively, as shown in FIG. 5 or FIG. 6, for example, the foregoing first policy control function network element may be an H-PCF in 5G. Alternatively, as shown in FIG. 7, the foregoing first policy control function network element may be a PCF in 5G. For example, as shown in FIG. 4, FIG. 5, or FIG. 6, the foregoing first data storage network element may be a UDR in 5G.

The system 102 shown in FIG. 2 is used in the 5G network. In this case, as shown in FIG. 4, for example, the foregoing policy control function network element may be a PCF in 5G. Alternatively, as shown in FIG. 5 or FIG. 6, for example, the foregoing policy control function network element may be an H-PCF in 5G. For example, as shown in FIG. 5, FIG. 6, or FIG. 7, the foregoing mobility management network element may be an AMF in 5G.

The system 103 shown in FIG. 3 is used in the 5G network. In this case, as shown in FIG. 4, for example, the foregoing first policy control function network element may be a PCF in 5G. Alternatively, as shown in FIG. 5 or FIG. 6, for example, the foregoing first policy control function network element may be an H-PCF in 5G. For example, as shown in FIG. 7, the foregoing network exposure network element may be an NEF in 5G.

The following describes 5G systems in different scenarios with reference to FIG. 4 to FIG. 7. It should be understood that the 5G systems described in this specification are merely examples, and do not constitute any limitation on this application.

FIG. 4 is a schematic architectural diagram of a basic 5G system 200. As shown in FIG. 4, the system 200 includes: an access and mobility management function (AMF), a session management function (SMF), a radio access network (RAN), unified data management (UDM), a policy control function (PCF), a data network (DN), a user plane function (UPF), a UE, an application function (AF), and a unified data repository (UDR). Optionally, the following functions (not shown in FIG. 4) may further be included in FIG. 4: a network slice selection function (NSSF), an authentication server function (AUSF), a network exposure function (NEF), a network repository function (NRF).

Main functions of the network elements are described as follows.

The AF may be understood as the name of an application function network element in a 5G architecture. The application function network element mainly transfers a requirement of an application side on a network side, for example, a quality of service (QoS) requirement. The AF may be a third-party function entity, or may be an application service deployed by an operator, for example, an Internet Protocol (IP) multimedia subsystem (IMS) voice call service.

The UDM may be understood as the name of a unified data management network element in the 5G architecture. The unified data management network element mainly includes the following functions: unified data management, supporting authentication credential processing in a $3^{rd}$ Generation Partnership Project (3GPP) authentication and key agreement mechanism, user identity processing, access authorization, registration and mobility management, subscription management, short message management, and the like.

The UDR may be understood as the name of a unified data repository network element in the 5G architecture. The unified data repository network element mainly includes the following functions: an access function of types of data such as subscription data, policy data, and application data.

The PCF may be understood as the name of a policy control function network element in the 5G architecture. The policy control function network element mainly includes policy control functions such as performing session-level or service flow-level charging, QoS bandwidth guarantee and mobility management, and UE policy decision. In this system, a PCF connected to the AMF is a PCF for access and mobility control (AM PCF), and a PCF connected to the SMF is a PCF for session management (SM PCF). In actual deployment, the AM PCF and the SM PCF may be different PCF entities.

The SMF may be understood as the name of a session management network element in the 5G architecture. The session management network element mainly performs functions such as session management, execution of a control policy delivered by the PCF, UPF selection, and UE IP address allocation.

The AMF may be understood as the name of a mobility management network element in the 5G architecture. The mobility management network element mainly includes the following functions: functions related to access and mobility, for example, connection management, mobility management, registration management, access authentication and authorization, reachability management, and security context management.

The UPF may be understood as the name of a user plane function network element in the 5G architecture. The user plane function network element mainly includes the following functions: functions related to a user plane, for example, data packet routing and transmission, packet detection, service usage reporting, QoS processing, lawful interception, uplink packet detection, and downlink data packet storage.

A (R)AN is a (radio) access network, and corresponds to different access networks in 5G, for example, a wired access network and a wireless base station access network.

A PDU session is a session service for implementing PDU connectivity between the UE and the data network, and may be identified by a PDU session ID.

The NSSF may be understood as the name of a network slice selection function network element in the 5G architecture. The network slice selection function network element mainly includes the following functions: selecting a group of network slice instances for the UE, determining an allowed NSSAI, determining an AMF set that can serve the UE, and the like.

The AUSF may be understood as the name of an authentication server function network element in the 5G architecture. The authentication server function network element mainly includes the following functions: an authentication server function, interacting with the unified data management network element to obtain user information, and performing an authentication-related function, for example, generating an intermediate key.

The NEF may be understood as the name of a network exposure network element in the 5G architecture. The network exposure network element mainly includes the following functions: securely opening a service and a capability that are provided by a 3GPP network function, which includes internal opening, opening the service and the capability to a third party, or the like; and converting or translating information exchanged with the AF and information exchanged between internal network functions, for example, an AF service identifier and internal 5G core network information, such as a data network name (DNN) and a single network slice selection assistance information (S-NSSAI).

The NRF may be understood as the name of a network repository function network element in the 5G architecture. The network repository function network element mainly includes the following functions: a service discovery function, and maintaining an NF profile of available network function (NF) instances and their supported services.

Functions of interfaces are described as follows.

N7 represents an interface between the PCF and SMF, and is configured to deliver a PDU session granularity and a service data flow granularity control policy.

N15 represents an interface between the PCF and the AMF, and is configured to deliver a UE policy and an access control related policy.

N5 represents an interface between the AF and the PCF, and is configured to deliver an application service request and report a network event.

N4 represents an interface between the SMF and UPF, and is configured to transmit information between the control plane and the user plane, including delivery of forwarding rules, QoS control rules, traffic statistics rules, and the like from the control plane to the user plane, and reporting of user-plane information.

N11 represents an interface between the SMF and the AMF, and is configured to: transfer PDU session tunnel information between the RAN and the UPF, transfer a control message to be sent to the UE; transfer radio resource control information to be sent to the RAN; and the like.

N2 represents an interface between the AMF and the RAN, and is configured to transmit radio bearer control information from the core network to the RAN and perform another operation.

N1 represents an interface between the AMF and the UE, is access-irrelevant, and is configured to transmit the QoS control rule to the UE and perform another operation.

N8 represents an interface between the AMF and the UDM, and is used by the AMF to obtain, from the UDM, subscription data related to access and mobility management and authentication data, and used by the AMF to register current mobility management related information of the UE with the UDM.

N10 represents an interface between the SMF and the UDM, and is used by the SMF to obtain, from the UDM, subscription data related to session management, and used by the SMF to register current session related information of the UE with the UDM.

N35 represents an interface between the UDM and UDR, and is used by the UDM to obtain user subscription data information from the UDR.

N36 represents an interface between the PCF and UDR, and is used by the PCF to obtain policy-related subscription data and application data related information from the UDR.

N3 represents an interface between the RAN and the UPF, and is configured to transmit user plane data between the RAN and the UPF.

N6 represents an interface between the UPF and the DN, and is configured to transmit the user plane data between the UPF and the DN.

N9 represents an interface between UPFs, for example, an interface between a visited-policy control function (V-PCF) and a home-policy control function (H-PCF), or an interface between a UPF connected to the DN and a UPF connected to the RAN, and is configured to transmit the user plane data between the UPFs.

In the 3rd Generation Partnership Project (3GPP) standard, two roaming modes for visitor access, local breakout roaming and home-routed roaming, are defined. The two roaming modes respectively correspond to the systems shown in FIG. 5 and FIG. 6.

FIG. 5 is a schematic architectural diagram of a 5G system 300 for local access roaming. As shown in FIG. 5, the system 300 includes: an AMF, an SMF, a (R)AN, a UDM, a visited-policy control function (V-PCF), a home-policy control function (H-PCF), a DN, a UPF, a UE, an AF, and a UDR. An interface between the V-PCF and the H-PCF is N24. It should be understood that, in FIG. 5, only the UDM, the UDR, and the H-PCF are located on a home public land mobile network (H-PLMN) side, and the other network elements are located on a visited public land mobile network (V-PLMN) side.

Referring to FIG. 5, in the roaming architecture, both the AMF and the SMF are located in the V-PLMN. In this case, a session management function is performed by the SMF function entity in the V-PLMN. In addition, the V-PCF connected to the AMF corresponds to an AM PCF, and the V-PCF connected to the SMF corresponds to an SM PCF. The AM PCF and the SM PCF may be different PCF entities in an actual scenario. A user route selection policy in this application may be provided by the H-PCF in this architecture.

FIG. 6 is a schematic architectural diagram of a 5G system 400 for home access roaming. A difference between FIG. 6 and FIG. 5 lies in that a home user plane function (H-UPF) and a home session management function (H-SMF) are added to the system 400. In other words, a V-PLMN side and an H-PLMN side each include a UPF and an SMF. The UPF on the V-PLMN side is connected to the UPF on the H-PLMN side through an N9 interface, and the UPF on the H-PLMN side is connected to a DN through the N9 interface. A V-SMF on the V-PLMN side is connected to the H-SMF on the H-PLMN side through an N11 interface, the H-SMF is connected to the UPF on the H-PLMN side through an N4 interface, and the H-SMF is connected to a UDM through an N10 interface. An H-PCF is connected to an AF through an N5 interface.

Referring to FIG. 6, in the roaming architecture, an AMF is located in a V-PLMN, and a session management function is performed by the H-SMF. In addition, in this application, the H-PCF connected to a V-PCF corresponds to an AM PCF, and the H-PCF connected to the H-SMF corresponds to an SM PCF. The AM PCF and the SM PCF may be different PCF entities or a same PCF entity in an actual scenario. A user route selection policy in this application may be provided by the H-PCF in this architecture.

It should be understood that the SM PCF is a policy control function entity connected to the SMF, and is responsible for performing a policy rule decision function for session management. The AM PCF is a policy control function entity directly connected to the AMF, and is responsible for performing a policy rule decision function for an access control policy and a UE policy.

It should be noted that names of the network elements (such as the V-PCF, the H-PCF, and the AMF) included in FIG. 4, FIG. 5, or FIG. 6 are merely names, and the names do not constitute any limitation on the functions of the network elements. In a 5G network and another future network, the foregoing network elements may alternatively have other names. This is not specifically limited in the embodiments of this application. For example, in a 6G network, some or all of the foregoing network elements may still use terms in 5G, or may use other names, or the like. A description is provided herein, and details are not described below.

A person skilled in the art may understand that the network elements in FIG. 4 to FIG. 6 are merely examples for description, and another network element that interacts with the network element shown in the figures may further be included actually. Details are not described herein.

It should be further noted that communication between network elements having control plane functions in FIG. 4 to FIG. 6 is described using a non-service-based interface as an example. This does not constitute a limitation on the protection scope of the embodiments of this application. A person skilled in the art may understand that the network elements having the control plane functions in FIG. 4 to FIG. 6 may alternatively communicate with each other through a service-based interface. For example, an external service-based interface provided by the AMF may be Namf, a service-based interface provided by the SMF may be Nsmf; an external service-based interface provided by the UDM may be Nudm; a service-based interface provided by the AF may be Naf; and an external service-based interface provided by the PCF may be Npcf.

FIG. 4 to FIG. 6 show architectures based on reference points, and do not constitute a limitation on the embodiments of this application. FIG. 7 is a schematic diagram of an architecture based on a service-based interface. As shown in FIG. 7, an NSSF, an AUSF, a UDM, an NEF, an NRF, a PCF, an AF, an AMF, an SMF, a UE, an RAN, a UPF, and a DN are included. In FIG. 7, an external service-based interface provided by the NSSF may be Nnssf, an external service-based interface provided by the NEF may be Nnef, an external service-based interface provided by the NRF may be Nnrf, an external service-based interface provided by the AMF may be Namf, a service-based interface provided by the SMF may be Nsmf, an external service-based interface provided by the UDM may be Nudm, a service-based interface provided by the AF may be Naf, an external service-based interface provided by the PCF may be Npcf, and an external service-based interface provided by the AUSF may be Nausf. An interface between a control plane function and the RAN and an interface between the control plane function and the UPF are non-service-based interfaces. The UE is connected to the AMF through an N1 interface, and the UE is connected to the RAN using a radio resource control (RRC) protocol. The RAN is connected to the AMF through an N2 interface, and the RAN is connected to the UPF through an N3 interface. The UPF is connected to the DN through an N6 interface. In addition, for related descriptions of connecting the UPF to the SMF through an N4 interface, refer to a 5G system architecture (5G system architecture) in the 3GPP standard Technical Specification (TS) 23.501. For brevity, a connection relationship of an architecture 201 is not described herein.

For working processes and beneficial effects of the network elements in the systems in FIG. 1 to FIG. 7, refer to descriptions in the following method embodiments.

Figure 8:
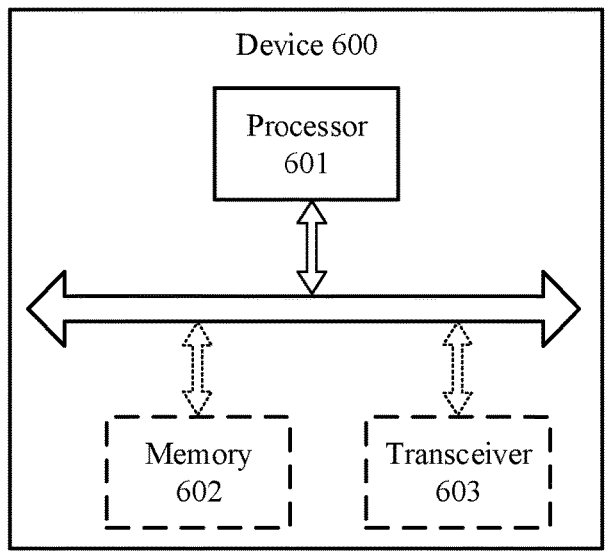
FIG. 8 is a schematic block diagram of a computer device to which an embodiment of this application is applied.

FIG. 8 is a schematic block diagram of a computer device 600 (or an apparatus for managing a background data transfer policy) used in an embodiment of this application. The first policy control function network element, the second policy control function network element, or the network exposure network element in FIG. 1 may be implemented using the computer device 600 in FIG. 8. Alternatively, the PCF in FIG. 4, the H-PCF in FIG. 5, the H-PCF in FIG. 6, or the PCF or the NEF in FIG. 7 may be implemented using the computer device 600 in FIG. 8. Alternatively, the network exposure network element in FIG. 1 may be implemented using the computer device 600 in FIG. 8. Alternatively, the NEF in FIG. 7 may be implemented using the computer device 600 in FIG. 8.

It should be understood that the computer device 600 may be a physical device, a component (for example, an integrated circuit or a chip) of a physical device, or a function module in a physical device.

As shown in FIG. 8, the computer device 600 includes one or more processors 601. The processor 601 may store an executable instruction used to perform the method in the embodiments of this application. Optionally, the processor 601 may invoke an interface to implement receiving and sending functions. The interface may be a logical interface or a physical interface. This is not limited. For example, the interface may be a transceiver circuit or an interface circuit. A transceiver circuit or an interface circuit configured to implement the receiving function and a transceiver circuit or an interface circuit configured to implement the sending function may be separated or may be integrated together. The transceiver circuit or the interface circuit may be configured to read and write code/data; or the transceiver circuit or the interface circuit may be configured to transmit or transfer a signal.

Optionally, the interface may be implemented using a transceiver. Optionally, the computer device 600 may further include a transceiver 603. The transceiver 603 may be referred to as a transceiver unit, a transceiver machine, a transceiver circuit, a transceiver, or the like, and is configured to implement a transceiver function.

Optionally, the computer device 600 may further include a memory 602. A specific deployment location of the memory 602 is not specifically limited in this embodiment of this application. The memory 602 may be integrated into the processor 601, or may be independent of the processor 601. If the computer device 600 does not include the memory, the computer device 600 only needs to have a processing function, and the memory may be deployed at another location (for example, in a cloud system).

The processor 601, the memory 602, and the transceiver 603 communicate with each other through an internal connection path, to transfer a control signal and/or a data signal.

It may be understood that, although not shown, the computer device 600 may further include another apparatus, such as an input apparatus, an output apparatus, or a battery.

Optionally, in some embodiments, the memory 602 may store the executable instruction used to perform the method in the embodiments of this application. The processor 601 may execute the instruction stored in the memory 602, to complete, in combination with other hardware (for example, the transceiver 603), steps to be performed in the following methods. For a working process and beneficial effect, refer to descriptions in the following method embodiments.

The method disclosed in the embodiments of this application may be applied to the processor 603, or implemented by the processor 603. The processor 603 may be an integrated circuit chip and has a signal processing capability. In an implementation process, the steps of the method may be performed using a hardware integrated logical circuit in the processor, or using an instruction in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed and accomplished using a combination of hardware and software modules in a decoding processor. The software module may be located in a mature storage medium in the art, such as a random-access memory (RAM), a flash memory, a read-only memory (ROM), a programmable read-only memory, an electrically erasable programmable memory, or a register. The storage medium is located in the memory, and the processor reads the instruction in the memory and completes the steps of the foregoing methods in combination with hardware in the processor.

It may be understood that the memory 602 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) and may serve as an external cache. Through example descriptions rather than limitative descriptions, RAMs in many forms may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random access memory (DR RAM). It should be noted that the memories in the systems and methods described in this specification include but are not limited to these memories and any memory of another proper type.

The computer device 600 may be a general-purpose computer device or a dedicated computer device. During implementation, the computer device 600 may be a desktop computer, a portable computer, a network server, a personal digital assistant (PDA), a mobile phone, a tablet computer, a wireless terminal device, a communications device, an embedded device, or a device having a structure similar to that shown in FIG. 8. A type of the computer device 600 is not limited in this embodiment of this application.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

For ease of understanding, before the method for managing a background data transfer policy in the embodiments of this application is described, terms or concepts in this application are first briefly described.

A background data transfer (BDT) mechanism means that an application function (AF) may negotiate a background data transfer policy with an operator network in advance, where the background data transfer policy includes a specific transfer time window (for example, a transfer time window in idle time); within a negotiated time window, the AF sends a service request to a network side; and the network side makes a policy decision based on the negotiated background data transfer policy.

The negotiated time window may be provided to a terminal as a part of a user route selection policy (URSP), and is used by the terminal to establish a dedicated protocol data unit (PDU) session to transfer a background data transfer service.

Background data transfer mainly includes the following three processes: 1. A background data transfer policy is negotiated. 2. The background data transfer policy may be sent to a terminal as a part of a URSP, and then the terminal determines, based on URSP information, to reuse or initiate PDU session establishment. 3. After a PDU session is established, an AF requests policy authorization from a PCF. In the request process, the AF carries a background data transfer reference identifier, for example, a background data transfer reference ID (BDT reference ID), such that the PCF obtains corresponding background data transfer policy information based on the BDT reference ID.

In a 5G system, a UDM, a PCF, and an NEF are allowed to store data in a UDR. The data stored in the UDR includes: subscription data, policy data, structured data used for opening, an application data packet used for application detection, and the like. A PLMN network may include a plurality of UDRs. The UDRs may provide different data packet sets or data subsets (for example, the subscription data, the policy data, the application data, and the data for opening). The UDM, the PCF, and the NEF can read, update, delete, or subscribe to a data change notification in the UDR through an Nudr interface.

To make a person skilled in the art better understand this application, the method for managing a background data transfer policy provided in this application is described below using examples and with reference to the 5G system described in this specification.

Figure 9:
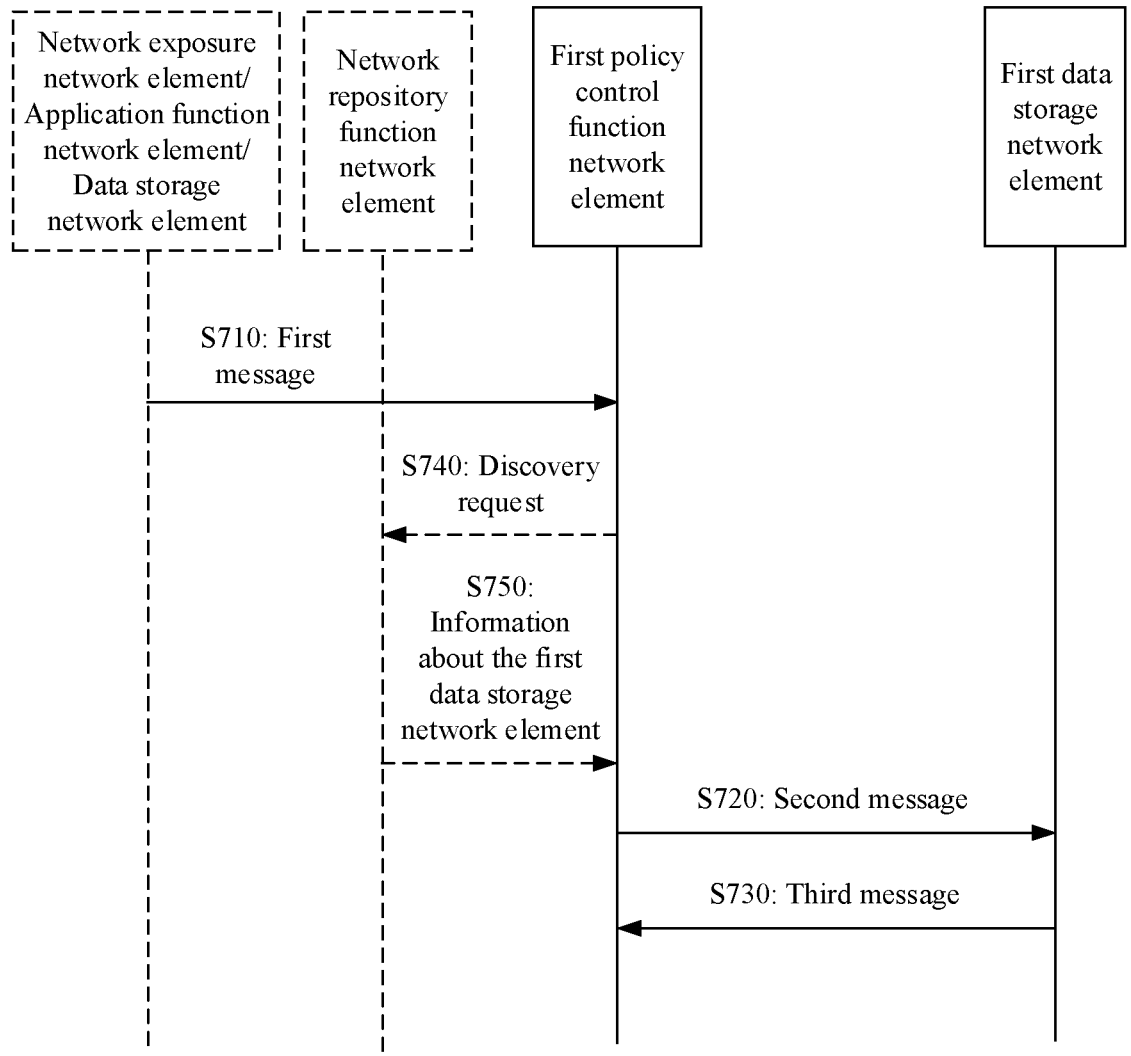
FIG. 9 is a schematic flowchart of a method for managing a background data transfer policy according to an embodiment of this application.

FIG. 9 is a schematic flowchart of a method 700 for managing a background data transfer policy according to an embodiment of this application. It should be understood that, content transmitted in the interaction procedure in FIG. 9 may be received or sent through a message in an existing standard. For a meaning of the message, refer to a description in the standard. Alternatively, to-be-received content or to-be-sent content may be received or sent through a newly defined message. This is not limited. As shown in FIG. 9, the method 700 includes the following steps.

S710: A first policy control function network element receives a first message. The first message carries a first identifier, and the first identifier is a background data transfer reference identifier or an application function identifier.

Optionally, the first message may be sent by a network exposure network element to the first policy control function network element, may be sent by another policy control function network element to the first policy control function network element, may be sent by an application function network element to the first policy control function network element, or may be sent by a data storage network element to the first policy control function network element. This is not limited.

For example, after a PDU session is established, the application function network element or the network exposure network element may determine, based on address information of a terminal, a policy control function network element that serves the PDU session of the terminal, for example, the first policy control function network element. When the application function network element can directly interact with the first policy control function network element, the first message may be a session authorization request sent by the application function network element. Correspondingly, the first policy control function network element may send a policy request message to a first data storage network element based on the session authorization request.

For example, when the application function network element cannot directly interact with the first policy control function network element, the first message may be a session authorization request sent by the application function network element to the first policy control function network element via the network exposure network element. Correspondingly, the first policy control function network element sends a policy request message to the first data storage network element based on the session authorization request.

Optionally, the first identifier may include both the background data transfer reference identifier and the application function identifier, or may include only one of the background data transfer reference identifier or the application function identifier. For example, the background data transfer reference identifier is a BDT reference ID, and the application function identifier is an AF ID. Optionally, in this embodiment of this application, the AF ID may alternatively be replaced with an application ID. This is not limited.

Optionally, the first message may further include identifier information corresponding to the terminal. For example, the identifier information corresponding to the terminal is a subscription permanent identifier of the terminal, for example, a subscriber permanent identifier (SUPI). For another example, the identifier information corresponding to the terminal is an address of the terminal, for example, an IP address or an Ethernet address. For still another example, the identifier information corresponding to the terminal is a generic public subscription identifier (GPSI). For yet another example, the identifier information corresponding to the terminal may be a group identifier corresponding to the terminal, for example, a terminal group ID.

S720: The first policy control function network element sends a second message to the first data storage network element (for example, a UDR). The second message is used to obtain a background data transfer policy, and the second message carries the first identifier. Correspondingly, the first data storage network element receives the second message from the first policy control function network element.

Herein, one or more background data transfer policies are pre-stored in the first data storage network element. It should be understood that the background data transfer policy stored in the first data storage network element may be stored by the first policy control function network element, or may be stored by another policy control function network element. This is not limited.

A process in which a policy control function network element stores the background data transfer policy in the first data storage network element may be considered as a background data transfer policy negotiation process. In other words, a policy control function network element performing the background data transfer policy negotiation process and a policy control function network element requesting to obtain the background data transfer policy may be a same policy control function network element, or may be different policy control function network elements. This is not specifically limited in this embodiment of this application.

S730: The first data storage network element sends a third message to the first policy control function network element. The third message includes a first background data transfer policy corresponding to the first identifier. Correspondingly, the first policy control function network element receives the third message from the first data storage network element.

In this embodiment of this application, after obtaining the first identifier, the first policy control function network element may send the request message to the first data storage network element, to expect to obtain the background data transfer policy corresponding to the first identifier. After receiving the second message, the first data storage network element may send, to the first policy control function network element, the first background data transfer policy corresponding to the first identifier, such that the first policy control function network element can obtain a proper background data transfer policy corresponding to the terminal.

Before sending the second message to the first data storage network element, the first policy control function network element needs to select or discover the first data storage network element. The first data storage network element may be discovered by the first policy control function network element by performing a network element discovery process. The following provides detailed descriptions. Optionally, the method 700 further includes the following steps:

S740: The first policy control function network element sends a discovery request to a network repository function network element (for example, an NRF). The discovery request is used to request to discover a data storage network element. Correspondingly, the network repository function network element receives the discovery request from the first policy control function network element.

S750: The network repository function network element sends information about the first data storage network element to the first policy control function network element. Correspondingly, the first policy control function network element receives the information about the first data storage network element from the network repository function network element. Herein, the network repository function network element may return information about one or more data storage network elements to the first policy control function network element, and the first policy control function network element may select the first data storage network element from the one or more data storage network elements. The information about the one or more data storage network elements includes the information about the first data storage network element.

Optionally, the information about the first data storage network element may include one or more of the following information: an identifier of the first data storage network element, a type of the first data storage network element, an address of the first data storage network element, a type of data stored in the first data storage network element, and the like.

The first policy control function network element selects the first data storage network element based on the information about the first data storage network element. In this way, the first policy control function network element may send the second message to the selected first data storage network element, to request the BDT policy.

Herein, after obtaining specific information of the first data storage network element sent by the network repository function network element, the first policy control function network element may learn of a data storage network element that is configured to store the BDT policy, to select a correct data storage network element, for example, the first data storage network element.

In an implementation, the first policy control function network element may request the network repository function network element to discover a data storage network element that is configured to store the background data transfer policy. For example, the first policy control function network element sends a discovery request message to the network repository function network element, where the discovery request message includes indication information. The indication information is used to indicate the network repository function network element to discover the data storage network element storing the background data transfer policy. Correspondingly, the network repository function network element may return the identifier of the first data storage network element to the first policy control function network element, such that the first policy control function network element sends the second message to the first data storage network element based on the identifier.

In another implementation, the first policy control function network element sends, to the network repository function network element, the request used to request to discover the data storage network element. Correspondingly, the network repository function network element may return the identifier of the first data storage network element and the type of the first data storage network element to the first policy control function network element. The type of the first data storage network element means that the first data storage network element is a data storage network element supporting storage of the background data transfer policy. In this way, the first policy control function network element may send the second message to the first data storage network element based on the identifier. For example, the first data storage network element is a UDR. The information about the first UDR may include one or more of the following: a fully qualified domain name (FQDN) or an internet protocol (IP) address of a UDR instance, a data set identifier (for example, application data or policy data), or a data subset identifier (for example, BDT policy data).

In still another implementation, the first policy control function network element sends, to the network repository function network element, the request used to request to discover the data storage network element. Correspondingly, the network repository function network element may return the identifier of the first data storage network element and first indication information to the first policy control function network element. The first indication information indicates that the first data storage network element is configured to store the background data transfer policy. Herein, the first policy control function network element may learn, based on the first indication information, of the type of data stored by the first data storage network element, where to be more specific the first data storage network element supports storage of the background data transfer policy, and then send the second message to the first data storage network element based on the identifier. For example, the first data storage network element is a UDR. The information about the UDR may include one or more of the following: a fully qualified domain name FQDN or an internet protocol IP address of a UDR instance, a data set identifier (for example, policy data or application data), or a data subset identifier (for example, BDT policy data); or include one or more of the following: an FQDN or IP address of a UDR instance, a data set identifier (application data), a data subset identifier (policy data), or a data keyword (BDT policy).

It should be understood that the foregoing listed three implementations are merely examples for description, and do not constitute a limitation on the protection scope of the embodiments of this application. For example, a person skilled in the art may properly combine the foregoing three implementations, and a combined implementation also falls within the protection scope of the embodiments of this application.

After obtaining the first background data transfer policy corresponding to the first identifier, the first policy control function network element may send the first background data transfer policy to a data storage network element that stores policy control data of the terminal, to store the first background data transfer policy in PDU session policy control subscription information (where for example, the PDU session policy control subscription information may alternatively be replaced with the subscription information) of the terminal and/or context policy control data of the terminal that are/is of the UDR. Optionally, the first message further includes the identifier information corresponding to the terminal, and the method 700 further includes: The first policy control function network element sends context information of the terminal to a second data storage network element. The context information of the terminal is determined based on the first background data transfer policy. Optionally, the context information of the terminal includes a time window and/or network area information. The second data storage network element is a data storage network element that supports storage and/or obtaining of information about the terminal, for example, a UE UDR.

Herein, the first policy control function network element may receive the first message sent by the network exposure network element. The first message includes the identifier information corresponding to the terminal and the first identifier. The identifier information corresponding to the terminal may be the SUPI. The network exposure network element may obtain the first identifier and an external identifier of the terminal via the application function network element. In addition, the network exposure network element obtains the SUPI of the terminal by converting the external identifier of the terminal sent by the application function network element (where a person skilled in the art may understand that the external identifier of the terminal is used by a third-party network element to identify the terminal). The first policy control function network element may select a corresponding data storage network element based on the SUPI of the terminal, for example, the second data storage network element. Optionally, one data storage network element may be selected for a same group of SUPIs (for example, an SUPI 1, an SUPI 2, . . . , and so on). Correspondingly, the first policy control function network element sends context information corresponding to the group of SUPIs to the second data storage network element. For example, a sending format may be {SUPI 1, SUPI 2, . . . , context information of the terminal}, or the following sending format may be used: {SUPI 1, context information of the terminal}, {SUPI 2, context information of the terminal} . . . , and so on.

For example, the context information of the terminal that is generated by the first policy control function network element may include the context policy control information and the PDU session control context policy information that are of the terminal. For example, the context policy control information of the terminal includes one or more of the following: the AF ID, the time window, or the network Area. For another example, the PDU session control context policy information includes one or more of the following: a data network name (DNN), a single network slice selection assistance information (S-NSSAI), the AF ID, the time window, a charging rate, a maximum bit rate (MBR), or the network area. In this case, when the terminal initiates a PDU session to a network based on the URSP, the second policy control function network element serving the terminal may obtain corresponding BDT transfer policy information based on the DNN+S-NSSAI/the DNN. The DNN and the S-NSSAI that are included in the PDU session control context policy information, or the DNN included in the PDU session control context policy information may be provided by the application function network element, or may be generated by the first policy control function network element based on an identifier of the application function network element, for example, the AF ID.

Therefore, after obtaining the first background data transfer policy, the first policy control function network element may generate the context information of the terminal, and send the context information of the terminal to the data storage network element of the terminal for subsequent use by the terminal.

Figure 10:
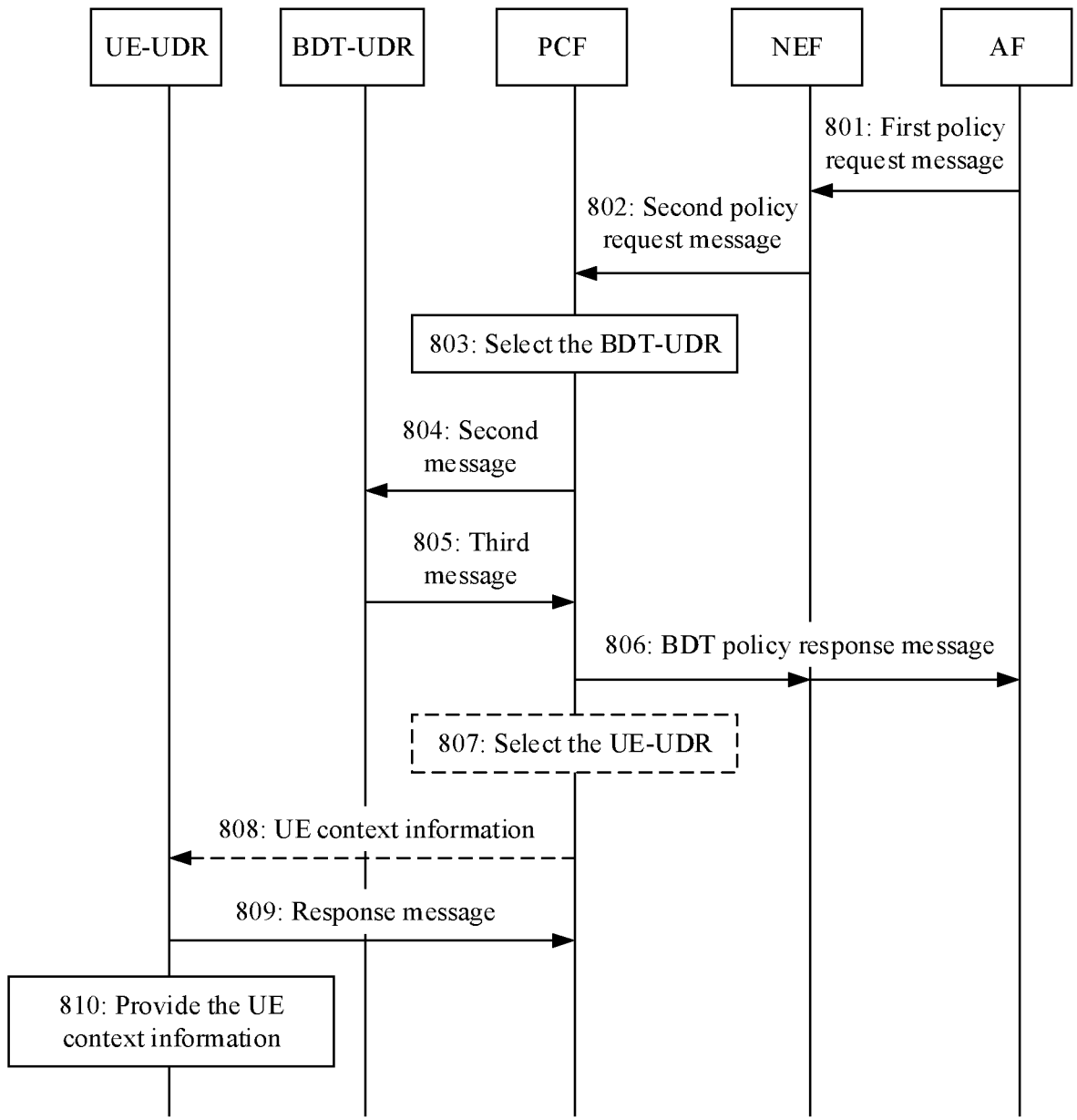
FIG. 10 is a schematic interaction diagram of an example of a method for managing a background data transfer policy according to an embodiment of this application.
Figure 11:
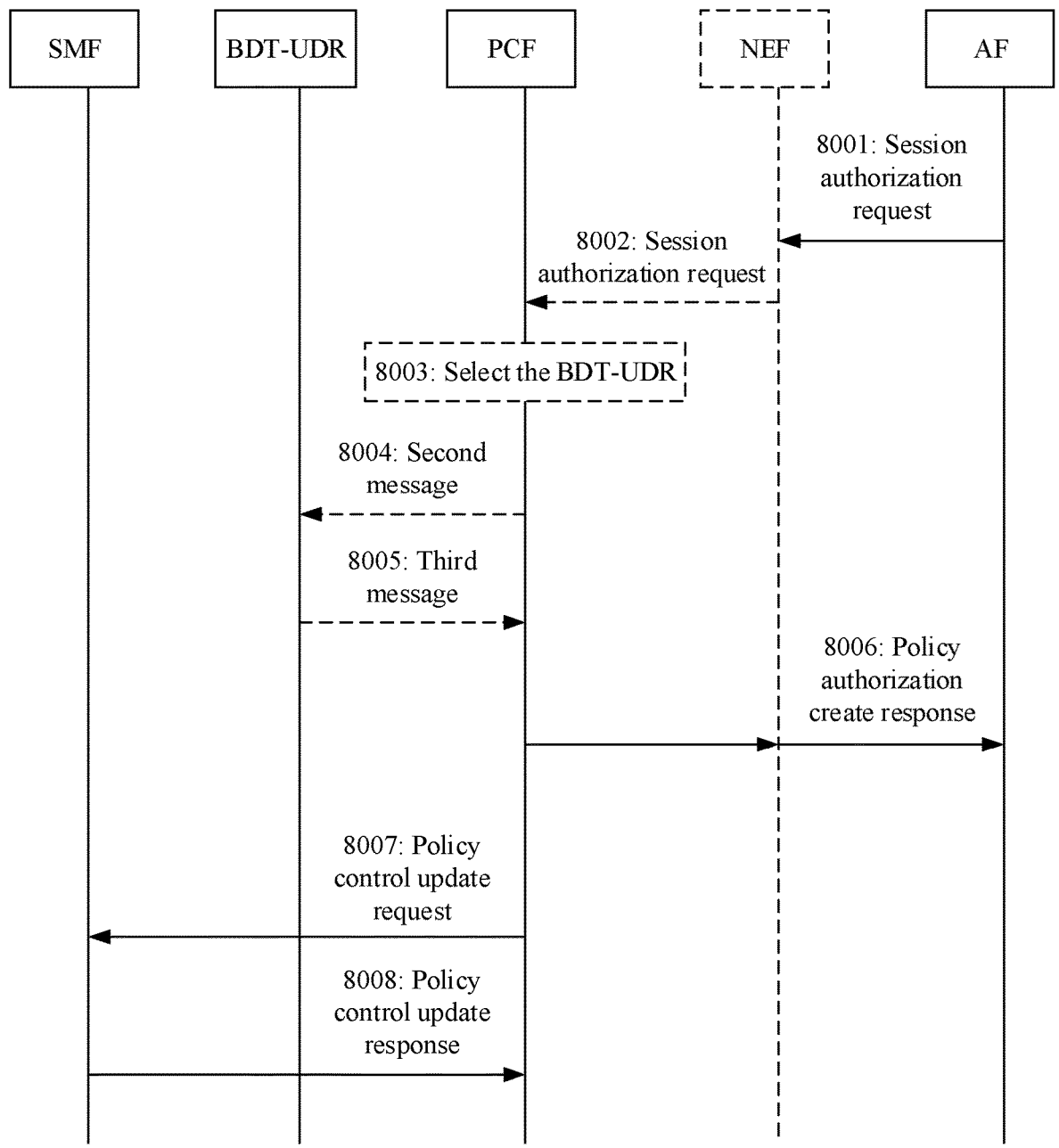
FIG. 11 is a schematic interaction diagram of another example of a method for managing a background data transfer policy according to an embodiment of this application.

For ease of understanding, descriptions are provided herein with reference to examples in FIG. 10 and FIG. 11. FIG. 10 and FIG. 11 are described using examples in which the application function network element is an AF, the first policy control function network element is a PCF, the first data storage network element is a BDT-UDR (namely, a UDR that supports storage and/or obtaining of BDT policy data), the second data storage network element is a UE-UDR (namely, a UDR that supports storage and/or obtaining of user data), and the network exposure network element is an NEF. A unified description is provided herein. The first data storage network element in this embodiment of this application may be a BDT-UDR. The BDT-UDR is a UDR that supports storage and/or obtaining of BDT policy data. This explanation is applicable to all embodiments of this application.

FIG. 10 shows a procedure of delivering a BDT policy as a part of a URSP. As shown in FIG. 10, the following steps are included.

801: The AF sends a first policy request message to the NEF.

For example, the AF determines to deliver a BDT transfer policy as a part of a URSP, or the AF determines that a BDT policy is used for a future PDU session; and then sends the first policy request message to the NEF. The first policy request message includes an external identifier of UE and a BDT reference ID, includes an external identifier of UE and an AF ID, or includes an external identifier of UE, an AF ID, and a BDT reference ID. For example, the first policy request message is an Nnef_BDTUEpolicy_Create request.

802: The NEF sends a second policy request message to the PCF.

For example, a UDM stores a correspondence between the external identifier of the UE and a SUPI. The NEF may obtain the SUPI of the UE by querying the UDM based on the external identifier of the UE. The NEF may send the second policy request message to the PCF. The second policy request message includes a SUPI of the UE and the BDT reference ID, includes an SUPI of the UE and the AF ID, or includes an SUPI, the AF ID, and the BDT reference ID.

Optionally, the NEF may alternatively store, in an APP-UDR, information in the first policy request message sent by the AF, such that the APP-UDR sends the information to the PCF. For example, the information includes the AF ID, the BDT reference ID, the SUPI, or a group identifier. Optionally, the information may further include BDT policy information. The APP-UDR supports storage or obtaining of application-related information.

803: The PCF selects the BDT-UDR based on the second policy request message sent by the NEF.

Herein, the PCF may send a UDR discovery request to an NRF based on the BDT reference ID or the AF ID in the second policy request message, and then the NRF may send information about a BDT-UDR to the PCF, such that the PCF selects a corresponding BDT-UDR based on the information about the BDT-UDR.

Optionally, if the NEF provides information requested by the AF to the PCF via the APP-UDR in step 802, the PCF determines, based on the information sent by the APP-UDR, to select the BDT-UDR to obtain the BDT policy. The APP-UDR may be the same as or different from the BDT-UDR. Alternatively, optionally, if the information provided by the AF includes the BDT policy, a BDT policy obtaining procedure does not need to be performed.

804: The PCF sends a second message to the BDT-UDR to obtain the BDT policy.

The PCF obtains the BDT policy from the BDT-UDR. The second message may include the BDT reference ID or the AF ID. For example, the second message is an Nudr_DM_Query request.

805: The BDT-UDR sends a third message to the PCF.

If the second message includes the BDT reference ID, the third message includes a BDT policy corresponding to the BDT reference ID; or if the second message includes the AF ID, the third message includes a BDT policy corresponding to the AF ID. For example, the third message is an Nudr_DM_Query response.

In a BDT policy negotiation process, the BDT policy corresponding to the BDT reference ID or the BDT policy corresponding to the AF ID has been stored in the BDT-UDR. Therefore, the BDT-UDR may index a corresponding BDT policy based on an identifier included in the second message.

806: The PCF sends a BDT policy response message to the NEF. For example, the BDT policy response message is an Npcf_BDTUEpolicy_Create response. Further, the NEF may send the BDT policy response message to the AF. For example, the NEF sends the Nnef_BDTUEpolicy_Create response to the AF.

Optionally, in step 807, the PCF selects the UE-UDR based on the SUPI of the UE.

The PCF selects the UE-UDR based on the SUPI received in step 802.

Herein, step 807 is optional. This is because if the selected UDR configured to obtain the BDT policy supports storage of terminal information, the BDT-UDR is used. That is, the BDT-UDR and a UDR of the UE are a same UDR. If the selected UDR that obtains the BDT policy does not support storage of terminal information, the PCF selects a new UDR based on the SUPI of the UE.

Optionally, in step 808, the PCF sends UE context information to the UE-UDR.

For example, the PCF sends the UE context information to the UE UDR through an Nudr_DM_Create request. For example, the Nudr_DM_Create request includes {SUPI, Data set=Policy, Data subset=PDU Session policy control data or UE context policy control data, UE context information}. The UE context information may include context policy control information and PDU session control context information that are of the UE. For example, the context policy control information of the UE includes one or more of the following: the AF ID, a time window, or a network area; and the PDU session control context policy information includes one or more of the following: a DNN+S-NSSAI/a DNN, the AF ID, the time window, a charging rate, an MBR, or the network area. In this case, when the UE subsequently initiates a PDU session to a network based on the URSP, the PCF obtains a corresponding BDT transfer policy based on a specific DNN and S-NSSAI, or based on the DNN. The DNN and the S-NSSAI, or the DNN may be provided by the AF, or may be generated by the PCF based on the AF ID.

Optionally, the PCF may send Nudr_DM_Update to the UE UDR, where Nudr_DM_Update includes the UE context information. For example, Nudr_DM_Update includes {SUPI, Data set=Policy, Data subset=PDU Session policy control, context information of the UE}. An explanation of the UE context information is the same as that described above.

809: The UE-UDR sends a response message to the PCF. For example, the response message is an Nudr_DM_Create response.

810: The UE-UDR provides the UE context information.

For example, if the UE registers with the network, the UE-UDR sends the UE context information (the context policy control information and the PDU session control context information that are of the UE) to a PCF associated with the UE, such that the PCF associated with the UE generates a URSP based on the UE context information. The generated URSP may be sent to the UE via the AMF.

FIG. 11 shows a procedure of delivering a BDT policy not as a part of a URSP. In FIG. 11, after a PDU session is established, the AF or the NEF may determine, based on an address of UE, the PCF that serves the PDU session of the UE, and send a session authorization request to the PCF. As shown in FIG. 11, the following steps are included.

8001: The AF sends the session authorization request. The session authorization request includes the address of the UE and a BDT reference ID.

When the AF can directly interact with the PCF, step 8001 may be: The AF directly sends the session authorization request to the PCF. For example, the session authorization request may be an Npcf PolicyAuthorization_Create request. Optionally, the AF may obtain an identifier of the PCF based on the address of the UE using a binding support function (BSF).

When the AF cannot directly interact with the PCF, step 8001 may be: The AF sends the session authorization request to the NEF. For example, the session authorization request may be an Nnef_PolicyAuthorization_Create request. That is, the AF sends the session authorization request to the PCF via the NEF.

Optionally, in 8002, the NEF forwards the session authorization request to the PCF.

The NEF obtains, based on the address of the UE in the request sent by the AF, the identifier of the PCF using the BSF, and sends the session authorization request to the PCF.

Optionally, in 8003, the PCF determines to select the BDT-UDR.

Herein, the PCF determines to select the BDT-UDR based on the session authorization request sent by the NEF or the session authorization request sent by the AF. For example, the PCF determines to select the BDT-UDR based on the BDT reference ID in the request. Herein, the PCF may send a UDR discovery request to an NEF based on the BDT reference ID or the AF ID in the session authorization request, and then the NEF may send information about a BDT-UDR to the PCF, such that the PCF selects a corresponding BDT-UDR based on the information about the BDT-UDR.

Optionally, in 8004, the PCF may send a second message to the BDT-UDR to obtain a BDT policy.

The PCF obtains the BDT policy from the BDT-UDR. The second message may include the BDT reference ID or the AF ID. For example, the second message is an Nudr_DM_Query request.

Optionally, in 8005, the BDT-UDR may send a third message to the PCF.

If the second message includes the BDT reference ID, the third message includes a BDT policy corresponding to the BDT reference ID; or if the second message includes the AF ID, the third message includes a BDT policy corresponding to the AF ID. For example, the third message is an Nudr_DM_Query response.

In a BDT policy negotiation process, the BDT policy corresponding to the BDT reference ID or the BDT policy corresponding to the AF ID has been stored in the BDT-UDR. Therefore, the BDT-UDR may index a corresponding BDT policy based on an identifier included in the second message.

8006: The PCF sends a policy authorization create response. For example, the policy authorization create response is an Npcf PolicyAuthorization_create response.

When the AF cannot directly interact with the PCF, the PCF sends the policy authorization create response to the NEF, and then the NEF forwards the policy authorization create response to the AF.

When the AF can directly interact with the PCF, the PCF directly sends a policy create response to the AF.

8007: The PCF sends a policy control update request to an SMF. For example, the policy control update request is an Npcf_SMPolicyControl_UpdateNotify request.

The PCF generates a PCC rule based on the received BDT policy, and sends the PCC rule to the SMF through the policy control update request.

8008: The SMF returns a policy control update response to the PCF. For example, the policy control update request is an Npcf_SMPolicyControl_UpdateNotify response.

Therefore, regardless of whether the AF can directly interact with the PCF, the PCF can obtain the BDT policy from the BDT-UDR after the PDU session is established.

The foregoing describes a process of obtaining the background data transfer policy by the first policy control function network element. The following describes a process of storing the background data transfer policy in the first data storage network element. The first data storage network element may be a data storage network element that is added and configured to store the background data transfer policy.

Optionally, before S710, the method 700 further includes: The first policy control function network element sends a first data storage request to the first data storage network element. The first data storage request includes the background data transfer policy. The first policy control function network element receives a first data storage response from the first data storage network element.

That is, the first policy control function network element may store data related to background data transfer in the first data storage network element in a background data transfer negotiation process.

Alternatively, before S710, the method 700 further includes: The second policy control function network element sends a second data storage request to the first data storage network element. The second data storage request includes the background data transfer policy. The second policy control function network element receives a second data storage response from the first data storage network element.

That is, the second policy control function network element may store data related to background data transfer in the first data storage network element in a background data transfer negotiation process. Herein, the policy control function network element (namely, the second policy control function network element) configured to perform background data transfer negotiation and the policy control function network element (namely, the first policy control function network element) configured to request the background data transfer policy may be different network elements.

Regardless of any policy control function network element, the data that is related to background data transfer and stored in the first data storage network element may include one or more of the following content: the AF ID, background data transfer (used to indicate a data subset type), the BDT transfer policy, the BDT reference ID (where the BDT reference ID may be used to obtain the BDT transfer policy), input information related to a BDT policy decision (for example, an expected UE transfer time window, a quantity of UEs, and network area information), policy data (used to support a data type), and the like.

Figure 12:
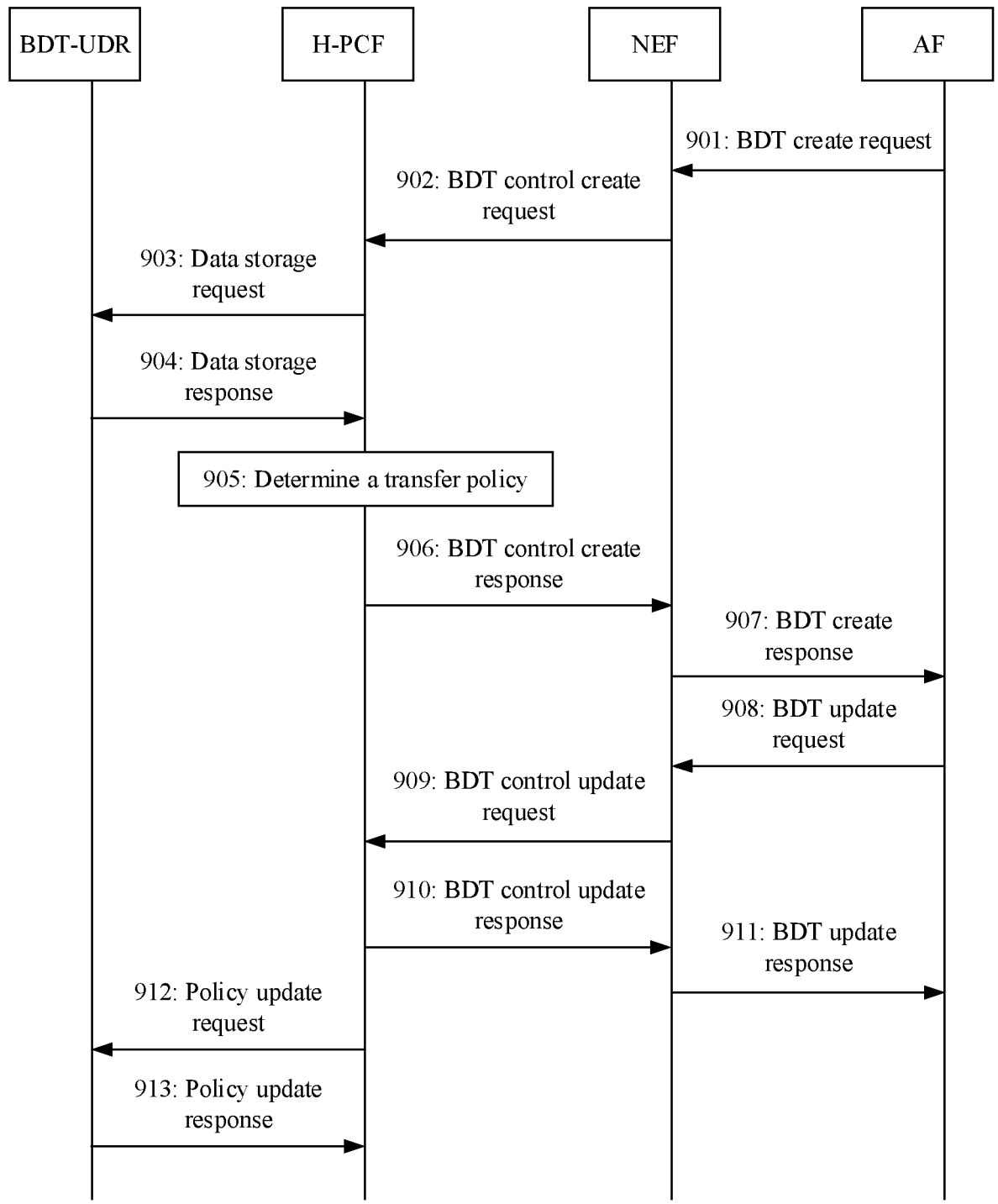
FIG. 12 is a schematic interaction diagram of still another example of a method for managing a background data transfer policy according to an embodiment of this application.

For ease of understanding, a BDT policy negotiation process is described herein with reference to an example in FIG. 12. FIG. 12 is described using an example in which the application function network element is an AF, the first policy control function network element or the second policy control function network element is an H-PCF, the first data storage network element is a BDT-UDR, and the network exposure network element is an NEF. As shown in FIG. 12, the following steps are included.

901: The AF sends a BDT create request to the NEF.

The BDT create request includes one or more of the following content: an AF ID, a quantity of UEs, a time window, or other information. For example, the BDT create request is an Nnef_BDTPNegotiation_Create request.

902: The NEF sends a BDT control create request to the H-PCF. For example, the BDT control create request is an Npcf_BDTPolicyControl_Create request.

The NEF discovers and selects the H-PCF via an NRF based on the BDT create request sent by the AF, and then sends the BDT control create request to the H-PCF. For a procedure in which the NEF discovers and selects the H-PCF via the NRF, refer to an existing procedure. Details are not described herein.

903: The H-PCF sends a data storage request to the BDT-UDR.

If UDR information is pre-configured in the H-PCF, the H-PCF selects a BDT policy based on a received BDT policy negotiation request, and stores the selected BDT policy in a related UDR (configured to manage application data that is not managed by UE).

Herein, the H-PCF may select the BDT-UDR based on BDT-UDR information returned by the NRF.

For example, if the H-PCF discovers and selects the UDR based on the NRF, an NF discovery request sent by the H-PCF to the NRF includes indication information, and the indication information is used to indicate the NRF to return UDR information used to store BDT policy data of an application. The NRF returns the UDR information to the H-PCF, and the H-PCF selects a target UDR, the BDT-UDR, based on the returned UDR information. For example, the UDR information returned by the NRF includes an FQDN or an IP address of a UDR instance, and optionally, includes a data set identifier (application data or policy data) or a data subset identifier (BDT policy data).

For example, the H-PCF sends information used to request the UDR to the NRF, and the NRF includes first indication information in the returned UDR information. The first indication information indicates a UDR storing the BDT policy data of the application. The H-PCF selects the target UDR, the BDT-UDR, based on the UDR information returned by the NRF. For example, the UDR information returned by the NRF includes the FQDN or the IP address of the UDR instance, the data set identifier (the application data or the policy data), or the data subset identifier (the policy data or the BDT policy data); or includes the FQDN or the IP address of the UDR instance, the data set identifier (the application data), the data subset identifier (the policy data), or a data keyword (the BDT policy).

904: The BDT-UDR sends a data storage response to the H-PCF. The data storage response may include all stored policy information and network area information corresponding to policies. For example, the data storage response is an Nudr_DM_Query response.

905: The H-PCF determines a transfer policy.

The H-PCF determines one or more transfer policies based on the information provided by the AF and the received policy information.

906: The H-PCF sends a BDT control create response to the NEF. The BDT control create response may include one or more BDT policies and one BDT reference ID.

For example, the BDT control create response is an Npcf_BDTPolicyControl_Create response.

907: The NEF sends a BDT create response to the AF.

The BDT create response may include the one or more BDT policies and the BDT reference ID. For example, the BDT create response is an Nnef_BDTPNegotiation_Create response.

Herein, if the NEF receives only one BDT policy, steps 908 to 911 are not performed. Optionally, if the NEF receives a plurality of BDT policies, steps 908 to 911 are performed.

908: The AF sends a BDT update request to the NEF. The BDT update request includes a selected transfer policy.

Optionally, the AF may select one BDT policy from the plurality of BDT policies, and send the BDT update request to the NEF. The BDT update request includes the BDT policy selected by the AF. For example, the BDT update request may be an Nnef_BDTPNegotiation_Update request.

909: The NEF sends a BDT control update request to the H-PCF. The BDT control update request includes the selected BDT policy. For example, the BDT control update request may be an Npcf_BDTPolicyControl_Update request.

910: The H-PCF sends a BDT control update response to the NEF.

For example, the BDT control update response may be an Npcf_BDTPolicyControl_Update response.

911: The NEF sends a BDT update response to the AF. For example, the BDT update response may be an Nnef_BDTP-Negotiation_Update response.

912: The H-PCF sends a policy update request to the UDR. The policy update request includes the BDT reference ID and the BDT policy. For example, the policy update request may be an Nudr_DM_Update request.

913: The UDR sends a policy update response to the H-PCF.

For example, the policy update response may be an Nudr_DM_Update response.

Therefore, the procedure in FIG. 12 describes a process in which the H-PCF performs BDT policy negotiation.

It should be understood that the procedure shown in FIG. 12 is merely for ease of understanding by a person skilled in the art, and does not constitute any limitation on the embodiments of this application.

This application further provides another method for managing a background data transfer policy. A difference between this method and the foregoing implementation is that a terminal is associated with a terminal policy established by a network. It should be understood that the method 1000 in the following embodiment of this application may be used independently, or may be used in combination with the foregoing method 700. This is not limited. For example, in a possible implementation, for "the first policy control function network element sends the context information of the terminal to the second data storage network element" in the method 700, the second data storage network element may alternatively be replaced with a first data storage network element in the following method 1000, or may be another data storage network element. This is not specifically limited.

Figure 13:
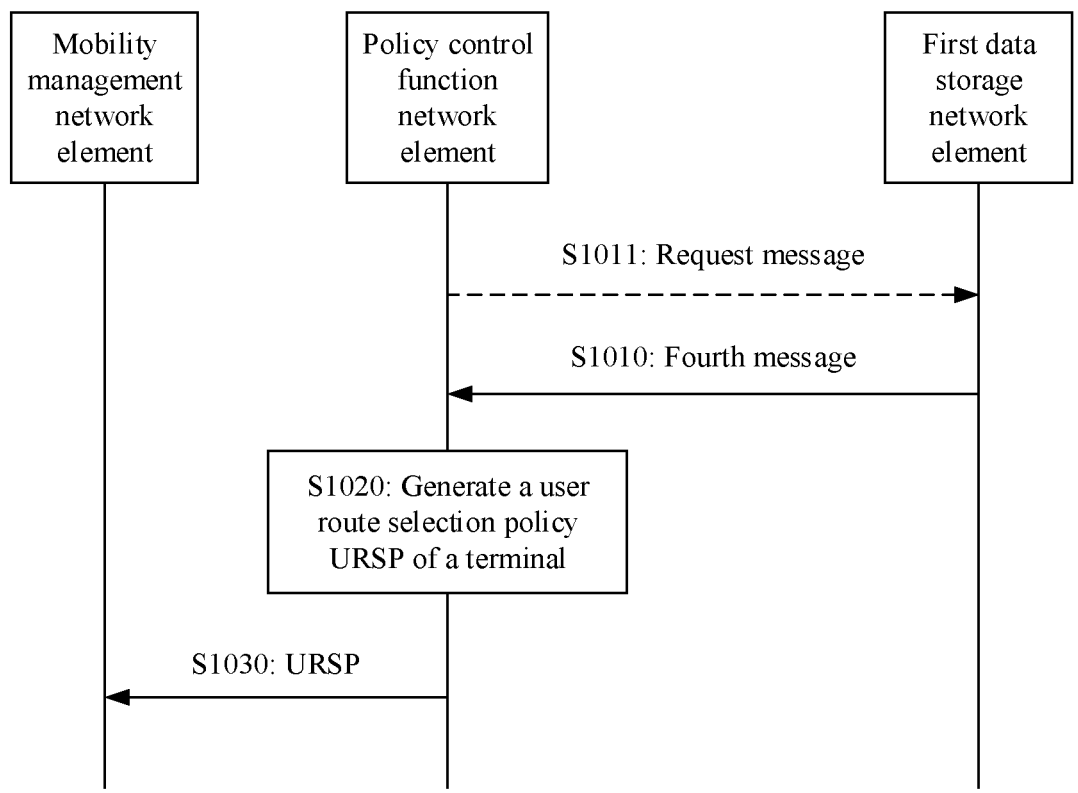
FIG. 13 is a schematic flowchart of a method for managing a background data transfer policy according to another embodiment of this application.

FIG. 13 is a schematic flowchart of the method 1000 for managing a background data transfer policy according to the other embodiment of this application. It should be understood that, content transmitted in the interaction procedure in FIG. 13 may be received or sent through a message in an existing standard. For a meaning of the message, refer to a description in the standard. Alternatively, to-be-received content or to-be-sent content may be received or sent through a newly defined message. This is not limited. As shown in FIG. 13, the method 1000 includes the following steps.

S1010: The first data storage network element sends a fourth message to a policy control function network element. The fourth message includes at least one background data transfer reference identifier or at least one background data transfer policy, and each background data transfer policy has a corresponding background data transfer reference identifier. Correspondingly, the policy control function network element receives the fourth message from the first data storage network element.

Optionally, the fourth message may include the at least one background data transfer reference identifier and the at least one background data transfer policy.

"At least one" may be understood as "one or more than two".

Optionally, before S1010, the method further includes S1011: The policy control function network element sends a request message to the first data storage network element. The request message includes an application function identifier. Correspondingly, the at least one background data transfer reference identifier is a background data transfer reference identifier corresponding to an application function identified by the application function identifier, and the at least one background data transfer policy is a background data transfer policy corresponding to the application function identified by the application function identifier. Optionally, the request message may be a data request message or a data subscription message.

For example, if the request message includes an AF ID, the at least one BDT reference ID is a BDT reference ID corresponding to an AF identified by the AF ID, and/or the at least one BDT policy is a BDT policy corresponding to the AF identified by the AF ID.

S1020: The policy control function network element generates a URSP of a terminal. The URSP includes a first background data transfer policy, and the first background data transfer policy is included in the at least one background data transfer policy or the first background data transfer policy corresponds to a first background data transfer reference identifier in the at least one background data transfer reference identifier.

Herein, the first background data transfer policy may be a part of a background data transfer policy corresponding to a background data transfer reference identifier, the first background data transfer policy may be a part of a background data transfer policy in the at least one background data transfer policy, or the first background data transfer policy may be a background data transfer policy in at least one background data transfer policy. This is not limited.

For example, if determining that the terminal includes an application corresponding to the at least one background data transfer policy, or includes a subscription between the terminal and an application corresponding to the at least one background data transfer policy, the policy control function network element generates a URSP including the first background data transfer policy. The first background data transfer policy may include a time window time window, network area information network area information, or a location area information location area information. Optionally, the first background data transfer policy may further include at least one of the following: a charge rate in the time window or a maximum aggregated bitrate.

For example, the URSP may include only a part of information in the first background data transfer policy, for example, the time window or the network area information. Optionally, the URSP may further include other information of the first background data transfer policy. This is not limited.

S1030: The policy control function network element sends the URSP to a mobility management network element. Correspondingly, the mobility management network element receives the URSP from the policy control function network element.

Optionally, the fourth message includes the at least one background data transfer reference identifier, and the method 1000 further includes:

The policy control function network element obtains at least one corresponding background data transfer policy from a second data storage network element based on the at least one background data transfer reference identifier. Herein, after obtaining the at least one background data transfer reference identifier from the first data storage network element, the policy control function network element may search another data storage network element for the corresponding background data transfer policy.

Optionally, the method 1000 further includes: The policy control function network element stores at least one of the following to a third data storage network element: the first background data transfer policy, or a background data transfer reference identifier corresponding to the first background data transfer policy. Herein, the third background data transfer policy is used to store context information of the terminal. In other words, the policy control function network element may store, in a data storage network element that serves the terminal, the first background data transfer policy in the URSP and/or the background data transfer reference identifier corresponding to the first background data transfer policy. For example, the policy control function network element may store the BDT policy and/or the BDT reference ID in terminal policy control information of a UDR.

In this embodiment of this application, the policy control function network element may generate the URSP based on the at least one background data transfer reference identifier or the at least one background data transfer policy. The URSP includes the first background data transfer policy. In this case, the URSP including the first background data transfer policy may be sent to the network element that serves the terminal, such that the terminal can use the URSP subsequently.

Figure 14:
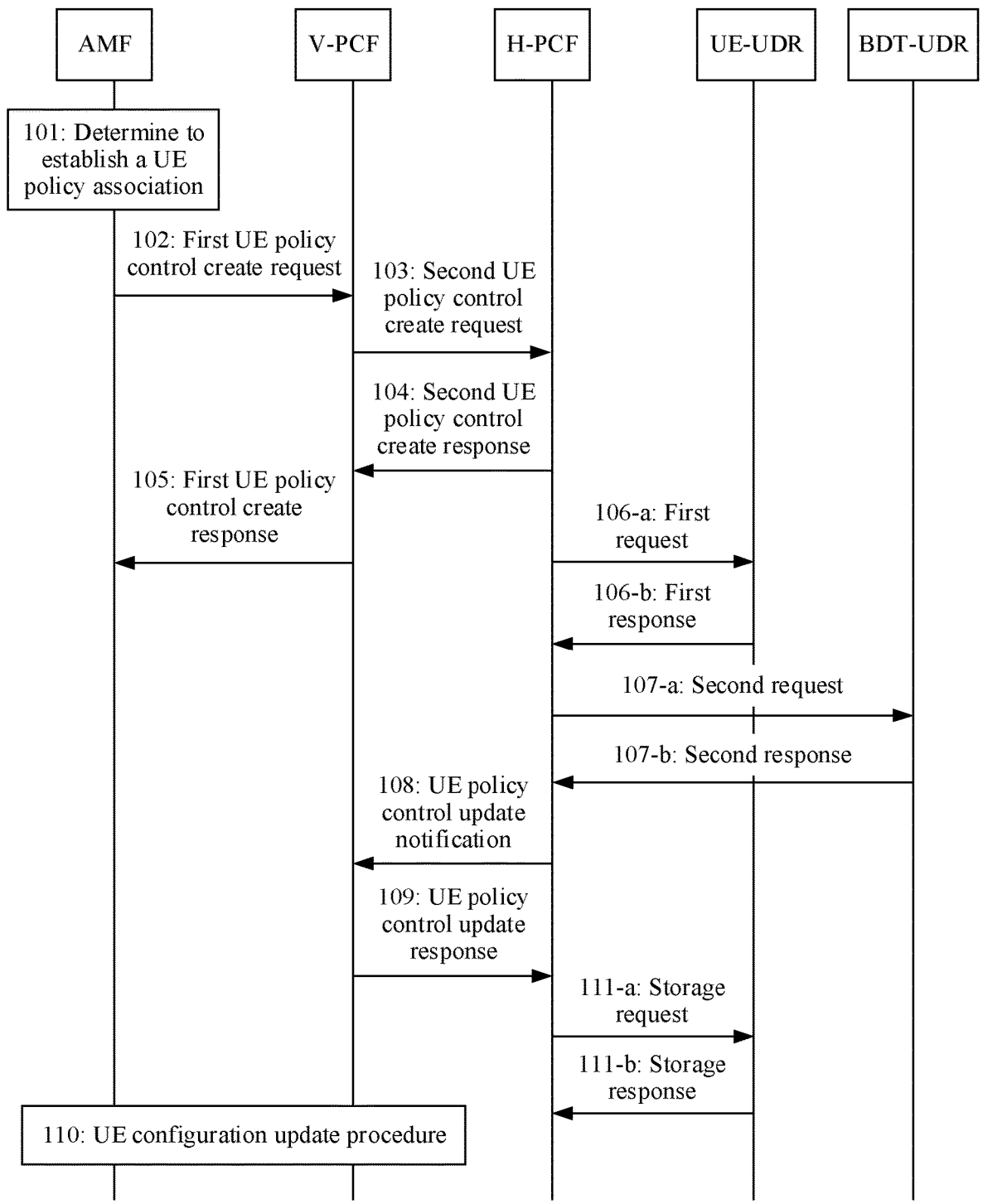
FIG. 14 is a schematic interaction diagram of an example of a method for managing a background data transfer policy according to another embodiment of this application.

For ease of understanding, descriptions are provided below with reference to an example in FIG. 14. FIG. 14 is described using an example in which an application function network element is an AF, the policy control function network element is an H-PCF, the first data storage network element is a BDT-UDR, and a network exposure network element is an NEF. It should be understood that, in a roaming scenario, an AMF communicates with the H-PCF via a V-PCF; and in a non-roaming scenario, the AMF directly communicates with the H-PCF. As shown in FIG. 14, a procedure includes the following content.

101: When UE accesses a network, the AMF determines to establish a UE policy association.

102: The AMF sends a first UE policy control create request to the V-PCF.

The first UE policy control create request includes a SUPI. Optionally, the first UE policy control create request further includes a UE policy container, a serving network, and the like. In the roaming scenario, step 102 is performed, and the first UE policy control create request includes an ID of the H-PCF. For example, the UE policy control create request is an Npcf_UEPolicyControl Create request.

103: The V-PCF sends a second UE policy control create request to the H-PCF. For example, the second UE policy control create request is an Npcf_UEPolicyControl Create request.

104: The H-PCF sends a second UE policy control create response to the V-PCF. For example, the second UE policy control create response is an Npcf_UEPolicyControl Create response. Optionally, the second UE policy control create response includes Policy Control Request Trigger information.

105: The V-PCF sends a first UE policy control create response to the AMF. For example, the first UE policy control create response is an Npcf_UEPolicyControl Create response. Optionally, the first UE policy control create response includes Policy Control Request Trigger information.

106-a: The H-PCF sends a first request to a UE-UDR. For example, the first request is an Nudr_DM_Query request. The first request includes the SUPI, policy data, and the like.

106-b: The UE-UDR sends a first response to the H-PCF. For example, the first response is an Nudr_DM_Query response. The first response includes policy subscription related information and a latest policy section identifier (PSI).

107-a: The H-PCF sends a second request to the BDT-UDR, to request to obtain a BDT policy. The second request includes AF ID information.

Optionally, if the UE-UDR supports obtaining of the BDT policy, the H-PCF requests the BDT policy from the UE-UDR. In other words, the UE-UDR and the BDT-UDR are a same UDR. If the UE-UDR does not support obtaining of the BDT policy, the H-PCF selects the BDT-UDR. The BDT-UDR and UE-UDR are not a same UDR.

Further, optionally, before performing step 107-*a*, the H-PCF may receive a BDT reference ID, a SUPI, and an internal group identifier that are sent by an APP-UDR. The H-PCF determines to initiate a BDT policy obtaining procedure. The APP-UDR is configured to store or obtain data of an application. The APP-UDR and the UE-UDR may be a same UER, or may be different UDRs. This is not specifically limited.

107-*b*: The BDT-UDR sends corresponding policy information to the H-PCF. When the corresponding information changes, the BDT-UDR sends an update notification to the PCF.

108: The H-PCF sends a UE policy control update notification to the V-PCF. For example, the UE policy control update notification is an Npcf_UEPolicyControl_UpdateNotify request.

The H-PCF generates a URSP based on the policy subscription information and the BDT policy, and sends an Npcf_UEPolicyControl Create response to the V-PCF. The response message includes the URSP.

109: The V-PCF sends a UE policy control update response to the H-PCF. For example, the UE policy control update response is an Npcf_UEPolicyControl_UpdateNotify response.

110: The V-PCF sends a UE configuration update procedure to the AMF.

111-*a*: The H-PCF sends a storage request to the UE-UDR. The storage request is used to request to store the BDT reference ID and the BDT policy that are obtained from the BDT-UDR. For example, the storage request is an Nudr_DM_Update request.

The H-PCF determines to transmit the BDT transfer policy as information of the URSP to the UE, and the H-PCF may store the BDT reference ID and the transfer policy in PDU session policy information of the UE-UDR.

111-*b*: The UE-UDR sends a storage response to the H-PCF. For example, the storage response is an Nudr_DM_Update response. The procedure in FIG. 14 describes a process in which the H-PCF delivers the BDT policy as the URSP to the UE. Optionally, step 107-*a* and step 107-*b* may be performed at any time after step 103 and before step 111-*a*. This is not specifically limited. Further, the H-PCF may optionally perform step 107-*a* and step 107-*b* before the UE accesses the network. This is not specifically limited.

It should be understood that the procedure shown in FIG. 14 is merely for ease of understanding by a person skilled in the art, and does not constitute any limitation on the embodiments of this application.

In the foregoing method 700, a data storage network element configured to store a background data transfer policy is added to perform policy negotiation. This application provides another embodiment. The data storage network element configured to store the background data transfer policy does not need to be added. Instead, a data storage network element is selected from any group of data storage network elements for negotiation, and a negotiated background data transfer policy is synchronized to a data storage network element in another group of data storage network elements.

Figure 15:
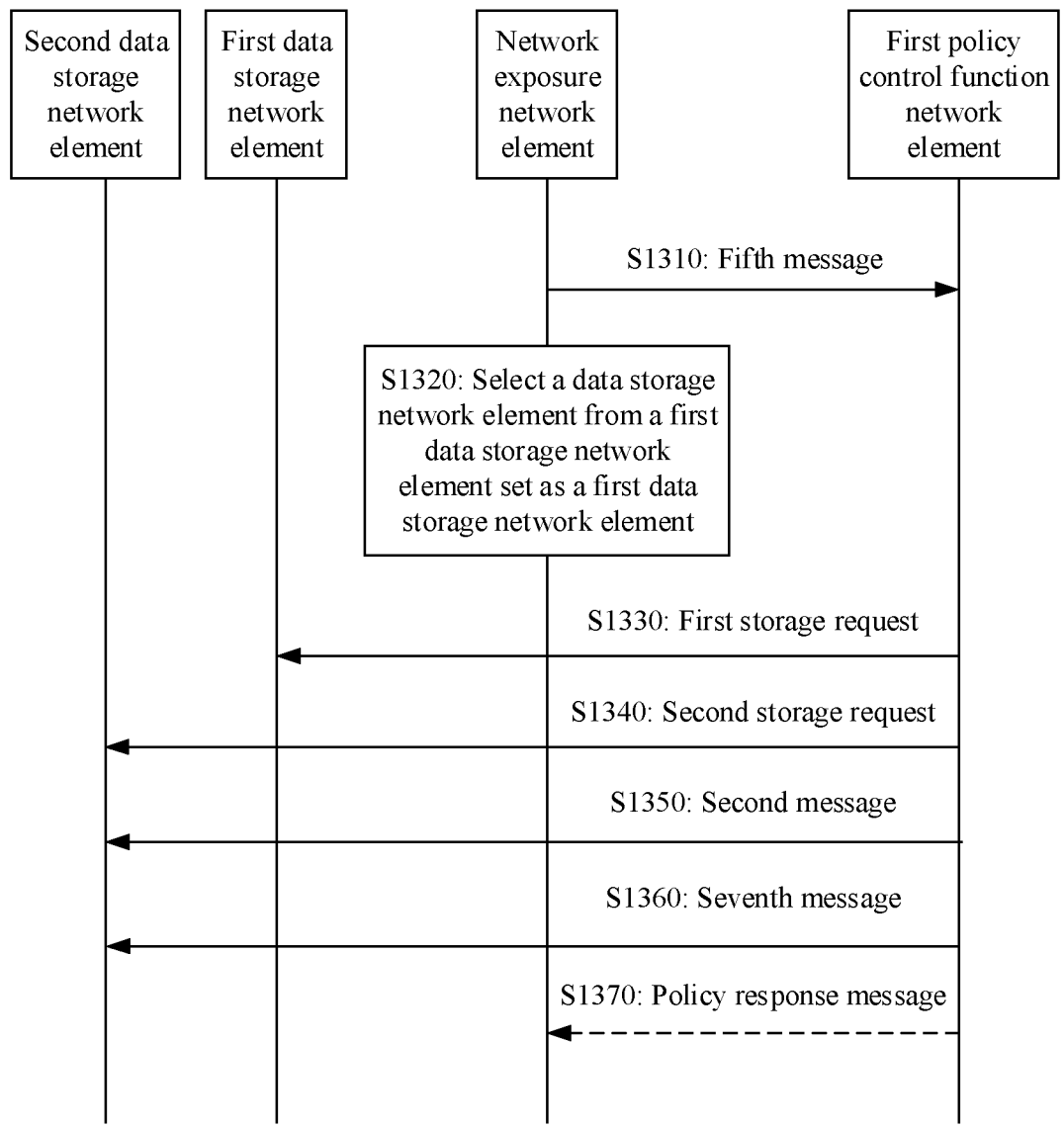
FIG. 15 is a schematic flowchart of a method for managing a background data transfer policy according to still another embodiment of this application.

FIG. 15 is a schematic flowchart of a method 1300 for managing a background data transfer policy according to still another embodiment of this application. It should be understood that, content transmitted in the interaction procedure in FIG. 15 may be received or sent through a message in an existing standard. For a meaning of the message, refer to a description in the standard. Alternatively, to-be-received content or to-be-sent content may be received or sent through a newly defined message. This is not limited. As shown in FIG. 15, the method 1300 includes the following steps.

S1310: A network exposure network element sends a fifth message to a first policy control function network element. The fifth message is used to request the first policy control function network element to perform policy negotiation. Correspondingly, the first policy control function network element receives the fifth message from the network exposure network element.

Herein, the network exposure network element may send the fifth message to one or more policy control function network elements. Herein, each policy control function network element may correspond to one group of data storage network elements.

S1320: The first policy control function network element selects a data storage network element from a first data storage network element set as a first data storage network element based on the fifth message.

Herein, the first policy control function network element may select any data storage network element to perform background data transfer policy negotiation.

S1330: The first policy control function network element sends a first storage request to the first data storage network element. The first storage request includes a first background data transfer policy and/or a first BDT reference identifier.

S1340: The first policy control function network element sends a second storage request to any data storage network element in a second data storage network element set, for example, a second data storage network element. The second storage request includes the first background data transfer policy and/or the first BDT reference identifier.

The first policy control function network element performs a background data transfer policy negotiation process by performing S1320 to S1340. Then, when needing to obtain a background data transfer policy, the first policy control function network element may obtain the background data transfer policy from the second data storage network element. The second data storage network element is a network element in the first data storage network element set or the second data storage network element set.

Herein, after performing the background data transfer policy negotiation process, the first policy control function network element may synchronize information about a negotiated background data transfer policy (for example, the first BDT reference identifier, the first background data transfer policy, an amount of data transmitted to a terminal, a quantity of terminals, an application identifier, and other related information) to a data storage network element in another data storage network element set. For example, the first policy control function network element may synchronize the information about the negotiated background data transfer policy to the data storage network element in the other data storage network element set via the network exposure network element.

S1350: The first policy control function network element sends a second message to the second data storage network element. The second message is used to obtain the background data transfer policy. Correspondingly, the second data storage network element receives the second message from the first policy control function network element.

S1360: The second data storage network element sends a seventh message to the first policy control function network element. The seventh message includes the first background data transfer policy. Correspondingly, the first policy control function network element receives the seventh message from the second data storage network element.

After S1350 and S1360 are performed, the first policy control function network element may obtain the background data transfer policy from the second data storage network element. That is, the first policy control function network element may not only perform the background data transfer policy negotiation process, but also perform a background transfer policy obtaining process.

Alternatively (not shown in the figure), a second policy control function network element sends a second message to the second data storage network element. The second message is used to obtain the background data transfer policy.

The second data storage network element sends a seventh message to the second policy control function network element. The seventh message includes the first background data transfer policy. Correspondingly, the second policy control function network element receives the seventh message from the second data storage network element.

Herein, the second policy control function network element may obtain the background data transfer policy from the second data storage network element. The background data transfer policy negotiation process is performed by the first policy control function network element. In other words, a policy control function network element that needs to obtain the data transfer policy and a policy control function network element that performs the background data transfer policy negotiation process may be different network elements. This is not limited.

In this embodiment of this application, the network exposure network element may select a policy control function network element corresponding to a data storage network element in a data storage network element set to perform a background data transfer policy negotiation process, and then synchronize information about a negotiated background data transfer policy to another data storage network element set after the negotiation is completed. Alternatively, the network exposure network element may enable a policy control function network element corresponding to each data storage network element set to perform a background data transfer policy negotiation process, and then after receiving a policy response message of the first policy control function network element, send, to a first policy control function network element corresponding to another data storage network element set, the policy response message returned by the first policy control function network element, such that background data transfer policy information stored in data storage network elements in the data storage network element sets is the same. In this way, a policy control function network element serving the terminal may select any data storage network element to obtain the background data transfer policy.

Optionally, the method 1300 further includes S1370: The first policy control function network element sends a policy response message to the network exposure network element. The policy response message includes the first BDT reference identifier and/or the first background data transfer policy. The first policy control function network element is a policy control function network element that first sends the policy response message and that is in the one or more policy control function network elements. Correspondingly, the network exposure network element receives the policy response message from the first policy control function network element.

Herein, after receiving the policy response message from the first policy control function network element, the network exposure network element may forward content in the received policy response message to another policy control function network element in the one or more policy control function network elements, and not need to interact with an application function network element for each policy control function network element to determine a background transmission policy.

Figure 16:
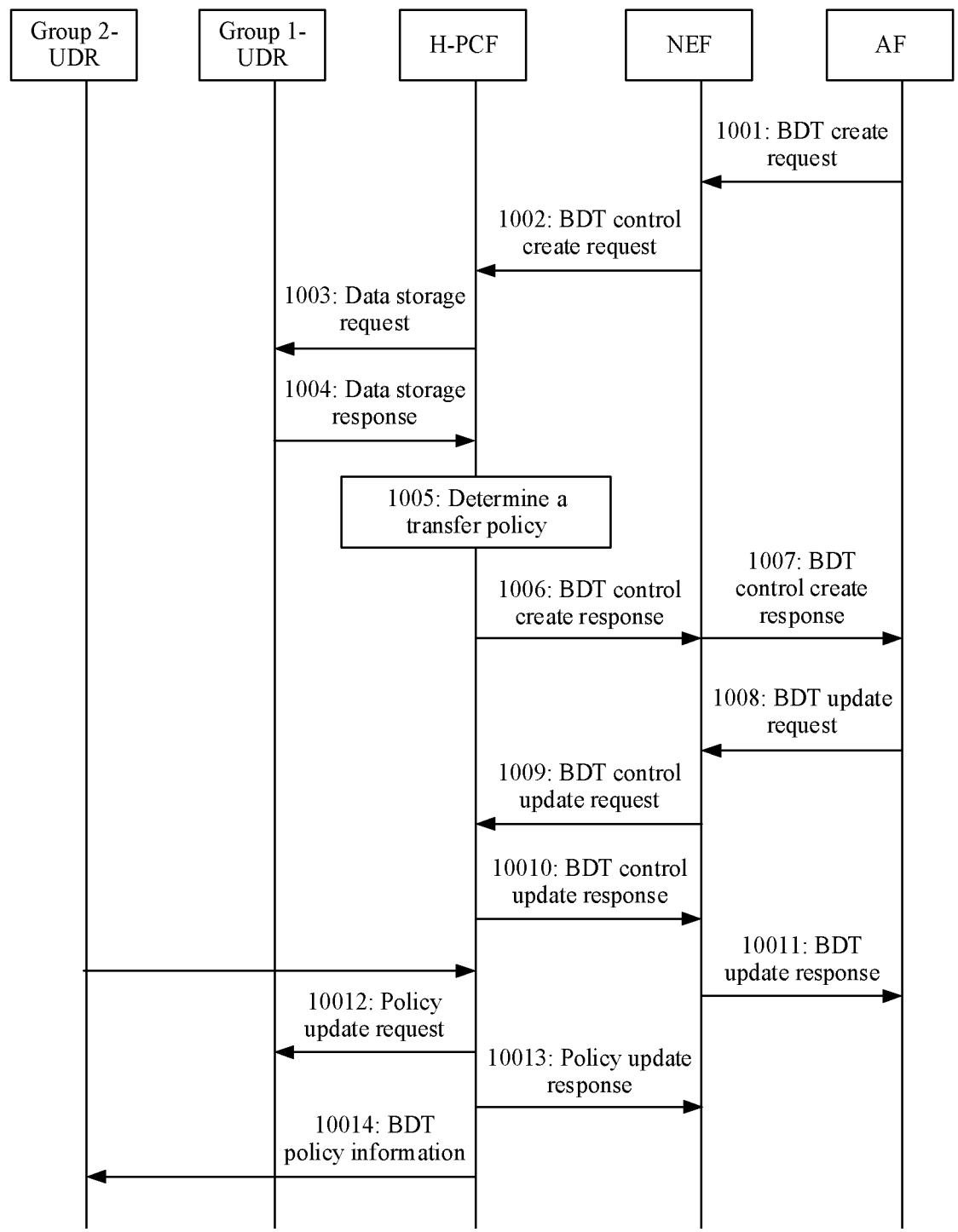
FIG. 16 is a schematic interaction diagram of an example of a method for managing a background data transfer policy according to still another embodiment of this application.

For ease of understanding, descriptions are provided below with reference to an example in FIG. 16. FIG. 16 is described using an example in which the application function network element is an AF, the first policy control function network element is an H-PCF, the data storage network element is a UDR, and the network exposure network element is an NEF. As shown in FIG. 16, the following steps are included.

1001: The AF sends a BDT create request to the NEF.

For example, the BDT create request is an Nnef_BDTP-Negotiation_Create request.

1002: The NEF sends a BDT control create request to the H-PCF. For example, the BDT control create request is an Npcf_BDTPolicyControl_Create request.

1003: The H-PCF sends a data storage request to the UDR. A selected UDR may be a UDR in a UDR group 1, or may be a UDR in a UDR group 2. FIG. 16 is described using a UDR in the UDR group 1 as an example.

Optionally, the data storage request includes policy data and background data transfer, for example, an Nudr_DM_Query request.

The H-PCF determines, based on the received BDT control create request, to discover and select a UDR, for example, select a UDR 1, and then sends, to the UDR 1, a transfer policy that requests storage.

For example, a procedure of discovering and selecting a UDR may be as follows: If UDR information is preconfigured in the H-PCF, the H-PCF selects a UDR in any group to perform policy negotiation. Alternatively, if the H-PCF discovers and selects the UDR based on an NRF, the H-PCF sends an indication to the NRF, to indicate the NRF to return at least one UDR in each group, and the H-PCF may select a UDR in any group.

1004: The UDR sends a data storage response to the H-PCF. The data storage response may include all stored policy information and network area information corresponding to policies. For example, the data storage response is an Nudr_DM_Query response.

1005: The H-PCF determines a transfer policy.

1006: The H-PCF sends a BDT control create response to the NEF.

1007: The NEF sends a BDT create response to the AF. Herein, if the NEF receives only one BDT policy, steps 1008 to 1011 are not performed. Optionally, if the NEF receives a plurality of BDT policies, steps 1008 to 1011 are performed.

1008: The AF sends a BDT update request to the NEF.

1009: The NEF sends a BDT control update request to the H-PCF.

10010: The H-PCF sends a BDT control update response to the NEF.

10011: The NEF sends a BDT update response to the AF.

10012: The H-PCF sends a policy update request to the UDR.

10013: The UDR sends a policy update response to the H-PCF.

The foregoing steps 1005 to 10013 are similar to steps 905 to 913 in FIG. 11. For brevity, details are not described herein again.

10014: The H-PCF sends BDT policy information to any UDR in the UDR group 2.

Herein, the H-PCF may send a BDP reference ID, policy information, and other related information to any UDR in another UDR group, to implement BDT policy synchronization.

The foregoing describes the first type of BDT policy negotiation process for a plurality of UDR groups: A UDR is selected from a UDR group for BDT policy negotiation, and then the negotiated BDT policy is synchronized to other UDR groups. The following describes a BDT policy negotiation process in the second. A UDR may be selected from each UDR group for policy negotiation.

In the second type of BDT policy negotiation process, the procedure in FIG. 16 may still be used, but step 10014 does not need to be performed herein. A difference between step 1002 in FIG. 16 and the first type of BDT policy negotiation process lies in that the NEF may send the BDT control create request to a plurality of H-PCFs. For example, the NEF may discover H-PCFs in all UDR groups via the NRF, select an H-PCF in each UDR group, and send the BDT control create request to each selected H-PCF. Then, for subsequent steps of each H-PCF, refer to steps 1003 to 10013.

A difference between step 1006 in FIG. 16 and the first type of BDT policy negotiation process lies in that: After receiving a BDT control create response returned by the first H-PCF, the NEF sends a BDT create response to the AF, then sends, after subsequently receiving a BDT control create response returned by another H-PCF, a response to the other H-PCF based on information determined through interaction between the first H-PCF and the AF, and does not need to send a BDT create response to the AF again.

It should be noted that, in the second type of BDT policy negotiation process, to ensure that BDT reference IDs generated by all the H-PCFs are the same, for a process in which a UDR is selected from each UDR group to perform policy negotiation, all H-PCFs corresponding to the UDR groups need to allocate the BDT reference IDs according to a preset rule.

Therefore, in the foregoing first type of BDT policy negotiation process and second type of BDT policy negotiation process, no new UDR type needs to be used, and instead, BDT policy information is synchronized to a UDR in each UDR group corresponding to UE.

It should be understood that the examples in FIG. 10 to FIG. 12, FIG. 14, and FIG. 16 in the embodiments of this application are merely intended to help a person skilled in the art understand the embodiments of this application, but are not intended to limit the embodiments of this application to specific scenarios shown in the examples. It is clear that a person skilled in the art can make various equivalent modifications or changes based on the examples in FIG. 10 to FIG. 12, FIG. 14, and FIG. 16, and such modifications and changes also fall within the scope of the embodiments of this application.

It should be further understood that the examples in FIG. 10 to FIG. 12, FIG. 14, and FIG. 16 in the embodiments of this application are merely examples for description, and the examples in the figures do not limit execution sequences. A person skilled in the art may flexibly adjust sequences of the steps based on the examples in the figures. In addition, sequence numbers of the foregoing processes do not mean execution sequences. The execution sequences of the processes should be determined based on functions and internal logic of the processes.

It should be further understood that the solutions in the embodiments of this application may be combined or separately used, and explanations or descriptions of the terms in the embodiments may be cited or explained in the embodiments. This is not limited.

In the method for managing a background data transfer policy in this application, in addition to a background data transfer policy, a policy control function network element may further obtain first service information, such that the policy control function network element can obtain and apply service information of a background data transfer policy, to generate an available URSP. There are different embodiments for obtaining the first service information. The following provides detailed descriptions.

In the method for managing a background data transfer policy in this application, in addition to a background data transfer policy, a policy control function network element may further obtain indication information and/or third-party identifier information (where the indication information and/or the third-party identifier information are/is described below), such that the policy control function network element can enable or disable third-party payment for a connection of a terminal device without interacting with an application function network element. The connection of the terminal device is used to transmit background data. There are different embodiments for obtaining the indication information and/or the third-party identifier information. The following provides detailed descriptions.

The first service information is independent of the indication information and/or the third-party identifier information. There is no association between the first service information and the indication information and/or the third-party identifier information. The first service information and the indication information and/or the third-party identifier information are used in different processes. For example, the first service information is related to a process of generating the URSP. To be more specific, a PCF uses the first service information when generating the URSP. The indication information and/or the third-party identifier information are/is related to generation of a PCC rule. To be more specific, the PCF uses the indication information and/or the third-party identifier information when generating the PCC rule.

A description is provided herein. For ease of description and brevity, a part of content of the first service information and a part of content of the indication information and/or the third-party identifier information are described in a same interaction procedure below. However, it does not indicate that there is a relationship or association between the first service information and the indication information and/or the third-party identifier information.

In a first possible implementation for obtaining the first service information, the foregoing embodiment in FIG. 9 is used as an example. Descriptions are provided for the first policy control function network element.

The first policy control function network element receives the third message of the first data storage network element. The third message includes the first service information and the first background data transfer policy corresponding to the first identifier. The first service information includes one or more of the DNN, the S-NSSAI, or the service description information. The first service information may be understood as including related information of a service that uses the first background data transfer policy. The first background data transfer policy and the first service information are a part of UE policy information.

That is, the first policy control function network element can obtain both the first service information and the first background data transfer policy corresponding to the first identifier from the first data storage network element.

In the first possible implementation for obtaining the first service information, the first service information may be added in a background data transfer policy negotiation process.

The first policy control function network element receives the first service information from the network exposure network element. Optionally, the first policy control function network element sends the first data storage request to the first data storage network element. In addition to the background data transfer policy, the first data storage request may further include the first service information.

Optionally, the first policy control function network element may store the first service information in the first data storage network element.

Optionally, that the first service information is added in a background data transfer policy negotiation process may further include the following steps: The network exposure network element receives a first background data transfer policy negotiation request from the application function network element. The first background data transfer policy negotiation request includes second service information. The network exposure network element determines the first service information based on the second service information. The network exposure network element sends a second background data transfer policy negotiation request to the first policy control function network element. The second background data transfer policy negotiation request includes the first service information. That is, the network exposure network element may notify the first policy control function network element (or the second policy control function network element) of the first service information in the background data transfer policy negotiation process, such that the first policy control function network element (or the second policy control function network element) stores the first service information in the first data storage network element.

In a first possible implementation for obtaining the indication information and/or the third-party identifier information, the foregoing embodiment in FIG. 9 is used as an example. Descriptions are provided for the first policy control function network element.

The first policy control function network element receives the third message of the first data storage network element. The third message includes the first background data transfer policy corresponding to the first identifier, and the indication information and/or the third-party identifier information. The indication information is used to indicate whether third-party charging is enabled or payment. The third-party identifier information is used to indicate an object that pays for a user, or is used to indicate a third-party organization that pays for a connection of a terminal device. For example, the indication information may include a sponsoring status. The sponsoring status includes an action of enabling or disabling sponsorship. For example, if the status is enabled, a sponsor pays for a connection of the user; and if the status is disabled, the user pays for the connection of the user. The third-party identifier information may include a sponsor ID, namely, an identifier of the sponsor.

That is, the first policy control function network element may obtain the indication information and/or the third-party identifier information through the third message. The first policy control function network element generates a PCC rule based on the first background data transfer policy and the indication information and/or the third-party identifier information.

In the first possible implementation for obtaining the indication information and/or the third-party identifier information, the indication information and/or the third-party identifier information may be added in a background data transfer policy negotiation process.

The first policy control function network element receives one or more of the indication information or the third-party identifier information from the network exposure network element. Optionally, the first policy control function network element sends the first data storage request to the first data storage network element. In addition to the background data transfer policy, the first data storage request may further include one or more of the following: the indication information or the third-party identifier information.

The first policy control function network element may store one or more of the indication information or the third-party identifier information in the first data storage network element. For example, the first policy control function network element may store the indication information and third-party identifier information in the first data storage network element; or store the indication information in the first data storage network element; or store the third-party identifier information in the first data storage network element.

For example, if storing the indication information in the first data storage network element, the first policy control function network element may further store the third-party identifier information (which is, for example, the sponsor ID, namely, the identifier of the sponsor). Alternatively, the first policy control function network element stores the third-party identifier information in the first data storage network element. It indicates that third-party sponsorship is enabled. In other words, fees are paid by the third party.

Optionally, that the indication information and/or the third-party identifier information are/is added in a background data transfer policy negotiation process may further include the following steps: The network exposure network element receives a first background data transfer policy negotiation request from the application function network element. The first background data transfer policy negotiation request includes the indication information and/or the third-party identifier information. The network exposure network element obtains the indication information and/or the third-party identifier information. The network exposure network element sends a second background data transfer policy negotiation request to the first policy control function network element. The second background data transfer policy negotiation request includes the indication information and/or the third-party identifier information. That is, the network exposure network element may notify the first policy control function network element (or the second policy control function network element) of the indication information and/or the third-party identifier information in the background data transfer policy negotiation process, such that the first policy control function network element (or the second policy control function network element) stores the indication information and/or the third-party identifier information in the first data storage network element.

It may be understood that the foregoing storage steps (including the step of storing the first service information and the step of storing the indication information and/or the third-party identifier information) are described using an example in which the first policy control function network element performs storage in the first data storage network element. Actually, another network element may perform storage in the first data storage network element. Optionally, the second policy control function network element receives one or more of the first service information, the indication information, or the third-party identifier information from the network exposure network element. The second policy control function network element sends a second data storage request to the first data storage network element. In addition to the background data transfer policy, the second data storage request may further include one or more of the following: the first service information, the indication information, or the third-party identifier information. The second policy control function network element may be the same as or different from the first policy control function network element. It may be understood that a policy control function network element that performs storage in the first data storage network element and a policy control function network element that subsequently obtains stored content from the first data storage network element may be different network elements, or may be a same network element. This is not limited.

Figure 17:
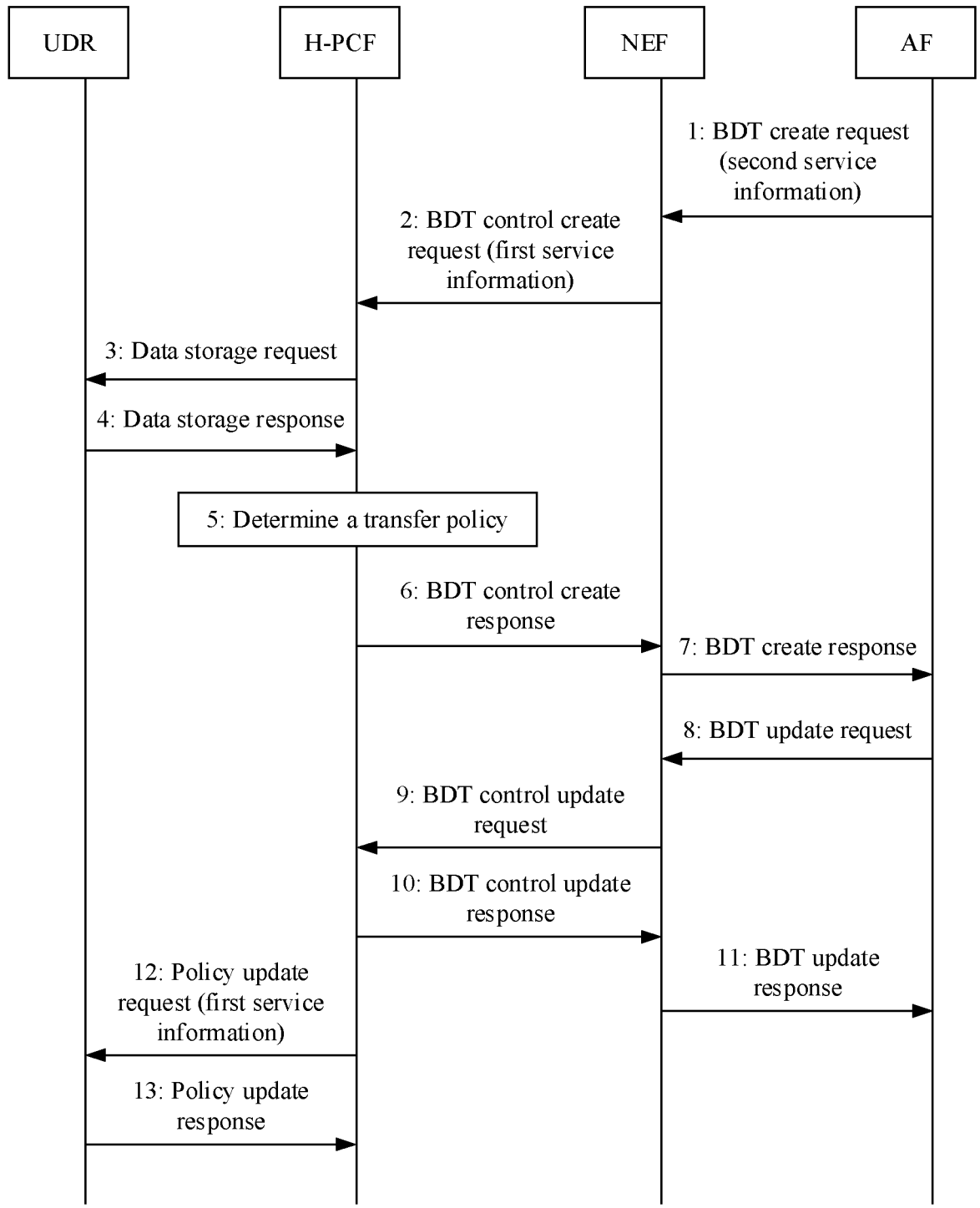
FIG. 17 is a schematic interaction diagram of yet another example of a method for managing a background data transfer policy according to an embodiment of this application.

For ease of understanding, the following describes, with reference to FIG. 17, a process of adding first service information or adding indication information and/or third-party identifier information in a background data transfer policy negotiation process. A difference between FIG. 17 and FIG. 12 lies in that content related to storage of first service information in a first data storage network element is added, or content related to storage of indication information and/or third-party identifier information in a first data storage network element is added. FIG. 17 is described using an example in which the application function network element is an AF, the first policy control function network element or the second policy control function network element is an H-PCF, the first data storage network element is a UDR, and the network exposure network element is an NEF. As shown in FIG. 17, the following steps are included.

1: The AF sends a BDT create request to the NEF. Correspondingly, the NEF receives the BDT create request.

For example, the BDT create request is an Nnef_BDTP-Negotiation_Create request.

The BDT create request includes one or more of the following content: an AF ID, a quantity of UEs, a time window, an ASP ID, or other information. In addition to the foregoing content, content included in the BDT create request may further include two possible implementations.

Implementation 1: Optionally, the BDT create request further includes second service information. The second service information includes service description information. For example, the service description information includes: an APP ID, a service filter, or one or more operating system identifiers (OSIDs), and an operating system application identifier (OSAppID). The OSAppID may be understood as an identifier of an application in an operating system.

Optionally, the second service information further includes one or more of the following: a DNN, an S-NSSAI, or an AF service ID.

Implementation 2 (not shown in the figure): Optionally, the BDT create request may further include indication information (for example, a sponsor status) and/or third-party identifier information (for example, a sponsor ID).

2: The NEF sends a BDT control create request to the H-PCF. Correspondingly, the H-PCF receives the BDT control create request.

Corresponding to the implementation 1 in step 1, optionally, the BDT control create request includes first service information. The first service information includes one or more of the following: the DNN, the S-NSSAI, or the service description information.

Herein, the NEF determines the first service information based on the second service information. If the second service information received by the NEF from the AF includes the AF service identifier (AF-service Id), the NEF obtains a corresponding DNN and S-NSSAI based on the AF service ID. For example, the NEF may obtain the DNN and the S-NSSAI that correspond to the AF service ID based on a local configuration (namely, the AF service ID and the corresponding DNN and S-NSSAI that are stored in the NEF). For another example, the NEF obtains the DNN and the S-NSSAI that correspond to the AF service ID from another network element.

Alternatively, if the second service information includes the service description information, optionally, the NEF obtains the DNN and the S-NSSAI based on the ASP ID and a local configuration (namely, the ASP ID and the corresponding DNN and S-NSSAI that are stored in the NEF).

Optionally, the first service information may further include information such as a session and service continuity mode (SSC mode) and a PDU session type.

Corresponding to the implementation 2 in step 1, optionally, the BDT control create request includes the indication information and/or the third-party identifier information (not shown in the figure).

For example, corresponding to the implementation 2 in step 1, if the BDT create request in step 1 includes the indication information, the BDT control create request sent by the NEF to the H-PCF in step 2 further includes the indication information. For example, if the indication information indicates to enable third-party payment, it indicates that a third-party organization corresponding to a default third-party identifier pays for a connection of a terminal device.

For example, corresponding to the implementation 2 in step 1, if the BDT create request in step 1 includes the indication information and the third-party identifier information, the BDT control create request sent by the NEF to the H-PCF in step 2 further includes the indication information and the third-party identifier information. For example, if the indication information indicates to enable third-party payment, it indicates that a third-party organization corresponding to a third-party identifier pays for a connection of a terminal device. If the indication information indicates to disable third-party payment, the third-party organization corresponding to the third-party identifier is disabled to pay for the connection of the terminal device. That is, the terminal device pays for the connection of the terminal device.

For example, corresponding to the implementation 2 in step 1, if the BDT create request in step 1 includes the third-party identifier information, the BDT control create request sent by the NEF to the H-PCF in step 2 further includes the third-party identifier information. This indicates that the third-party organization corresponding to the third-party identifier pays for the connection of the terminal device.

For example, the BDT control create request is an Npcf_BDTPolicyControl_Create request.

The NEF discovers and selects the H-PCF via an NRF based on the BDT create request sent by the AF, and then sends the BDT control create request to the H-PCF. For a procedure in which the NEF discovers and selects the H-PCF via the NRF, refer to an existing procedure. Details are not described herein.

3: The H-PCF sends a data storage request to the UDR. Correspondingly, the UDR receives the data storage request.

If UDR information is pre-configured in the H-PCF, the H-PCF selects a BDT policy based on a received BDT policy negotiation request, and stores the selected BDT policy in a related UDR.

Herein, the H-PCF may select the UDR based o UDR information returned by the NRF.

For example, if the H-PCF discovers and selects the UDR based on the NRF, an NF discovery request sent by the H-PCF to the NRF includes indication information A, and the indication information A is used to indicate the NRF to return UDR information used to store BDT policy data of an application. The NRF returns the UDR information to the H-PCF, and the H-PCF selects a target UDR, a BDT-UDR, based on the returned UDR information. For example, the UDR information returned by the NRF includes an FQDN or an IP address of a UDR instance, and optionally, includes a data set identifier (application data or policy data) or a data subset identifier (BDT policy data).

For example, the H-PCF sends information used to request the UDR to the NRF, and the NRF includes first indication information in the returned UDR information. The first indication information indicates a UDR storing the BDT policy data of the application. The H-PCF selects the target UDR, the UDR, based on the UDR information returned by the NRF. For example, the UDR information returned by the NRF includes the FQDN or the IP address of the UDR instance, the data set identifier (the application data or the policy data), or the data subset identifier (the policy data or the BDT policy data); or includes the FQDN or the IP address of the UDR instance, the data set identifier (the application data), the data subset identifier (the policy data), or a data keyword (the BDT policy).

4: The UDR sends a data storage response to the H-PCF. Correspondingly, the H-PCF receives the data storage response.

The data storage response may include all stored policy information and network area information corresponding to policies. For example, the data storage response is an Nudr_DM_Query response.

5: The H-PCF determines a transfer policy.

The H-PCF determines one or more transfer policies based on the information provided by the AF and the received policy information.

6: The H-PCF sends a BDT control create response to the NEF. Correspondingly, the H-PCF receives the BDT control create response.

The BDT control create response may include one or more BDT policies and one BDT reference ID.

For example, the BDT control create response is an Npcf_BDTPolicyControl_Create response.

7: The NEF sends a BDT create response to the AF. Correspondingly, the AF receives the BDT create response.

The BDT create response may include the one or more BDT policies and the BDT reference ID. For example, the BDT create response is an Nnef_BDTPNegotiation_Create response.

Herein, if the NEF receives one BDT policy, steps 8 to 11 are not performed. Optionally, if the NEF receives a plurality of BDT policies, steps 8 to 11 are performed.

8: The AF sends a BDT update request to the NEF. Correspondingly, the NEF receives the BDT update request.

The BDT update request includes a selected transfer policy.

Optionally, the AF may select one BDT policy from the plurality of BDT policies, and send the BDT update request to the NEF. The BDT update request includes the BDT policy selected by the AF. For example, the BDT update request may be an Nnef_BDTPNegotiation_Update request.

9: The NEF sends a BDT control update request to the H-PCF. Correspondingly, the H-PCF receives the BDT control update request.

The BDT control update request includes the selected BDT policy. For example, the BDT control update request may be an Npcf_BDTPolicyControl_Update request.

10: The H-PCF sends a BDT control update response to the NEF. Correspondingly, the NEF receives the BDT control update response.

For example, the BDT control update response may be an Npcf_BDTPolicyControl_Update response.

11: The NEF sends a BDT update response to the AF. Correspondingly, the AF receives the BDT update response.

For example, the BDT update response may be an Nnef_BDTPNegotiation_Update response.

12: The H-PCF sends a policy update request to the UDR. Correspondingly, the UDR receives the policy update request.

The policy update request includes the BDT reference ID and the BDT policy. For example, the policy update request may be an Nudr_DM_Update request.

Corresponding to the implementation 1 in step 1, the H-PCF includes the first service information received from the NEF in step 2 in the policy update request, such that the UDR stores the BDT reference ID, the BDT policy, and the corresponding first service information.

Corresponding to the implementation 2 in step 1, the H-PCF includes the indication information and/or the third-party identifier information that are/is received from the NEF in step 2 in the policy update request (not shown in the figure), such that the UDR stores the BDT reference ID, the BDT policy, and the indication information and/or the third-party identifier information.

For example, corresponding to the implementation 2 in step 1, if the BDT create control request in step 2 includes the indication information, the policy update request sent by the H-PCF to the UDR in step 12 further includes the indication information.

For example, corresponding to the implementation 2 in step 1, if the BDT create control request in step 2 further includes the indication information and the third-party identifier information, the policy update request sent by the H-PCF to the UDR in step 12 further includes the indication information and the third-party identifier information.

For example, corresponding to the implementation 2 in step 1, if the BDT create control request in step 2 further includes the third-party identifier information, the policy update request sent by the H-PCF to the UDR in step 12 further includes the third-party identifier information.

For descriptions of the indication information and the third-party identifier information in the foregoing examples, refer to the foregoing descriptions. Details are not described herein again.

13: The UDR sends a policy update response to the H-PCF. Correspondingly, the H-PCF receives the policy update response.

For example, the policy update response may be an Nudr_DM_Update response.

Therefore, the procedure in FIG. 17 describes a process of adding the first service information in the BDT policy negotiation process.

It should be understood that the procedure shown in FIG. 17 is merely for ease of understanding by a person skilled in the art, and does not constitute any limitation on the embodiments of this application.

After obtaining the first service information, the first policy control function network element may further generate a URSP. Optionally, the first policy control function network element generates a URSP of a terminal based on the first service information and the first background data transfer policy.

For example, if it is determined that the first background data transfer policy is sent to UE as a URSP rule of the UE, after obtaining the first service information and the first background data transfer policy, the first policy control function network element may further generate a URSP based on the first service information and the first background data transfer policy.

Figure 18:
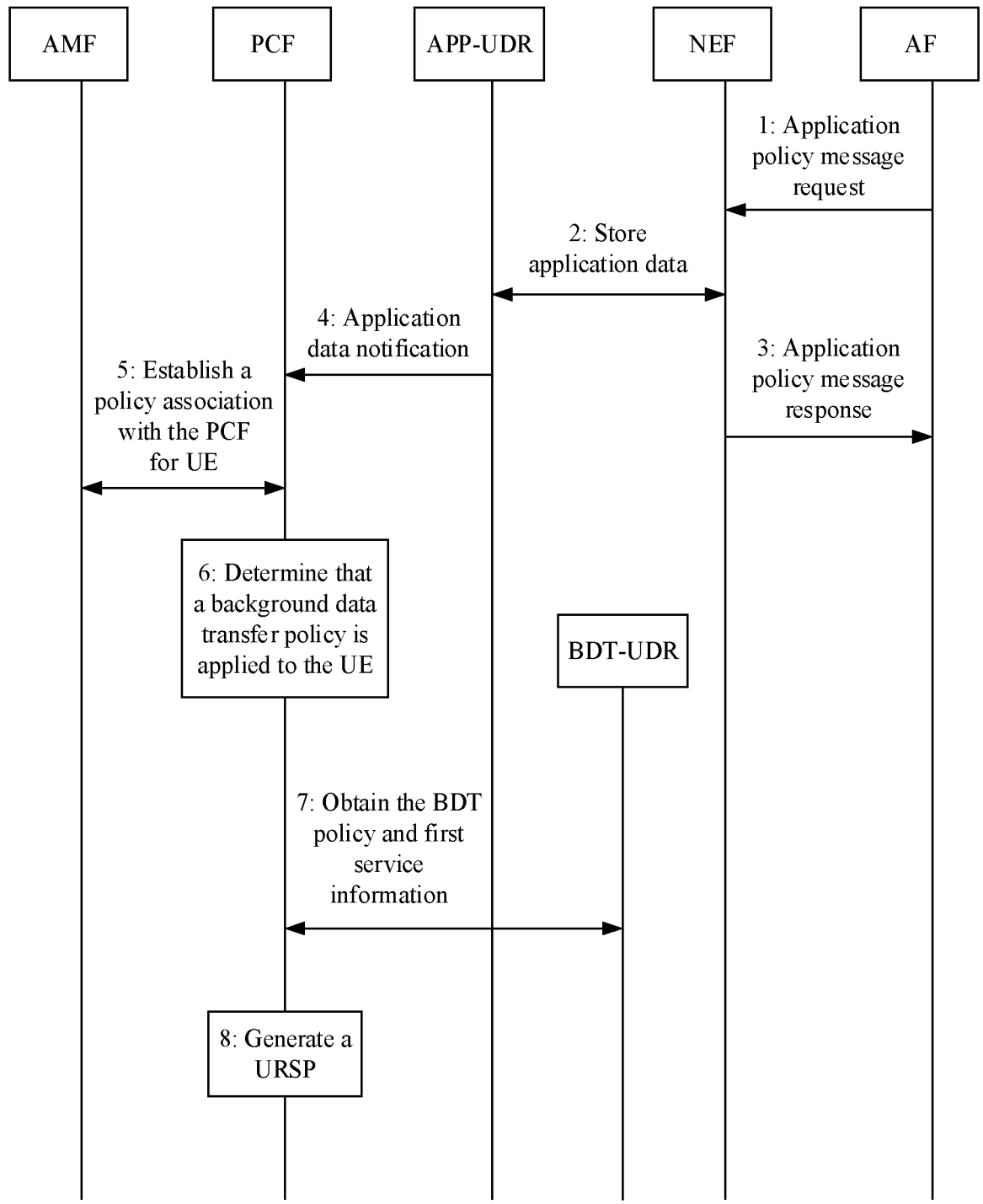
FIG. 18 is a schematic interaction diagram of a further example of a method for managing a background data transfer policy according to an embodiment of this application.

For example, after the background data transfer policy is negotiated using the flowchart in FIG. 17, if the AF determines to send the BDT policy to the UE as the URSP rule of the UE, or the AF determines to apply the background data transfer policy to a future PDU session, the procedure in FIG. 18 may be performed. FIG. 18 is described using an example in which the application function network element is an AF, the first policy control function network element is a PCF, the first data storage network element is a BDT-UDR, the network exposure network element is an NEF, and a mobility management network element is an AMF. An APP-UDR is further included in FIG. 18. It may be understood that the APP-UDR may be the same as or different from the BDT-UDR. This is not limited. As shown in FIG. 18, the following steps are included.

Step 1: The AF sends an application policy message request to the NEF. Correspondingly, the NEF receives the application policy message request.

Optionally, the policy message request includes a BDT reference ID, an external UE ID, or an external group ID. The BDT reference ID is determined in a negotiation process.

Optionally, the NEF interacts with a UDM to obtain the external UE ID, a SUPI corresponding to the external UE ID, or an internal group ID. A process of the interaction between the NEF and the UDM is not shown in FIG. 18.

Step 2: The NEF stores application data in the APP-UDR.

The NEF stores the BDT reference ID, the SUPI, or the internal group ID in the APP-UDR. During information storage, a data set is set to application data, a data subset is set to background data for transfer, and a data keyword is set to an SUPI or an external identifier.

Step 3: The NEF sends an application policy message response to the AF. Correspondingly, the AF receives the application policy message response.

Step 4: The APP-UDR sends an application data notification to the PCF. Correspondingly, the PCF receives the application data notification.

Optionally, the application data notification includes the BDT reference ID, a UE ID (for example, the SUPI), or the internal group ID.

In other words, the APP-UDR may send the BDT reference ID, the SUPI, or the internal group ID to the PCF that subscribes to a request.

Optionally, if content subscribed to by the PCF is UE-specific application data, the APP-UDR may send the BDT reference ID to the PCF that subscribes to the request.

Optionally, the application data notification message may alternatively be an application data request response message, and the response message includes the BDT reference ID.

Step 5: When UE accesses a network, the AMF establishes a policy association with the PCF for the UE.

A sequence of step 5 and step 4 is not limited herein. Optionally, step 5 may be performed before step 4. This is not limited in this embodiment of this application.

Step 6: The PCF determines, based on the SUPI or the internal group ID sent by the APP-UDR, to send a BDT policy to the UE as a URSP.

Optionally, when the PCF determines that a specific condition is satisfied, for example, when a specific time is about to arrive or the UE is located in a specific area, the PCF determines to send the BDT policy to the UE as a part of the URSP.

Optionally, if the APP-UDR sends a UE-specific BDT ID to the PCF in step 4, in step 6, the PCF does not need to determine, based on the SUPI or the internal group ID, to send the BDT policy to the UE as the URSP.

Step 7: The PCF obtains the BDT policy from a UDR of the BDT policy.

For example, the PCF sends a BDT policy obtaining request to the UDR of the BDT policy. The BDT policy obtaining request includes the BDT reference ID.

Corresponding to the implementation 1 in step 1 in FIG. 17, the BDT-UDR sends policy information corresponding to the BDT reference ID and first service information to the PCF. The first service information is stored in the BDT-UDR in the negotiation process (for example, stored in the BDT-UDR in the negotiation process in FIG. 17). To be more specific, the PCF may obtain both a background data transfer policy (for example, a first background data transfer policy) corresponding to the BDT reference ID and the first service information (where for example, the first service information includes one or more of a DNN, S-NSSAI, or service description information) from the BDT-UDR.

Optionally, the PCF stores the BDT policy and the first service information.

Corresponding to the implementation 2 in step 1 in FIG. 17, the BDT-UDR sends indication information and/or third-party identifier information (not shown in the figure) to the PCF.

For example, corresponding to the implementation 2 in step 1, if the BDT-UDR stores the indication information, in step 7, the PCF may obtain the indication information from the UDR.

For example, corresponding to the implementation 2 in step 1, if the BDT-UDR stores the indication information and the third-party identifier information, in step 7, the PCF may obtain the indication information and the third-party identifier information from the BDT-UDR.

For example, corresponding to the implementation 2 in step 1, if the BDT-UDR stores the third-party identifier information, in step 7, the PCF may obtain the third-party identifier information from the BDT-UDR.

For descriptions of the indication information and the third-party identifier information in the foregoing examples, refer to the foregoing descriptions. Details are not described herein again.

It should be noted that the first service information stored in the BDT-UDR is independent of the indication information and/or the third-party identifier information. There is no association between the first service information and the indication information and/or the third-party identifier information. The first service information and the indication information and/or the third-party identifier information are used in different processes. For example, the first service information is related to a process of generating the URSP. To be more specific, the PCF uses the first service information when generating the URSP. The indication information and/or the third-party identifier information are/is related to generation of a PCC rule. To be more specific, the PCF uses the indication information and/or the third-party identifier information when generating the PCC rule. For example, the BDT-UDR stores the first service information. For another example, the BDT-UDR stores the indication information and/or the third-party identifier information. A person skilled in the art can understand that the descriptions herein are merely for brevity, but do not mean that there is an association between the first service information and the indication information and/or the third-party identifier information.

Step 8: The PCF generates the URSP based on the received BDT policy and the first service information.

Optionally, if the PCF receives an OSID sent by the AMF, the PCF generates the URSP based on the BDT policy, the first service information, and the OSID. For example, if the first service information includes an OSID+OSAppID list, the PCF selects a corresponding OSID and OSAppID based on the OSID reported by the UE, and generates a URSP. Optionally, the PCF sends the URSP to the UE via the AMF.

Therefore, the procedure in FIG. 18 describes a process of sending the BDT policy to the UE as the URSP.

It should be understood that the procedure shown in FIG. 18 is merely for ease of understanding by a person skilled in the art, and does not constitute any limitation on the embodiments of this application.

For example, the PCF in FIG. 18 is used as an example, and the PCF stores the BDT ID in PDU session policy control subscription information of the UDR based on the DNN and the S-NSSAI. When the UE uses the DNN and S-NSSAI to establish a PDU session, a PCF that serves the PDU session obtains the BDT ID from the PDU session policy control subscription information, and obtains a corresponding BDT policy based on the BDT ID. If the PCF obtains the indication information and/or the third-party identifier information in step 7, the PCF generates the PCC rule based on the BDT policy and the indication information and/or the third-party identifier information.

For another example, the PCF in FIG. 18 is used as an example, and the PCF stores the BDT ID in PDU session policy control subscription information of the UDR based on the DNN and the S-NSSAI. When the UE uses the DNN and S-NSSAI to establish a PDU session, the PCF that serves the PDU session obtains the BDT ID from the PDU session policy control subscription information, and obtains a corresponding BDT policy based on the BDT ID. Further, the PCF that serves the PDU session further obtains the indication information and/or the third-party identifier information. The PCF generates the PCC rule based on the BDT policy, and the indication information and/or the third-party identifier information.

A description is provided herein. This embodiment of this application is described using an example in which the first service information, and the indication information and/or the third-party identifier information are included in a same message (for example, the third message or the following first message). This does not constitute a limitation on the embodiments of this application. Actually, the first service information, and the indication information and/or the third-party identifier information may be carried in different messages. For example, the first service information is carried in a message 1, and the indication information is carried in a message 2. For another example, the first service information is carried in a message 1, the indication information is carried in a message 2, and the third-party identifier information is carried in a message 3.

In a second possible implementation for obtaining the first service information, the foregoing embodiment in FIG. 9 is used as an example. Descriptions are provided for the first policy control function network element.

The first policy control function network element receives the first message. The first message carries the first identifier and the first service information. The first service information includes one or more of the DNN, the S-NSSAI, or the service description information.

A difference between this implementation and the first possible implementation for obtaining the first service information is that the first service information obtained by the first policy control function network element is obtained in an application process. That is, the first service information is not added in a background data transfer policy negotiation process.

Optionally, the first message may be sent by a fourth data storage network element to the first policy control function network element. For example, the first message is an application data notification, and the application data notification includes a BDT reference identifier and the first service information. The fourth data storage network element may be the same as or different from the first data storage network element. This is not limited.

In the second possible implementation for obtaining the first service information, the first service information is provided in the application process. The first service information does not need to be added in the background data transfer policy negotiation process. For the background data transfer policy negotiation, refer to the foregoing process in FIG. 12.

Optionally, the network exposure network element receives an application policy request from the application function network element. The application policy request includes second service information. Then, the network exposure network element determines the first service information based on the second service information. Finally, the network exposure network element sends a storage application request to the fourth data storage network element. The storage application request includes the first service information. That is, the network exposure network element obtains the first service information in the application process, and stores the first service information in the fourth data storage network element, such that the first policy control function network element subsequently obtains the first service information.

Optionally, after obtaining the first service information from the first message, the first policy control function network element may further generate a URSP. Optionally, the first policy control function network element generates a URSP of a terminal based on the first service information and the first background data transfer policy.

For example, if it is determined that the first background data transfer policy is sent to UE as a URSP rule of the UE, after obtaining the first service information and the first background data transfer policy, the first policy control function network element may further generate a URSP based on the first service information and the first background data transfer policy.

In a second possible implementation for obtaining the indication information and/or the third-party identifier information, the foregoing embodiment in FIG. 9 is used as an example. Descriptions are provided for the first policy control function network element.

The first policy control function network element receives the first message. The first message carries the first identifier, and the indication information and/or the third-party identifier information. For descriptions of the indication information and the third-party identifier information, refer to the foregoing descriptions. Details are not described herein again.

That is, the first policy control function network element may alternatively obtain the indication information and/or the third-party identifier information through the first message. The first policy control function network element generates a PCC rule based on the first background data transfer policy and the indication information and/or the third-party identifier information.

A difference between this implementation and the first possible implementation for obtaining the indication information and/or the third-party identifier information is that the indication information and/or the third-party identifier information obtained by the first policy control function network element are/is obtained in an application process. That is, the indication information and/or the third-party identifier information are/is not added in a background data transfer policy negotiation process.

Optionally, the first message may be sent by a fourth data storage network element to the first policy control function network element. For example, the first message is an application data notification, and the application data notification includes a BDT reference identifier and the indication information and/or the third-party identifier information. The fourth data storage network element may be the same as or different from the first data storage network element. This is not limited.

In the second possible implementation for obtaining the indication information and/or the third-party identifier information, the indication information and/or the third-party identifier information are/is provided in the application process. The indication information and/or the third-party identifier information do/does not need to be added in the background data transfer policy negotiation process. For the background data transfer policy process, refer to the foregoing process in FIG. 12.

Optionally, the network exposure network element receives an application policy request from the application function network element. The application policy request includes the indication information and/or the third-party identifier information. Then, the network exposure network element obtains the indication information and/or the third-party identifier information. Finally, the network exposure network element sends a storage application request to the fourth data storage network element. The storage application request includes the indication information and/or the third-party identifier information. That is, the network exposure network element obtains the indication information and/or the third-party identifier information in the application process, and stores the indication information and/or the third-party identifier information in the fourth data storage network element, such that the first policy control function network element subsequently obtains the indication information and/or the third-party identifier information.

Figure 19:
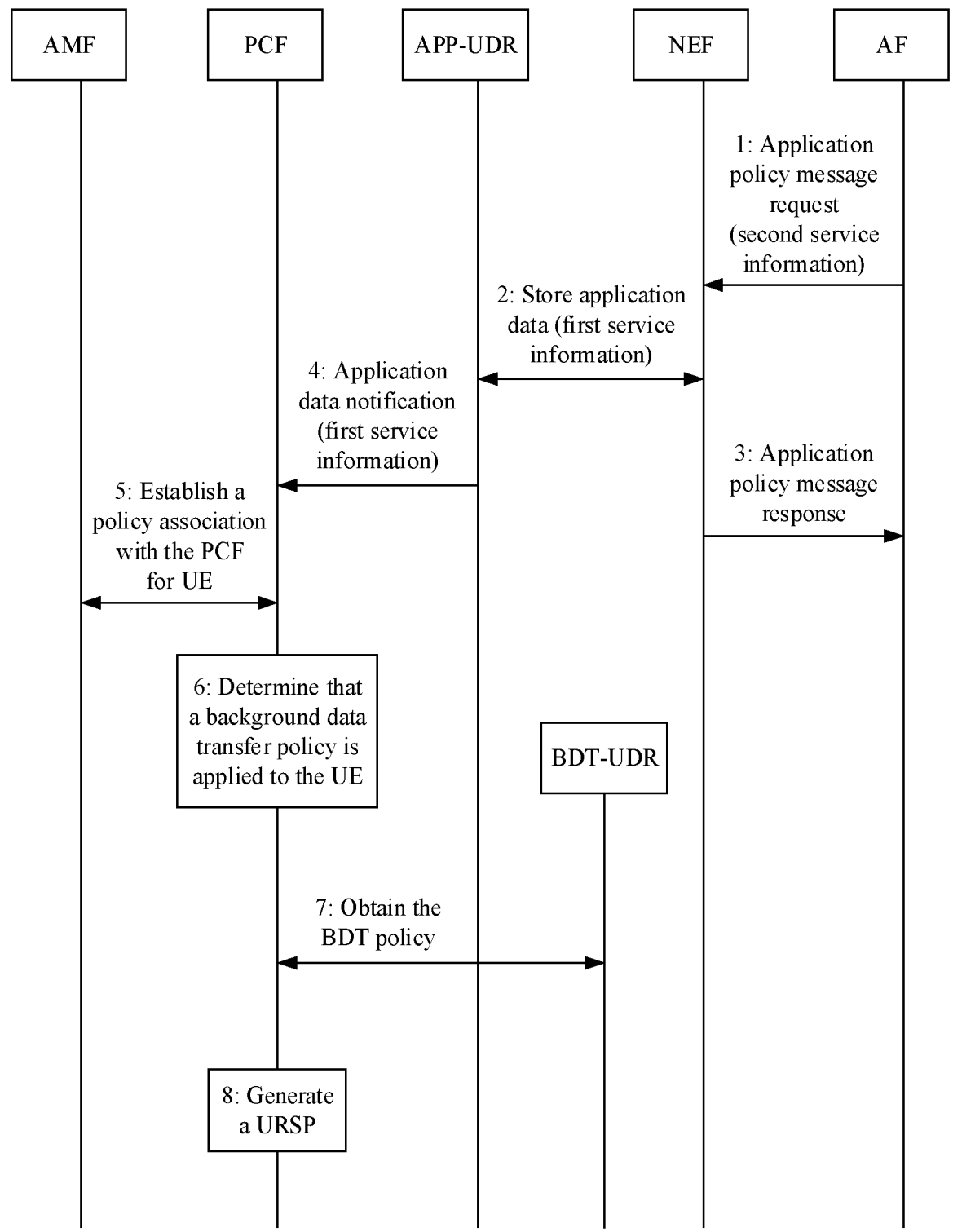
FIG. 19 is a schematic interaction diagram of a still further example of a method for managing a background data transfer policy according to an embodiment of this application.

After the background data transfer policy is negotiated using the flowchart in FIG. 12, if the AF determines to send the BDT policy to the UE as the URSP rule of the UE, the procedure in FIG. 19 may be performed. For ease of understanding, FIG. 19 is described using an example in which the application function network element is an AF, the first policy control function network element is a PCF, the first data storage network element is a BDT-UDR, the network exposure network element is an NEF, and the fourth data storage network element is an APP-UDR. As shown in FIG. 19, the following steps are included.

Step 1: The AF sends an application policy message request to the NEF. Correspondingly, the NEF receives the application policy message request.

Optionally, the application policy message request includes a BDT reference ID, an external UE ID, or an external group ID. The BDT reference ID is determined in a policy negotiation process. In addition to the foregoing content, content included in the application policy message request may further include two possible implementations.

Implementation 1: Optionally, the application policy message request further includes second service information.

Optionally, the second service information includes service description information. For example, the service description information includes: an APP ID, a service filter, or one or more OSIDs+OSAppIDs.

Optionally, the second service information further includes one or more of the following: a DNN, an S-NSSAI, or an AF service ID.

Optionally, the NEF interacts with a UDM to obtain the external UE ID, a SUPI corresponding to the external UE ID, or an internal group ID. (A process of the interaction between the NEF and the UDM is not shown in FIG. 19).

Herein, if the second service information received by the NEF from the AF includes the AF service ID, the NEF obtains a corresponding DNN and S-NSSAI based on the AF service ID. For example, the NEF may obtain the DNN and the S-NSSAI that correspond to the AF service ID based on a local configuration (namely, the AF service ID and the corresponding DNN and S-NSSAI that are stored in the NEF). For another example, the NEF obtains the DNN and the S-NSSAI that correspond to the AF service ID from another network element.

Alternatively, if the second service information includes the service description information, optionally, the NEF obtains the DNN and the S-NSSAI based on an ASP ID and a local configuration (namely, the ASP ID and the corresponding DNN and S-NSSAI that are stored in the NEF).

Implementation 2 (not shown in the figure): Optionally, the application policy message request includes indication information (for example, a sponsor status) and/or third-party identifier information (for example, a sponsor ID).

Step 2: The NEF stores application data in the APP-UDR.

Corresponding to the implementation 1 in step 1, optionally, the NEF stores the BDT reference ID, the SUPI, or the internal group ID, and first service information in the APP-UDR. During information storage, a dataset is set to application data, a data subset is set to background data transfer, and a data keyword is set to an SUPI or an external identifier. Optionally, the first service information includes the DNN and the S-NSSAI. The service description information includes the APP ID, the service filter, or the one or more OSIDs+OSAppIDs.

Corresponding to the implementation 2 (not shown in the figure) in step 1, optionally, the NEF stores the BDT reference ID, the SUPI, or the internal group ID, and the indication information and/or the third-party identifier information in the APP-UDR.

For example, corresponding to the implementation 2 in step 1, if the application policy message request in step 1 includes the indication information, content stored by the NEF in the APP-UDR in step 2 includes the indication information. For example, if the indication information indicates to enable third-party payment, it indicates that a third-party organization corresponding to a default third-party identifier pays for a connection of a terminal device.

For example, corresponding to the implementation 2 in step 1, if the application policy message request in step 1 includes the indication information and the third-party identifier information, content stored by the NEF in the APP-UDR in step 2 includes the indication information and the third-party identifier information. For example, if the indication information indicates to enable third-party payment, it indicates that a third-party organization corresponding to a third-party identifier pays for a connection of a terminal device. If the indication information indicates to disable third-party payment, the third-party organization corresponding to the third-party identifier is disabled to pay for the connection of the terminal device. That is, the terminal device pays for the connection of the terminal device.

For example, corresponding to the implementation 2 in step 1, if the application policy message request in step 1 includes the third-party identifier information, content stored by the NEF in the APP-UDR in step 2 includes the third-party identifier information. This indicates that the third-party organization corresponding to the third-party identifier pays for the connection of the terminal device.

Step 3: The NEF sends an application policy message response to the AF. Correspondingly, the AF receives the application policy message response.

Step 4: The APP-UDR sends an application data notification to the PCF. Correspondingly, the PCF receives the application data notification.

The APP-UDR sends the application data notification to the PCF that subscribes to a request. The application data notification includes one or more of the BDT reference ID, the SUPI, or the internal group ID.

Optionally, if content subscribed to by the PCF is UE-specific application data, the APP-UDR may send the BDT reference ID to the PCF that subscribes to the request.

Optionally, the application data notification may alternatively be an application data request response message, and the application data request response message includes the BDT reference ID.

In addition to the foregoing content, content included in the application data notification further includes two possible implementations.

Corresponding to the implementation 1 in step 1, the application data notification includes the first service information.

Corresponding to the implementation 2 in step 2 (not shown in the figure), the application data notification includes the indication information and/or the third-party identifier information.

For example, corresponding to the implementation 2 in step 1, if the APP-UDR stores the indication information, in step 4, the PCF may obtain the indication information from the APP-UDR.

For example, corresponding to the implementation 2 in step 1, if the APP-UDR stores the indication information and the third-party identifier information, in step 4, the PCF may obtain the indication information and the third-party identifier information from the APP-UDR.

For example, corresponding to the implementation 2 in step 1, if the APP-UDR stores the third-party identifier information, in step 4, the PCF may further obtain the third-party identifier information from the APP-UDR.

For descriptions of the indication information and the third-party identifier information in the foregoing examples, refer to the foregoing descriptions. Details are not described herein again.

It should be noted that the first service information stored in the APP-UDR is independent of the indication information and/or the third-party identifier information. There is no association between the first service information and the indication information and/or the third-party identifier information. The first service information and the indication information and/or the third-party identifier information are used in different processes. For example, the first service information is related to a process of generating a URSP. To be more specific, the PCF uses the first service information when generating the URSP. The indication information and/or the third-party identifier information are/is related to generation of a PCC rule. To be more specific, the PCF uses the indication information and/or the third-party identifier information when generating the PCC rule. For example, the APP-UDR stores the first service information. For another example, the APP-UDR stores the indication information and/or the third-party identifier information. A person skilled in the art can understand that the descriptions herein are merely for brevity, but do not mean that there is an association between the first service information and the indication information and/or the third-party identifier information.

Step 5: When UE accesses a network, an AMF establishes a policy association with the PCF for the UE.

A sequence of step 5 and step 4 is not limited herein. Optionally, step 5 may be performed before step 4. This is not limited in this instance of this application.

Step 6: The PCF determines, based on the SUPI or the internal group ID sent by the APP-UDR, to send a BDT policy to the UE as a URSP.

Optionally, when the PCF determines that a specific condition is satisfied, for example, when a specific time is about to arrive or the UE is located in a specific area, the PCF determines to send the BDT policy to the UE as a part of the URSP.

Optionally, when the PCF obtains application data of the UE, the PCF determines, based on a local configuration or when a specific condition is met, to send the BDT policy to the UE as a part of the URSP, and does not need to determine, based on the SUPI or the internal group ID, the BDT policy for transmission.

Step 7: The PCF obtains the BDT policy from a UDR of the BDT policy.

The PCF sends a request to the UDR of the BDT policy. The request message includes the BDT reference ID. The UDR sends policy information corresponding to the BDT reference ID to the PCF.

Step 8: The PCF generates the URSP based on the received BDT policy and the first service information obtained in step 4.

Optionally, if the PCF receives an OSID sent by the AMF, the PCF generates the URSP based on the BDT policy, the first service information, and the OSID. For example, if the first service information includes an OSID+OSAppID list, the PCF selects a corresponding OSID and OSAppID based on an OSID reported by the UE, and generates the URSP. Optionally, the PCF first sends the URSP to the UE via the AMF.

Therefore, the procedure in FIG. 19 describes a process of adding the service information in an application process.

It should be understood that the procedure shown in FIG. 19 is merely for ease of understanding by a person skilled in the art, and does not constitute any limitation on the embodiments of this application.

For example, the PCF in FIG. 19 is used as an example, and the PCF stores the BDT ID in PDU session policy control subscription information of the UDR based on the DNN and the S-NSSAI. If the first message (for example, the application data notification in step 4) received by the PCF includes the indication information and/or the third-party identifier information, the PCF stores the indication information and/or the third-party identifier information together with a BDT ID in the PDU session policy control subscription information of the UDR. When the UE uses the DNN and S-NSSAI to establish a PDU session, a PCF that serves the PDU session obtains the BDT ID and the indication information and/or the third-party identifier information from the PDU session policy control subscription information, and obtains a corresponding BDT policy based on the BDT ID. The PCF generates the PCC rule based on the BDT policy and the indication information/the third-party identifier information. The PCF that serves the PDU session may be the same as or different from the PCF that generates the URSP. If the PCF that serves the PDU session is the same as the PCF that generates the URSP, and the PCF locally includes the indication information/third-party identifier information and a policy corresponding to the BDT ID, an action of obtaining the BDT ID and the indication information and/or the third-party identifier information from the UDR may be skipped.

In a third possible implementation for obtaining the first service information, the foregoing embodiment in FIG. 9 is used as an example. Descriptions are provided for the first policy control function network element.

The first policy control function network element receives the first message. The first message carries the first identifier and the ASP ID. The first policy control function network element obtains the first service information from the fourth data storage network element based on the ASP ID. The first service information includes one or more of the DNN, the S-NSSAI, or the service description information.

A difference between the third possible implementation for obtaining the first service information and the first possible implementation for obtaining the first service information is that the first service information is configured by introducing a configuration process. Herein, the first service information does not need to be added in a background data transfer policy negotiation process.

Optionally, the application function network element sends a first application configuration message to the network exposure network element. The first application configuration message includes the second service information and the ASP ID. The network exposure network element determines the first service information based on the second service information. The first service information includes one or more of the DNN, the S-NSSAI, or the service description information. The network exposure network element sends a second application configuration message to the fourth data storage network element. The second application configuration message includes the ASP ID and the first service information. That is, the application function network element sends the second service information and the ASP ID to the network exposure network element through the application configuration message. After obtaining the second service information and the ASP ID, the network exposure network element may determine the first service information.

Optionally, the network exposure network element sends the second application configuration message to the fourth data storage network element. The second application configuration message includes the ASP ID and the first service information. That is, the network exposure network element may store the ASP ID and the first service information in the fourth data storage network element, such that the first policy control function network element obtains the first service information. It may be understood that the fourth data storage network element may be the same as or different from the first data storage network element.

In a third possible implementation for obtaining the indication information and/or the third-party identifier information, the foregoing embodiment in FIG. 9 is used as an example. Descriptions are provided for the first policy control function network element. The first policy control function network element receives the first message. The first message carries the first identifier and the ASP ID. The first policy control function network element obtains the indication information and/or the third-party identifier information from the fourth data storage network element based on the ASP ID. The indication information is used to indicate whether third-party charging is enabled.

That is, the first policy control function network element may obtain the indication information and/or the third-party identifier information based on the ASP ID. For related descriptions of the indication information and/or the third-party identifier information, refer to the foregoing descriptions. Details are not described herein.

A difference between the third possible implementation for obtaining the indication information and/or the third-party identifier information and the first possible implementation for obtaining the indication information and/or the third-party identifier information lies in that the indication information and/or the third-party identifier information are/is configured by introducing a configuration process. Herein, the indication information and/or the third-party identifier information do/does not need to be added in a background data transfer policy negotiation process.

Optionally, the application function network element sends a first application configuration message to the network exposure network element. The first application configuration message includes the ASP ID and the indication information and/or the third-party identifier information. The network exposure network element determines the indication information and/or the third-party identifier information based on the ASP ID. The network exposure network element sends a second application configuration message to the fourth data storage network element. The second application configuration message includes the ASP ID, and the indication information and/or the third-party identifier information. That is, the application function network element sends the ASP ID, and the indication information and/or the third-party identifier information to the network exposure network element through the application configuration message. The network exposure network element may obtain the ASP ID, and the indication information and/or the third-party identifier information.

Optionally, the network exposure network element sends the second application configuration message to the fourth data storage network element. The second application configuration message includes the ASP ID, and the indication information and/or the third-party identifier information. That is, the network exposure network element may store the ASP ID, and the indication information and/or the third-party identifier information in the fourth data storage network element, such that the first policy control function network element obtains the indication information and/or the third-party identifier information. It may be understood that the fourth data storage network element may be the same as or different from the first data storage network element.

Figure 20:
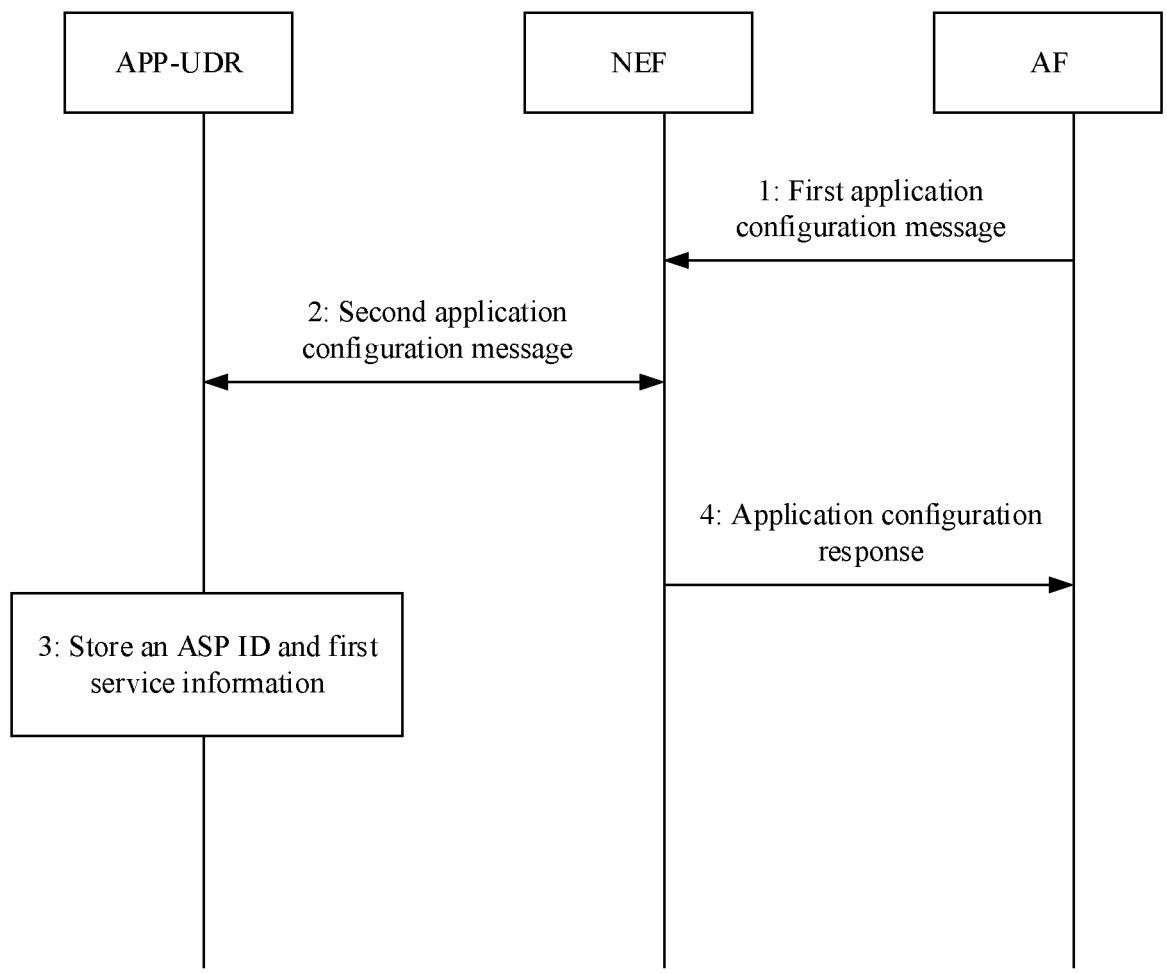
FIG. 20 is a schematic interaction diagram of a yet further example of a method for managing a background data transfer policy according to an embodiment of this application.

For ease of understanding, the following describes a process of configuring service information with reference to a procedure in FIG. 20. FIG. 20 is described using an example in which the fourth data storage network element is an APP-UDR, the network exposure network element is an NEF, and the application function network element is an AD. As shown in FIG. 20, the following steps are included.

1: The AF sends a first application configuration message to the NEF. Correspondingly, the NEF receives the first application configuration message.

The first application configuration message includes an ASP ID. In addition to the ASP ID, content included in the first application configuration message may include different implementations.

Implementation 1: The first application configuration message further includes second service information corresponding to the ASP ID.

Optionally, the second service information includes service description information. For example, the service description information includes: an APP ID, a service filter, or one or more OSIDs+OSAppIDs.

Optionally, the second service information further includes one or more of the following: a DNN, an S-NSSAI, or an AF service ID.

The NEF may determine first service information based on the second service information. Herein, if the second service information received by the NEF from the AF includes the AF service ID, the NEF obtains a corresponding DNN and S-NSSAI based on the AF service ID. For example, the NEF may obtain the DNN and the S-NSSAI that correspond to the AF service ID based on a local configuration (namely, the AF service ID and the corresponding DNN and S-NSSAI that are stored in the NEF). For another example, the NEF obtains the DNN and the S-NSSAI that correspond to the AF service ID from another network element.

Alternatively, if the second service information includes the service description information, optionally, the NEF obtains the DNN and the S-NSSAI based on the ASP ID and a local configuration (namely, the ASP ID and the corresponding DNN and S-NSSAI that are stored in the NEF).

Implementation 2: The first application configuration message may further include indication information and/or third-party identifier information.

2: The NEF sends a second application configuration message to the APP-UDR. Correspondingly, the APP-UDR receives the second application configuration message.

Corresponding to the implementation 1 in step 1, optionally, the second application configuration message includes the ASP ID and the first service information. The NEF stores the ASP ID and the first service information in the APP-UDR.

Optionally, the first service information includes the DNN and the S-NSSAI. The service description information includes the APP ID, the service filter, or the one or more OSIDs+OSAppIDs.

Corresponding to the implementation 2 (not shown in the figure) in step 1, optionally, the second application configuration message includes the ASP ID, and the indication information and/or the third-party identifier information. The NEF stores the ASP ID, and the indication information and/or the third-party identifier information in the APP-UDR.

For example, corresponding to the implementation 2 in step 1, if the first application configuration message in step 1 includes the indication information, the second application configuration message sent by the NEF to the APP-UDR in step 2 further includes the indication information. For example, if the indication information indicates to enable third-party payment, it indicates that a third-party organization corresponding to a default third-party identifier pays for a connection of a terminal device.

For example, corresponding to the implementation 2 in step 1, if the first application configuration message in step 1 includes the indication information and the third-party identifier information, the second application configuration message sent by the NEF to the APP-UDR in step 2 further includes the indication information and the third-party identifier information. For example, if the indication information indicates to enable third-party payment, it indicates that a third-party organization corresponding to a third-party identifier pays for a connection of a terminal device. If the indication information indicates to disable third-party payment, the third-party organization corresponding to the third-party identifier is disabled to pay for the connection of the terminal device. That is, the terminal device pays for the connection of the terminal device.

For example, corresponding to the implementation 2 in step 1, if the first application configuration message in step 1 includes the third-party identifier information, the second application configuration message sent by the NEF to the APP-UDR in step 2 further includes the third-party identifier information. This indicates that the third-party organization corresponding to the third-party identifier pays for the connection of the terminal device.

3: The APP-UDR stores the ASP ID and the first service information.

Corresponding to the implementation 1 in step 1, optionally, the second application configuration message in step 2 includes the ASP ID and the first service information. In this case, the NEF stores the ASP ID and the first service information in the APP-UDR.

Corresponding to the implementation 2 (not shown in the figure) in step 1, optionally, the second application configuration message in step 2 includes the ASP ID, and the indication information and/or the third-party identifier information. In this case, the NEF stores the ASP ID, and the indication information and/or the third-party identifier information in the APP-UDR.

4: The NEF sends an application configuration response to the AF. Correspondingly, the AF receives the application configuration response.

A process of storing the ASP ID and the corresponding first service information in the APP-UDR may be implemented by performing the process in FIG. 20, such that the first service information is subsequently obtained from the APP-UDR based on the ASP ID.

It may be understood that the procedure in FIG. 20 may be performed when the AF determines to send the BDT policy to the UE as the URSP rule of the UE. This is not limited.

Corresponding to the implementation 1 in step 1, after obtaining the first service information based on the ASP ID, the first policy control function network element may further generate a URSP. Optionally, the first policy control function network element generates a URSP of a terminal based on the first service information and the first background data transfer policy.

For example, if it is determined that the first background data transfer policy is sent to UE as the URSP rule of the UE, after obtaining the first service information and the first background data transfer policy, the first policy control function network element may further generate the URSP based on the first service information and the first background data transfer policy.

Figure 21:
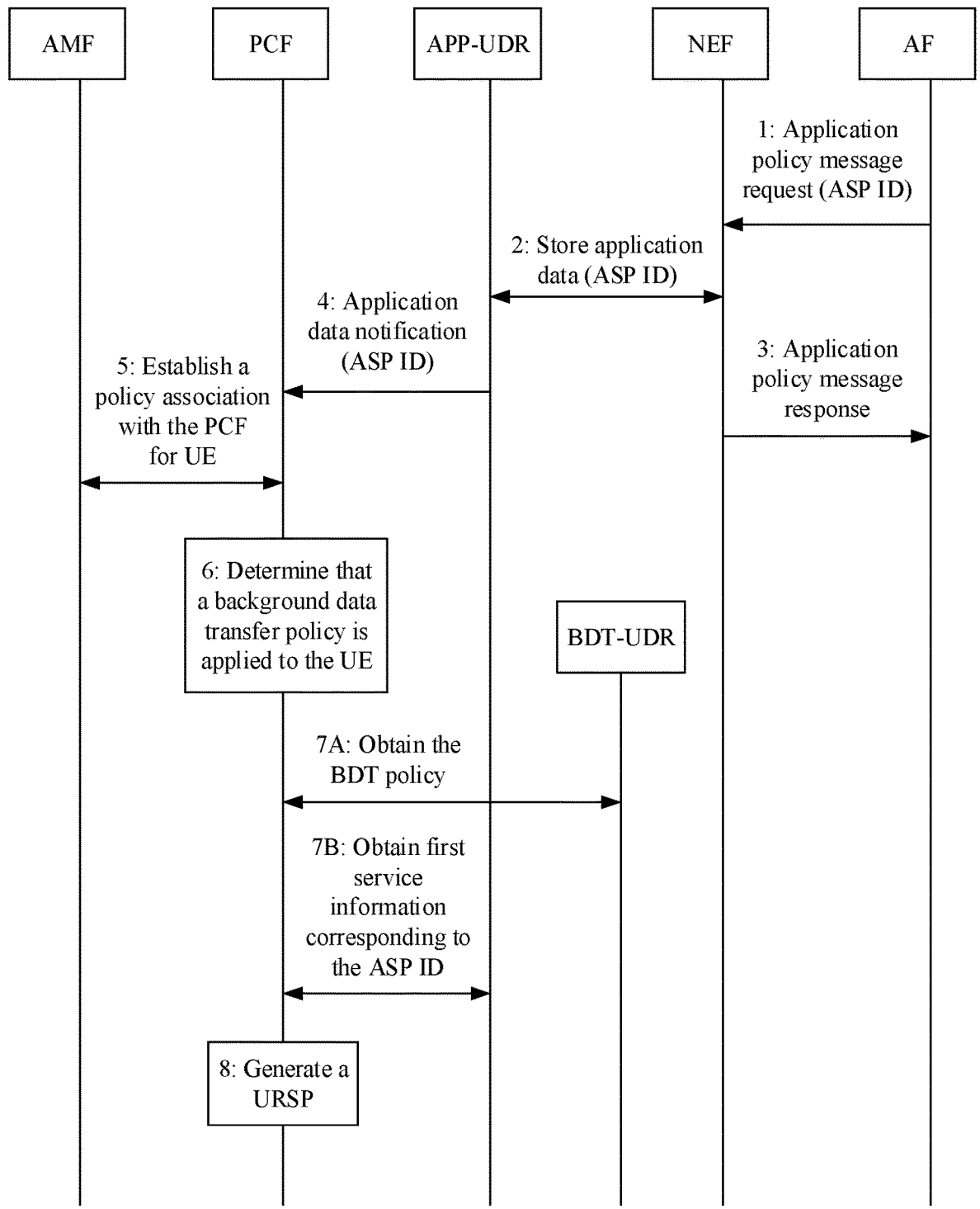
FIG. 21 is a schematic interaction diagram of a still yet further example of a method for managing a background data transfer policy according to an embodiment of this application.

For example, after the background data transfer policy is negotiated using the flowchart in FIG. 12, if the AF determines to send the BDT policy to the UE as the URSP rule of the UE, the procedure in FIG. 21 may be performed. For ease of understanding, FIG. 21 is described using an example in which the application function network element is an AF, the first policy control function network element is a PCF, the first data storage network element is a BDT-UDR, the network exposure network element is an NEF, and the fourth data storage network element is an APP-UDR. As shown in FIG. 21, the following steps are included.

1: The AF sends an application policy message request to the NEF. Correspondingly, the NEF receives the application policy message request.

Optionally, the application policy message request includes a BDT reference ID, an external UE ID, an external group ID, or an ASP ID. The BDT reference ID is determined in a policy negotiation process. Herein, a difference from FIG. 19 lies in that the application policy message request includes the ASP ID and may not include first service information.

Optionally, the NEF interacts with a UDM to obtain the external UE ID, a SUPI corresponding to the external UE ID, or an internal group ID. (A process of the interaction between the NEF and the UDM is not shown in FIG. 21).

2: The NEF stores application data in the APP-UDR.

Optionally, the NEF stores the BDT reference ID, the SUPI, the internal group ID, or the ASP ID in the UDR. During information storage, a dataset is set to application data, a data subset is set to background data transfer, and a data keyword is set to an SUPI or an external identifier.

3: The NEF sends an application policy message response to the AF. Correspondingly, the AF receives the application policy message response.

4: The APP-UDR sends an application data notification to the PCF. Correspondingly, the PCF receives the application data notification.

The APP-UDR sends the BDT reference ID, the SUPI, the internal group ID, or the ASP ID to the PCF that subscribes to a request.

Alternatively, optionally, the PCF may request application data of UE from the APP-UDR, and the APP-UDR sends a BDT reference ID and an ASP ID that correspond to the UE to the PCF.

5: When UE accesses a network, an AMF establishes a policy association with the PCF for the UE.

A sequence of step 5 and step 4 is not limited herein. Optionally, step 5 may be performed before step 4. This is not limited in this instance of this application.

6: The PCF determines, based on the SUPI or the internal group ID sent by the UDR, to send a BDT policy to the UE as a URSP.

Optionally, when the PCF determines that a specific condition is satisfied, for example, when a specific time is about to arrive or the UE is located in a specific area, the PCF determines to send the BDT policy to the UE as a part of the URSP.

Optionally, when the PCF obtains application data of the UE, the PCF determines, based on a local configuration or when a specific condition is met, to send the BDT policy to the UE as a part of the URSP, and does not need to determine, based on the SUPI or the internal group ID, the BDT policy for transmission.

7A: The PCF sends a BDT policy obtaining request to a UDR of the BDT policy.

The BDT policy obtaining request includes the BDT reference ID, and the BDT-UDR sends policy information corresponding to the BDT reference ID to the PCF. Optionally, if service description information corresponding to the ASP ID is not locally included, step 7B is initiated.

7B: The PCF sends a service information obtaining request to the APP-UDR, to obtain the first service information.

Corresponding to the implementation 1 in step 1 in FIG. 20, the service information obtaining request includes the ASP ID. The APP-UDR sends the first service information corresponding to the ASP ID to the PCF.

Corresponding to the implementation 2 (not shown in the figure) in step 1 in FIG. 20, the APP-UDR may send the indication information and/or the third-party identifier information to the PCF.

For example, corresponding to the implementation 2 in step 1 in FIG. 20, if the APP-UDR further stores the indication information, in step 7B, the PCF may obtain the indication information from the APP-UDR based on the ASP ID.

For example, corresponding to the implementation 2 in step 1 in FIG. 20, if the APP-UDR further stores the indication information and the third-party identifier information, in step 7B, the PCF may further obtain the indication information and the third-party identifier information from the APP-UDR based on the ASP ID.

For example, corresponding to the implementation 2 in step 1 in FIG. 20, if the APP-UDR further stores the third-party identifier information, in step 7B, the PCF may further obtain the third-party identifier information from the APP-UDR based on the ASP ID.

For descriptions of the indication information and the third-party identifier information in the foregoing examples, refer to the foregoing descriptions. Details are not described herein again.

It should be noted that the first service information that is stored in the APP-UDR and that corresponds to the ASP ID is independent of the indication information and/or the third-party identifier information. There is no association between the first service information and the indication information and/or the third-party identifier information. The first service information and the indication information and/or the third-party identifier information are used in different processes. For example, the first service information is related to a process of generating a URSP. To be more specific, the PCF uses the first service information when generating the URSP. The indication information and/or the third-party identifier information are/is related to generation of a PCC rule. To be more specific, the PCF uses the indication information and/or the third-party identifier information when generating the PCC rule. For example, the APP-UDR stores the first service information. For another example, the APP-UDR stores the indication information and/or the third-party identifier information. A person skilled in the art can understand that the descriptions herein are merely for brevity, but do not mean that there is an association between the first service information and the indication information and/or the third-party identifier information.

8: The PCF generates the URSP based on the received BDT policy and the first service information.

Corresponding to the implementation 1 in step 1 in FIG. 20, optionally, if the PCF receives an OSID sent by the AMF, the PCF generates the URSP based on the BDT policy, the first service information, and the OSID. For example, if the first service information includes an OSID+OSAppID list, the PCF selects a corresponding OSID and OSAppID based on an OSID reported by the UE, and generates the URSP. Optionally, the PCF first sends the URSP to the UE via the AMF.

Therefore, the procedure in FIG. 21 describes a process of obtaining the service information from the APP-UDR based on the ASP ID.

It should be understood that the procedure shown in FIG. 21 is merely for ease of understanding by a person skilled in the art, and does not constitute any limitation on the embodiments of this application.

In the third possible implementation, optionally, the first policy control function network element may further obtain the indication information and/or the third-party identifier information from the fourth data storage network element (for example, the APP-UDR in FIG. 21) based on the ASP ID included in the first message. The first policy control function network element generates a PCC rule based on the first background data transfer policy and the indication information and/or the third-party identifier information. For descriptions of the indication information and the third-party identifier information, refer to the foregoing descriptions. Details are not described herein again.

For example, the PCF in FIG. 21 is used as an example, and the PCF stores the BDT ID in PDU session policy control subscription information of the UDR based on the DNN and the S-NSSAI. If the first message received by the PCF further includes the ASP ID, the PCF obtains the indication information and/or the third-party identifier information from the UDR based on the ASP ID. The PCF further stores the indication information and/or the third-party identifier information together with the BDT ID in the PDU session policy control subscription information of the UDR. When the UE uses the DNN and S-NSSAI to establish a PDU session, a PCF that serves the PDU session obtains the BDT ID from the PDU session policy control subscription information, and obtains a corresponding BDT policy based on the BDT ID. Optionally, the PCF may further obtain the indication information and/or the third-party identifier information, and generate the PCC rule based on the BDT policy and the indication information and/or the third-party identifier information.

Alternatively, in another possible implementation, the PCF stores the BDT ID and the ASP ID in the PDU session policy control subscription information of the UDR based on the DNN and the S-NSSAI. When the UE uses the DNN and the S-NSSAI to establish a PDU session, a PCF that serves the PDU session obtains the BDT ID and ASP ID from the PDU session policy control subscription information, obtains a corresponding BDT policy based on the BDT ID, obtains the indication information and/or the third-party identifier information based on the ASP ID, and generates the PCC rule based on the BDT policy and the indication information and/or the third-party identifier information.

In addition, in the foregoing method 1000 shown in FIG. 13, the policy control function network element may alternatively generate the URSP based on the first service information and the first background data transfer policy.

Optionally, the fourth message includes the at least one background data transfer policy. The fourth message further includes first service information, and the first service information includes one or more of a DNN, S-NSSAI, or service description information. Correspondingly, that the policy control function network element generates the URSP of the terminal based on the first background data transfer policy includes: The policy control function network element generates the URSP based on the first service information and the first background data transfer policy.

That is, if the fourth message includes the first background data transfer policy and the first service information, the policy control function network element may generate the URSP based on the first service information and the first background data transfer policy.

Optionally, the fourth message includes the at least one background data transfer reference identifier. The method further includes: The policy control function network element obtains at least one corresponding background data transfer policy from a second data storage network element based on the at least one background data transfer reference identifier. The fourth message further includes first service information, and the first service information includes one or more of a DNN, S-NSSAI, or service description information. Correspondingly, that the policy control function network element generates the URSP of the terminal based on the first background data transfer policy includes: The policy control function network element generates the URSP based on the first service information and the first background data transfer policy.

That is, if the fourth message includes the background data transfer reference identifier and the first service information, the policy control function network element first obtains the at least one background data transfer policy based on the background data transfer reference identifier, and then may generate the URSP based on the first service information and the first background data transfer policy.

It should be understood that the examples in FIG. 17 to FIG. 21 in the embodiments of this application are merely intended to help a person skilled in the art understand the embodiments of this application, but are not intended to limit the embodiments of this application to specific scenarios shown in the examples. It is clear that a person skilled in the art can make various equivalent modifications or changes based on the examples in FIG. 17 to FIG. 21, and such modifications and changes also fall within the scope of the embodiments of this application.

It should be further understood that the examples in FIG. 17 to FIG. 21 in the embodiments of this application are merely examples for description, and the examples in the figures do not limit execution sequences. A person skilled in the art may flexibly adjust sequences of the steps based on the examples in the figures. In addition, sequence numbers of the foregoing processes do not mean execution sequences. The execution sequences of the processes should be determined based on functions and internal logic of the processes.

The foregoing describes the method for managing a background data transfer policy according to the embodiments of this application, and the following describes an apparatus according to the embodiments of this application. It should be understood that the technical features described in the method embodiments are also applicable to the following apparatus embodiments.

Figure 22:
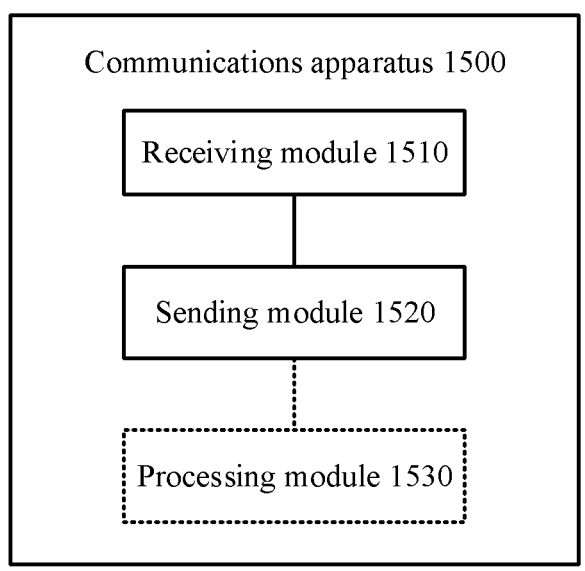
FIG. 22 is a schematic block diagram of a communications apparatus according to an embodiment of this application.

FIG. 22 is a schematic block diagram of a communications apparatus 1500 according to an embodiment of this application. Optionally, a form of the communications apparatus 1500 may be a general-purpose computer device or a chip in a general-purpose computer device. This is not limited in this embodiment of this application. As shown in FIG. 22, the communications apparatus 1500 includes a receiving module 1510 and a sending module 1520. Optionally, the communications apparatus 1500 may further include a processing module 1530.

For example, the communications apparatus 1500 may be any network element in this application, and may implement a function that can be implemented by the network element. It should be understood that the communications apparatus 1500 may be a physical device, a component (for example, an integrated circuit or a chip) of a physical device, or a function module in a physical device.

For example, the communications apparatus 1500 may be configured to implement a function of the first policy control function network element described in this specification. For example, the communications apparatus 1500 may be a policy control function network element, a component (for example, an integrated circuit or a chip) in a policy control function network element, or a function module.

In an implementation, the receiving module 1510 is configured to receive a first message. The first message carries a first identifier, and the first identifier is a background data transfer reference identifier or an application function identifier. The sending module 1520 is configured to send a second message to a first data storage network element. The second message is used to obtain a background data transfer policy, and the second message carries the first identifier. The receiving module 1510 is further configured to receive a third message from the first data storage network element. The third message includes a first background data transfer policy corresponding to the first identifier.

In a possible implementation, the third message further includes first service information, and the first service information includes one or more of a DNN, S-NSSAI, or service description information.

In a possible implementation, the first message further includes first service information, and the first service information includes one or more of a DNN, S-NSSAI, or service description information.

In a possible implementation, the first message further includes an ASP ID. The processing module 1530 is configured to obtain first service information from a fourth data storage network element based on the ASP ID. The first service information includes one or more of a DNN, an S-NSSAI, or service description information.

In a possible implementation, the processing module 1530 is further configured to generate a URSP of a terminal based on the first service information and the first background data transfer policy.

In a possible implementation, the first message further includes the ASP ID. The processing module 1530 is configured to obtain indication information and/or third-party identifier information from the fourth data storage network element based on the ASP ID. The indication information is used to indicate whether third-party charging is enabled.

In a possible implementation, the third message further includes indication information and/or third-party identifier information, and the indication information is used to indicate whether third-party charging is enabled; or the first message further includes indication information and/or third-party identifier information, and the indication information is used to indicate whether third-party charging is enabled.

In a possible implementation, the processing module 1530 is configured to generate a PCC rule based on the first background data transfer policy and the indication information and/or the third-party identifier information.

In a possible implementation, that the receiving module 1510 is configured to receive a first message includes receiving the first message from a network exposure function network element or a third data storage network element.

In a possible implementation, the sending module 1520 is further configured to send the first identifier to a second data storage network element. The first identifier is stored in PDU session subscription information of the terminal device.

Optionally, the sending module 1520 is further configured to send a discovery request to a network repository function network element. The discovery request is used to request to discover a data storage network element. The receiving module 1510 is further configured to receive information about the first data storage network element from the network repository function network element. The processing module 1530 is further configured to select the first data storage network element based on the information about the first data storage network element.

Optionally, the discovery request is used to request to discover a data storage network element configured to store the background data transfer policy, and correspondingly, the information about the first data storage network element is an identifier of the first data storage network element.

Optionally, the information about the first data storage network element includes an identifier of the first data storage network element and a type of the first data storage network element.

Optionally, the information about the first data storage network element includes an identifier of the first data storage network element and first indication information, and the first indication information indicates that the first data storage network element is configured to store the background data transfer policy.

Optionally, the first message further includes identifier information corresponding to the terminal. The sending module 1520 is further configured to send context information of the terminal to the second data storage network element. The context information of the terminal is determined based on the first background data transfer policy. Optionally, the context information of the terminal includes a time window and/or network area information.

Optionally, the identifier information corresponding to the terminal is a subscription permanent identifier of the terminal, or the identifier information corresponding to the terminal is a group identifier corresponding to the terminal.

Optionally, that the receiving module 1510 is configured to receive a first message includes: The first policy control function network element receives the first message from the network exposure function network element or the third data storage network element.

Optionally, before the first policy control function network element receives the first message, the sending module 1520 is further configured to send a first data storage request to the first data storage network element. The first data storage request includes the background data transfer policy. The receiving module 1510 is further configured to receive a first data storage response from the first data storage network element. Optionally, the first data storage request further includes one or more of the first service information, the indication information, or the third-party identifier information, and the indication information is used to indicate whether third-party charging is enabled. The receiving module 1510 is further configured to receive one or more of the first service information, the indication information, or the third-party identifier information from the network exposure network element.

It should be understood that the apparatus 1500 for managing a background data transfer policy according to this embodiment of this application may correspond to the method of the first policy control function network element in the foregoing method embodiments. In addition, the foregoing and other management operations and/or functions of the modules in the communications apparatus 1500 are used to implement corresponding steps of the method of the first policy control function network element in the foregoing method embodiments (for example, the method 700 in FIG. 9). Therefore, beneficial effects in the foregoing method embodiments can also be implemented. For brevity, details are not described herein.

In another implementation, the receiving module 1510 is configured to receive a fourth message from a first data storage network element. The fourth message includes at least one background data transfer reference identifier or at least one background data transfer policy, and each background data transfer policy has a corresponding background data transfer reference identifier. The processing module 1530 is configured to generate a URSP of a terminal. The URSP includes a first background data transfer policy, and the first background data transfer policy is included in the at least one background data transfer policy, or the first background data transfer policy corresponds to a first background data transfer reference identifier in the at least one background data transfer reference identifier. The sending module 1520 is configured to send the URSP to a mobility management network element.

Optionally, the fourth message includes the at least one background data transfer policy. The fourth message further includes first service information, and the first service information includes one or more of a DNN, S-NSSAI, or service description information. Correspondingly, that the processing module 1530 is configured to generate the URSP of the terminal based on the first background data transfer policy includes generating the URSP based on the first service information and the first background data transfer policy.

Optionally, the fourth message includes the at least one background data transfer reference identifier. The processing module 1530 is further configured to obtain at least one corresponding background data transfer policy from a second data storage network element based on the at least one background data transfer reference identifier. Optionally, the fourth message further includes first service information, and the first service information includes one or more of a DNN, S-NSSAI, or service description information. Correspondingly, that the processing module 1530 is configured to generate the URSP of the terminal based on the first background data transfer policy includes generating the URSP based on the first service information and the first background data transfer policy.

Optionally, the processing module 1530 is further configured to store at least one of the following to a third data storage network element: the first background data transfer policy, or a background data transfer reference identifier corresponding to the first background data transfer policy.

Optionally, before the fourth message is received from the first data storage network element, the sending module 1520 is further configured to send a request message to the first data storage network element. The request message includes an application function identifier.

In this case, the at least one background data transfer reference identifier is a background data transfer reference identifier corresponding to an application function identified by the application function identifier, and the at least one background data transfer policy is a background data transfer policy corresponding to the application function identified by the application function identifier. Optionally, the request message is a data request message or a data subscription message.

It should be understood that the apparatus 1500 for managing a background data transfer policy according to this embodiment of this application may correspond to the method of the policy control function network element in the foregoing method embodiments. In addition, the foregoing and other management operations and/or functions of the modules in the communications apparatus 1500 are used to implement corresponding steps of the method of the policy control function network element in the foregoing method embodiments (for example, the method 1000 in FIG. 13). Therefore, beneficial effects in the foregoing method embodiments can also be implemented. For brevity, details are not described herein.

In still another implementation, the receiving module 1510 is configured to receive a fifth message from a network exposure network element. The fifth message is used to request the first policy control function network element to perform policy negotiation. The processing module 1530 is configured to: select, based on the fifth message, a data storage network element from a first data storage network element set as a first data storage network element, and store a first background data transfer policy and/or a first BDT reference identifier in the first data storage network element. The sending module 1520 is configured to send the first background data transfer policy and/or the first BDT reference identifier to any data storage network element in a second data storage network element set. Alternatively, the sending module 1520 is configured to send a sixth message to a second data storage network element. The sixth message is used to obtain a background data transfer policy, and the second data storage network element is a network element in a first data storage network element set or in a second data storage network element set. The receiving module 1510 is configured to receive a seventh message from the second data storage network element. The seventh message includes the first background data transfer policy.

Optionally, the sending module 1520 is further configured to send a response message to the network exposure network element. The response message includes the first BDT reference identifier and/or the first background data transfer policy.

It should be understood that the apparatus 1500 for managing a background data transfer policy according to this embodiment of this application may correspond to the method of the policy control function network element in the foregoing method embodiments. In addition, the foregoing and other management operations and/or functions of the modules in the communications apparatus 1500 are used to implement corresponding steps of the method of the policy control function network element in the foregoing method embodiments (for example, the method 1300 in FIG. 15). Therefore, beneficial effects in the foregoing method embodiments can also be implemented. For brevity, details are not described herein.

For another example, the communications apparatus 1500 may be configured to implement a function of the network exposure network element described in this specification. For example, the communications apparatus 1500 may be a network exposure network element, a component (for example, an integrated circuit or a chip) in a network exposure network element, or a function module.

In an implementation, the receiving module 1510 is configured to receive second service information from an application function network element. The second service information includes service description information, and a service corresponding to the service description information is a service to which a first background data transfer policy is applied. The processing module 1530 is configured to determine first service information based on the second service information. The first service information includes the service description information. The sending module 1520 is configured to send the first service information.

Optionally, the second service information further includes a service function AF service identifier. Correspondingly, that the processing module 1530 is configured to determine first service information based on the second service information includes obtaining a DNN and an S-NSSAI based on the AF service identifier. The first service information further includes the DNN and the S-NSSAI.

Optionally, the second service information further includes one or more of the following: a DNN or an S-NSSAI. The first service information further includes the DNN and the S-NSSAI.

In a possible implementation, the processing module 1530 is further configured to obtain indication information and/or third-party identifier information from the application function network element. The indication information is used to indicate whether third-party charging is enabled.

In a possible implementation, that the receiving module 1510 is configured to receive second service information from an application function network element includes receiving a first background data transfer policy negotiation request from the application function network element. The first background data transfer policy negotiation request includes the second service information. Correspondingly, that the sending module 1520 is configured to send the first service information includes sending a second background data transfer policy negotiation request to a first policy control function network element. The second background data transfer policy negotiation request includes the first service information.

In another possible implementation, that the receiving module 1510 is configured to receive second service information from an application function network element includes receiving an application policy request from the application function network element. The application policy request includes the second service information. Correspondingly, that the sending module 1520 is configured to send the first service information includes sending a storage application request to a first data storage network element. The storage application request includes the first service information.

In still another possible implementation, that the receiving module 1510 is configured to receive second service information from an application function network element includes: The network exposure network element receives a first application configuration message from the application function network element. The first application configuration message includes the second service information and an ASP ID. Correspondingly, that the sending module 1520 is configured to send the first service information includes sending a second application configuration message to a fourth data storage network element. The second application configuration message includes the ASP ID and the first service information.

It should be understood that the apparatus 1500 for managing a background data transfer policy according to this embodiment of this application may correspond to the method of the network exposure network element in the foregoing method embodiments. In addition, the foregoing and other management operations and/or functions of the modules in the communications apparatus 1500 are used to implement corresponding steps of the method of the network exposure network element in the foregoing method embodiments (for example, the network exposure network element in the method 700 in FIG. 9, or the NEF in FIG. 17 to FIG. 21). Therefore, beneficial effects in the foregoing method embodiments can also be implemented. For brevity, details are not described herein.

For still another example, the communications apparatus 1500 may be configured to implement a function of the data storage network element described in this specification. For example, the communications apparatus 1500 may be a first data storage network element, a component (for example, an integrated circuit or a chip) in a first data storage network element, or a function module.

In an implementation, the receiving module 1510 is configured to receive a second message from a first policy control function network element. The second message is used to obtain a background data transfer policy, and the second message carries a first identifier. The sending module 1520 is configured to send a third message to the first policy control function network element. The third message includes a first background data transfer policy corresponding to the first identifier.

In a possible implementation, the third message further includes first service information, and the first service information includes one or more of a DNN, an S-NSSAI, or service description information.

Optionally, the receiving module 1510 is further configured to receive a first data storage request from a second policy control function network element. The first data storage request includes the first background data transfer policy and the first service information.

Optionally, the receiving module 1510 is further configured to receive a storage application request from a network exposure network element. The storage application request includes the first service information.

In another possible implementation, the communications apparatus 1500 may alternatively be another data storage network element, a component (for example, an integrated circuit or a chip) in another data storage network element, or a function module, for example, a fourth data storage network element or a component in a fourth data storage network element. The fourth data storage network element may be the same as or different from the first data storage network element. Optionally, the sending module 1520 is configured to send, to the first policy control function network element, first service information corresponding to an ASP ID. The receiving module 1510 is configured to receive a second application configuration message from a network exposure network element. The second application configuration message includes the ASP ID and the first service information.

In still another possible implementation, the third message includes indication information and/or third-party identifier information, and the indication information is used to indicate whether third-party charging is enabled.

Alternatively, optionally, the other data storage network element (for example, the fourth data storage network element) may provide the indication information and/or the third-party identifier information for the first policy control function network element.

It should be understood that the apparatus 1500 for managing a background data transfer policy according to this embodiment of this application may correspond to the method of the first data storage network element in the foregoing method embodiments. In addition, the foregoing and other management operations and/or functions of the modules in the communications apparatus 1500 are used to implement corresponding steps of the method of the first data storage network element in the foregoing method embodiments (for example, the first data storage network element in the method 700 in FIG. 9, the BDT-UDR in the first data storage network element in FIG. 10, FIG. 11, FIG. 12, FIG. 14, and FIG. 15, the UDR in FIG. 17, the BDT-UDR in FIG. 18, the APP-UDR in FIG. 19 and FIG. 20, and the BDT-UDR in FIG. 21). Therefore, beneficial effects in the foregoing method embodiments can also be implemented. For brevity, details are not described herein.

It should be further understood that in this embodiment, the communications apparatus 1500 is presented in a form of function modules. The "module" herein may be an ASIC, a circuit, a processor and a memory that execute one or more software or firmware programs, an integrated logic circuit, and/or another computer that can provide the foregoing functions. In a simple embodiment, a person skilled in the art may figure out that the apparatus 1500 may be in the form shown in FIG. 8. The processing module 1530 may be implemented by the processor 601 shown in FIG. 8. Optionally, if the computer device shown in FIG. 8 includes the memory 602, the processing module 1530 may be implemented by the processor 601 and the memory 602. The receiving module 1510 and the sending module 1520 may be implemented by the transceiver 603 shown in FIG. 8. The transceiver 603 includes a receiving function and a sending function. For example, the processor is implemented by executing a computer program stored in a memory. Optionally, when the apparatus 1500 is a chip, the functions and/or the implementation processes of the receiving module 1510 and the sending module 1520 may alternatively be implemented by a pin, a circuit, or the like. Optionally, the memory may be a storage unit on the chip, for example, a register or a cache. The storage unit may alternatively be a storage unit that is in the computer device and that is located outside the chip, for example, the memory 602 shown in FIG. 8, or may be a storage unit that is deployed in another system or device but not located in the computer device. A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry an instruction and/or data.

This application further provides a computer-readable medium. The computer-readable medium stores a computer program. When the computer program is executed by a computer, a function in any one of the foregoing method embodiments is implemented.

This application further provides a computer program product. When the computer program product is executed by a computer, a function in any one of the foregoing method embodiments is implemented.

All or some of the foregoing embodiments may be implemented using software, hardware, firmware, or any combination thereof. When being implemented using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that an "embodiment" mentioned in the entire specification means that particular characteristics, structures, or features related to the embodiment are included in at least one embodiment of this application. Therefore, the embodiments in the entire specification do not necessarily refer to a same embodiment. In addition, these particular characteristics, structures, or features may be combined in one or more embodiments in any appropriate manner.

It should be understood that in the embodiments of this application, numbers "first", "second", and the like are merely used to distinguish between different objects, for example, to distinguish between different messages or indication information, and do not constitute a limitation on the scope of the embodiments of this application. The embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

In the embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It should be understood that in the embodiments of this application, "B corresponding to A" represents that B is associated with A, and B may be determined based on A. However, it should be further understood that determining B based on A does not mean that B is determined based on only A. B may alternatively be determined based on A and/or other information.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, the function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A method, comprising:
receiving, by a first policy control function network element, a first message, wherein the first message comprises a background data transfer reference identifier;
sending, by the first policy control function network element, a second message to a first data storage network element, wherein the second message is to obtain a background data transfer policy, and wherein the second message comprises the background data transfer reference identifier;
receiving, by the first policy control function network element, a third message from the first data storage network element, wherein the third message comprises a first background data transfer policy corresponding to the background data transfer reference identifier and first service information, and wherein the first service information comprises service description information; and generating, by the first policy control function network element, a user route selection policy (URSP) of a terminal based on the first service information and the first background data transfer policy.

2. The method of claim 1, wherein receiving the first message comprises receiving, by the first policy control function network element, the first message from a third data storage network element.

3. The method of claim 1, further comprising sending, by the first policy control function network element, the background data transfer reference identifier to a second data storage network element, wherein the background data transfer reference identifier is stored in protocol data unit (PDU) session subscription information of a terminal device.

4. The method of claim 1, further comprising:
sending, by the first policy control function network element, a first data storage request to the first data storage network element, wherein the first data storage request comprises the background data transfer policy; and
receiving, by the first policy control function network element, a first data storage response from the first data storage network element.

5. The method of claim 4, wherein the first data storage request further comprises the first service information, and wherein before sending the first data storage request to the first data storage network element, the method further comprises receiving, by the first policy control function network element, the first service information from a network exposure network element.

6. The method of claim 1, further comprising:
sending, by a second policy control function network element, a second data storage request to the first data storage network element, wherein the second data storage request comprises the background data transfer policy; and
receiving, by the second policy control function network element, a second data storage response from the first data storage network element.

7. The method of claim 6, wherein the second data storage request comprises the first service information, and wherein before sending the second data storage request to the first data storage network element, the method further comprises receiving, by the second policy control function network element, the first service information from a network exposure network element.

8. An apparatus, comprising:
a memory configured to store instructions; and
one or more processors coupled to the memory and configured to execute the instructions to cause the apparatus to:
receive a first message, wherein the first message comprises a background data transfer reference identifier;
send a second message to a first data storage network element, wherein the second message is to obtain a background data transfer policy, and wherein the second message carries the background data transfer reference identifier;

receive a third message from the first data storage network element, wherein the third message comprises a first background data transfer policy corresponding to the background data transfer reference identifier and first service information, and wherein the first service information comprises service description information; and
generate a user route selection policy (URSP) of a terminal based on the first service information and the first background data transfer policy.

9. The apparatus of claim 8, wherein the one or more processors are further configured to execute the instructions to further cause the apparatus to send the background data transfer reference identifier to a second data storage network element, and wherein the background data transfer reference identifier is stored in protocol data unit (PDU) session subscription information of a terminal device.

10. The apparatus of claim 8, wherein the one or more processors are further configured to execute the instructions to further cause the apparatus to:
send a first data storage request to the first data storage network element, wherein the first data storage request comprises the background data transfer policy; and
receive a first data storage response from the first data storage network element.

11. A system, comprising:
a first policy control function network element comprising:
a first memory configured to store instructions; and
one or more first processors coupled to the first memory and configured to execute the instructions to cause the first policy control function network element to:
receive a first message, wherein the first message comprises a background data transfer reference identifier; and
send a second message to obtain a background data transfer policy, wherein the second message comprises the background data transfer reference identifier; and
a first data storage network element configured to:
receive the second message from the first policy control function network element; and
send a third message to the first policy control function network element, wherein the third message comprises a first background data transfer policy corresponding to the background data transfer reference identifier and first service information, and wherein the first service information comprises service description information,
wherein the first policy control function network element is further configured to execute the instructions to cause the one or more first processors to generate a user route selection policy (URSP) of a terminal based on the first service information and the first background data transfer policy.

12. The system of claim 11, further comprising a second policy control function network element comprising:
a second memory configured to store instructions; and
one or more second processors coupled to the second memory and configured to execute the instructions to cause the second policy control function network element to:
send a second data storage request to the first data storage network element, wherein the second data storage request comprises the background data transfer policy; and receive a second data storage response from the first data storage network element, wherein the first data storage network element is further configured to:
receive the second data storage request; and
send the second data storage response to the second policy control function network element.

13. The system of claim 11, wherein the first policy control function network element is further configured to send the background data transfer reference identifier to a second data storage network element, and wherein the background data transfer reference identifier is stored in protocol data unit (PDU) session subscription information of a terminal device.

14. The system of claim 11, wherein the first policy control function network element is further configured to:
send a first data storage request to the first data storage network element, wherein the first data storage request comprises the background data transfer policy; and
receive a first data storage response from the first data storage network element,
wherein the first data storage network element is further configured to:
receive the first data storage request; and
send the first data storage response to the first policy control function network element.

15. The system of claim 11, further comprising:
an application function network element configured to send second service information comprising the service description information, wherein the first background data transfer policy is applied to a service corresponding to the service description information; and
a network exposure network element configured to:
receive the second service information from the application function network element; and
send, based on the second service information, the first service information comprising the service description information.

16. The system of claim 15, wherein the application function network element is configured to send the second service information to the network exposure network element by sending a first background data transfer policy negotiation request to the network exposure network element, wherein the first background data transfer policy negotiation request comprises the second service information, wherein the network exposure network element is configured to send the first service information by sending a second background data transfer policy negotiation request to a second policy control function network element, and wherein the second background data transfer policy negotiation request comprises the first service information.

17. A computer program product comprising instructions that are stored on a non-transitory computer-readable medium and that, when executed by one or more processors, cause a first access and mobility management function network element to:
receive a first message comprising a background data transfer reference identifier;
send a second message to a first data storage network element, wherein the second message is to obtain a background data transfer policy, and wherein the second message comprises the background data transfer reference identifier;
receive a third message from the first data storage network element, wherein the third message comprises a first background data transfer policy corresponding to the background data transfer reference identifier and first service information, and wherein the first service information comprises service description information; and
generate a user route selection policy (URSP) of a terminal based on the first service information and the first background data transfer policy.

18. The computer program product of claim 17, wherein the one or more processors are further configured to execute the instructions to cause the first access and mobility management function network element to receive the first message by receiving the first message from a third data storage network element.

19. The computer program product of claim 17, wherein the one or more processors are further configured to execute the instructions to cause the first access and mobility management function network element to send the background data transfer reference identifier to a second data storage network element, and wherein the background data transfer reference identifier is stored in protocol data unit (PDU) session subscription information of a terminal device.

20. The computer program product of claim 17, wherein the one or more processors are further configured to execute the instructions to cause the first access and mobility management function network element to:
send a first data storage request to the first data storage network element, wherein the first data storage request comprises the background data transfer policy; and
receive a first data storage response from the first data storage network element.

21. The computer program product of claim 20, wherein the first data storage request further comprises the first service information, and wherein before sending the first data storage request to the first data storage network element, the one or more processors are further configured to execute the instructions to cause the first access and mobility management function network element to receive the first service information from a network exposure network element.

22. The computer program product of claim 17, wherein the one or more processors are further configured to execute the instructions to cause the first access and mobility management function network element to:
send a second data storage request to the first data storage network element, wherein the second data storage request comprises the background data transfer policy; and
receive a second data storage response from the first data storage network element.

* * * * *